(12) United States Patent
Kishigami et al.

(10) Patent No.: US 10,661,706 B2
(45) Date of Patent: May 26, 2020

(54) OPTICAL DEVICE AND DIRECTION DISPLAY DEVICE

(71) Applicant: MAXELL, LTD., Otokuni-gun, Kyoto (JP)

(72) Inventors: Masahiro Kishigami, Otokuni-gun (JP); Toshinori Sugiyama, Otokuni-gun (JP); Yasuhiko Kunii, Otokuni-gun (JP); Yuji Tsuchiya, Wako (JP); Go Shimizu, Wako (JP); Masayoshi Takori, Wako (JP); Ryuya Kawaji, Wako (JP)

(73) Assignee: MAXELL, LTD., Otokuni-Gun, Kyoto (JP)

(*) Notice: Subject to any disclaimer, the term of this patent is extended or adjusted under 35 U.S.C. 154(b) by 0 days.

(21) Appl. No.: 16/379,888

(22) Filed: Apr. 10, 2019

(65) Prior Publication Data

US 2019/0315269 A1  Oct. 17, 2019

(30) Foreign Application Priority Data

Apr. 12, 2018 (JP) .................... 2018-077161

(51) Int. Cl.
*B60Q 1/34* (2006.01)
*F21S 43/30* (2018.01)
*F21S 43/20* (2018.01)

(52) U.S. Cl.
CPC .............. *B60Q 1/346* (2013.01); *F21S 43/26* (2018.01); *F21S 43/30* (2018.01); *B60Q 2400/50* (2013.01)

(58) Field of Classification Search
CPC ..... B60Q 1/346; B60Q 2400/50; F21S 43/26; F21S 43/30
See application file for complete search history.

(56) References Cited

U.S. PATENT DOCUMENTS

| | | | |
|---|---|---|---|
| 2007/0290216 A1 | 12/2007 | Watanabe | |
| 2016/0161076 A1 | 6/2016 | Shibata et al. | |
| 2016/0257243 A1* | 9/2016 | Son | B60Q 1/50 |
| 2017/0067609 A1* | 3/2017 | Ichikawa | F21S 41/663 |
| 2017/0151904 A1* | 6/2017 | Youn | F21S 41/365 |
| 2018/0154819 A1* | 6/2018 | Hoshino | B60Q 1/085 |
| 2019/0176687 A1* | 6/2019 | Nagata | B60Q 1/46 |

FOREIGN PATENT DOCUMENTS

| | | |
|---|---|---|
| JP | 11-301346 A | 11/1999 |
| JP | 2004-136838 A | 5/2004 |
| JP | 2008-004587 A | 1/2008 |
| JP | 2010-262889 A | 11/2010 |
| JP | 2016-107761 A | 6/2016 |
| JP | 2016-135629 A | 7/2016 |

* cited by examiner

*Primary Examiner* — Raymond R Chai
(74) *Attorney, Agent, or Firm* — Volpe and Koenig, P.C.

(57) ABSTRACT

An optical device for displaying a condensing mark includes a light source, and an optical element for condensing light emitted from the light source onto an irradiated surface. The deflection surface of the optical element is divided into a plurality of regions. The light emitted through the respective regions on the deflection surface of the optical element forms partial irradiation images corresponding to the respective regions on the deflection surface of the irradiated surface. The respective partial irradiation images are combined into at least one condensing mark on the irradiated surface.

15 Claims, 41 Drawing Sheets

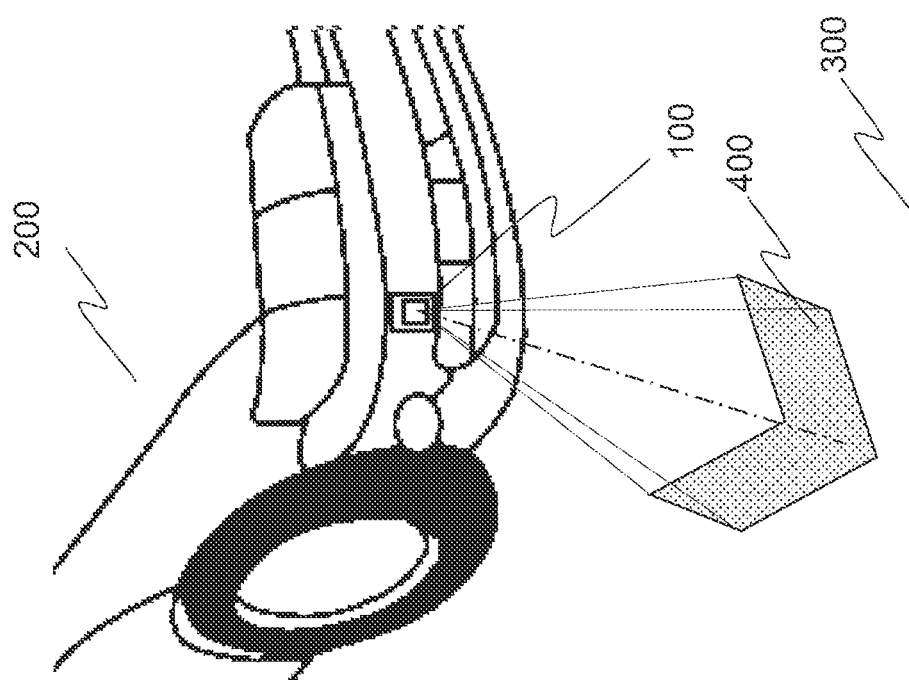
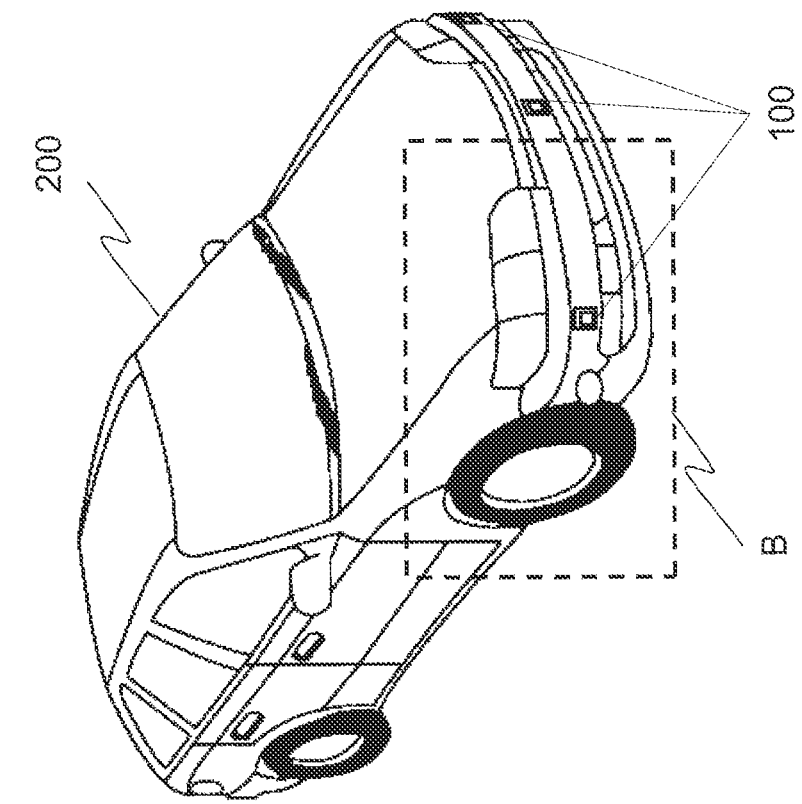

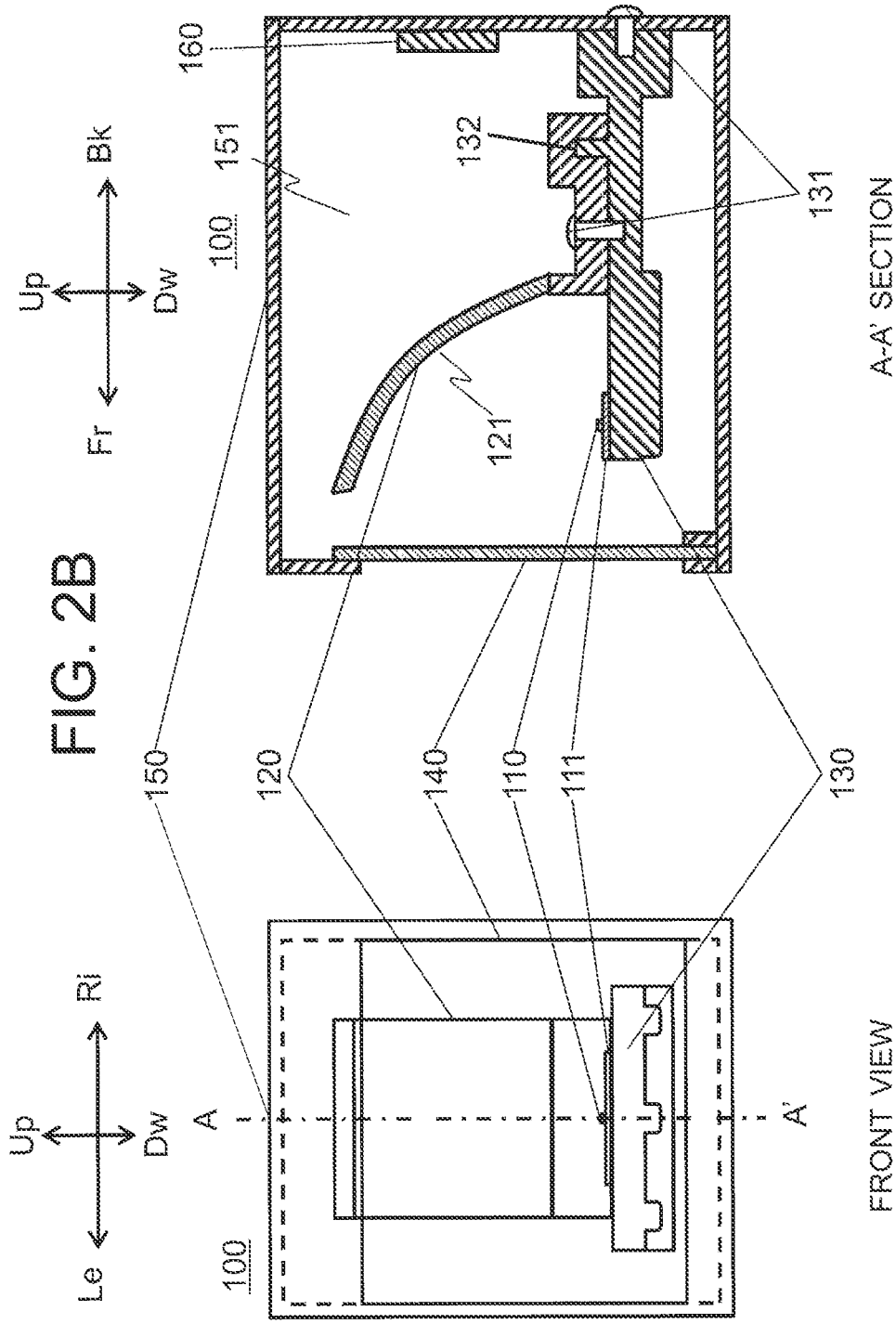

| x'(mm) | y'(mm) | z'(mm) | l' | m' | n' |
|---|---|---|---|---|---|
| -15 | 0 | 0.966408 | 0.161523 | -0.37134 | 0.91434 |
| -12 | 0 | 0.501423 | 0.122528 | -0.36492 | 0.922943 |
| -9 | 0 | 0.173189 | 0.079495 | -0.35927 | 0.929843 |
| -6 | 0 | -0.01557 | 0.039122 | -0.35256 | 0.934971 |
| -3 | 0 | -0.07751 | -0.00082 | -0.34574 | 0.938332 |
| 0 | 0 | -0.00898 | -0.04226 | -0.33936 | 0.939708 |
| -15 | 6 | 3.925987 | 0.169912 | -0.49813 | 0.850295 |
| -12 | 6 | 3.396835 | 0.130927 | -0.49427 | 0.859395 |
| -9 | 6 | 3.013779 | 0.09052 | -0.49009 | 0.866961 |
| -6 | 6 | 2.764485 | 0.053399 | -0.48426 | 0.873292 |
| -3 | 6 | 2.648689 | 0.013813 | -0.47856 | 0.877945 |
| 0 | 6 | 2.671661 | -0.02814 | -0.47312 | 0.880549 |
| -15 | 12 | 8.073123 | 0.171456 | -0.61736 | 0.767773 |
| -12 | 12 | 7.478566 | 0.134383 | -0.61549 | 0.776607 |
| -9 | 12 | 7.025315 | 0.101216 | -0.61133 | 0.784874 |
| -6 | 12 | 6.707375 | 0.065353 | -0.60705 | 0.791974 |
| -3 | 12 | 6.530461 | 0.027738 | -0.60244 | 0.797679 |
| 0 | 12 | 6.508682 | -0.01875 | -0.59908 | 0.800468 |
| -15 | 18 | 13.68412 | 0.167586 | -0.7224 | 0.670858 |
| -12 | 18 | 13.00214 | 0.139371 | -0.71978 | 0.68007 |
| -9 | 18 | 12.45717 | 0.109099 | -0.71692 | 0.688564 |
| -6 | 18 | 12.05533 | 0.076336 | -0.71378 | 0.696194 |
| -3 | 18 | 11.80426 | 0.038453 | -0.71087 | 0.702269 |
| 0 | 18 | 11.74232 | -0.00894 | -0.7088 | 0.705358 |
| -15 | 24 | 21.13722 | 0.16698 | -0.8066 | 0.567019 |
| -12 | 24 | 20.32534 | 0.14216 | -0.80492 | 0.576101 |
| -9 | 24 | 19.65957 | 0.115245 | -0.80304 | 0.584678 |
| -6 | 24 | 19.14527 | 0.085569 | -0.801 | 0.592522 |
| -3 | 24 | 18.81563 | 0.04442 | -0.80025 | 0.598019 |
| 0 | 24 | 18.69983 | 0.000525 | -0.79878 | 0.601627 |
| -15 | 30 | 30.99092 | 0.165625 | -0.87137 | 0.461829 |
| -12 | 30 | 29.9928 | 0.144415 | -0.87036 | 0.470763 |
| -9 | 30 | 29.15153 | 0.121124 | -0.86923 | 0.479337 |
| -6 | 30 | 28.49533 | 0.087938 | -0.86938 | 0.486265 |
| -3 | 30 | 28.0638 | 0.051627 | -0.8691 | 0.491932 |
| 0 | 30 | 27.86775 | 0.013947 | -0.868 | 0.496369 |

| x'(mm) | y'(mm) | z'(mm) | l' | m' | n' |
|---|---|---|---|---|---|
| 0 | 0 | -0.00898 | 0.042256 | -0.33936 | 0.939708 |
| 3 | 0 | -0.07751 | 0.000815 | -0.34574 | 0.938332 |
| 6 | 0 | -0.01557 | -0.03912 | -0.35256 | 0.934971 |
| 9 | 0 | 0.173189 | -0.0795 | -0.35927 | 0.929843 |
| 12 | 0 | 0.501423 | -0.12253 | -0.36491 | 0.922943 |
| 15 | 0 | 0.966408 | -0.16152 | -0.37134 | 0.91434 |
| 0 | 6 | 2.671661 | 0.028144 | -0.47312 | 0.880549 |
| 3 | 6 | 2.648689 | -0.01381 | -0.47856 | 0.877945 |
| 6 | 6 | 2.764485 | -0.0534 | -0.48426 | 0.873292 |
| 9 | 6 | 3.013779 | -0.0907 | -0.49008 | 0.866947 |
| 12 | 6 | 3.396835 | -0.13094 | -0.49427 | 0.859393 |
| 15 | 6 | 3.925987 | -0.16991 | -0.49813 | 0.850295 |
| 0 | 12 | 6.508682 | 0.018752 | -0.59908 | 0.800468 |
| 3 | 12 | 6.530461 | -0.02774 | -0.60244 | 0.797679 |
| 6 | 12 | 6.707375 | -0.06535 | -0.60705 | 0.791974 |
| 9 | 12 | 7.025315 | -0.10122 | -0.61133 | 0.784873 |
| 12 | 12 | 7.478566 | -0.1345 | -0.61548 | 0.776595 |
| 15 | 12 | 8.073123 | -0.17146 | -0.61736 | 0.767773 |
| 0 | 18 | 11.74232 | 0.008937 | -0.7088 | 0.705358 |
| 3 | 18 | 11.80426 | -0.03845 | -0.71087 | 0.702269 |
| 6 | 18 | 12.05533 | -0.07634 | -0.71378 | 0.696194 |
| 9 | 18 | 12.45717 | -0.10921 | -0.71691 | 0.688556 |
| 12 | 18 | 13.00214 | -0.1395 | -0.71977 | 0.680057 |
| 15 | 18 | 13.68412 | -0.16759 | -0.7224 | 0.670858 |
| 0 | 24 | 18.69983 | -0.00053 | -0.79878 | 0.601627 |
| 3 | 24 | 18.81564 | -0.04442 | -0.80025 | 0.598019 |
| 6 | 24 | 19.14527 | -0.08557 | -0.801 | 0.592522 |
| 9 | 24 | 19.65957 | -0.11529 | -0.80304 | 0.584675 |
| 12 | 24 | 20.32534 | -0.14218 | -0.80492 | 0.576099 |
| 15 | 24 | 21.13722 | -0.16698 | -0.8066 | 0.567019 |
| 0 | 30 | 27.86775 | -0.01395 | -0.868 | 0.496369 |
| 3 | 30 | 28.06383 | -0.05162 | -0.8691 | 0.491931 |
| 6 | 30 | 28.49534 | -0.08794 | -0.86938 | 0.486265 |
| 9 | 30 | 29.15153 | -0.12112 | -0.86923 | 0.479338 |
| 12 | 30 | 29.9928 | -0.14442 | -0.87036 | 0.470762 |
| 15 | 30 | 30.99092 | -0.16563 | -0.87137 | 0.461829 |

FRONT VIEW    A-A' SECTION

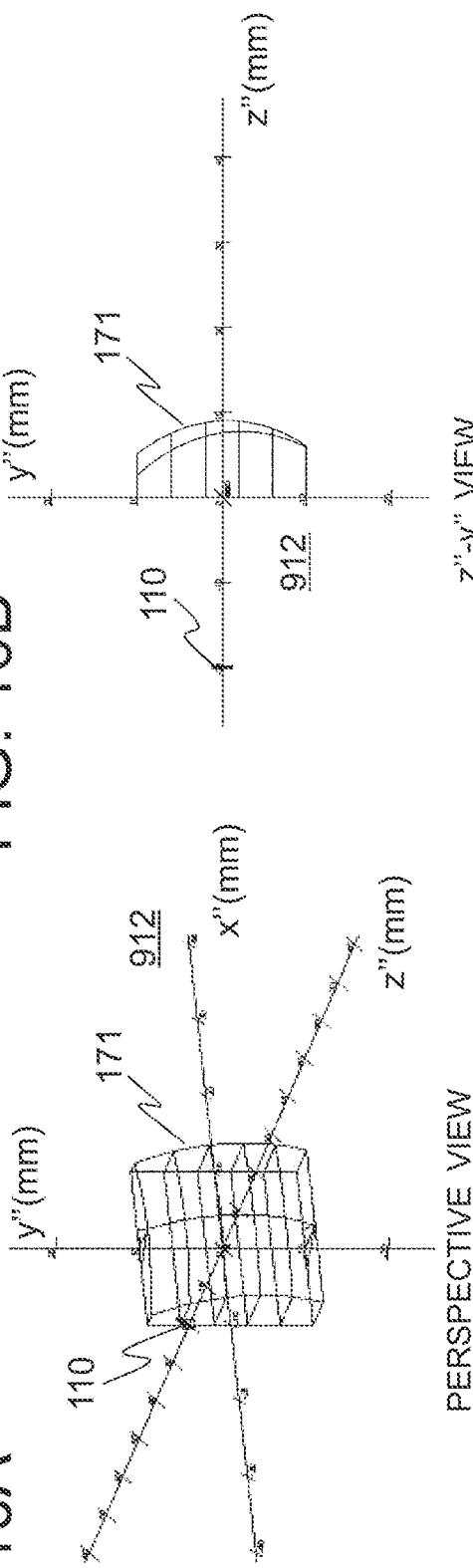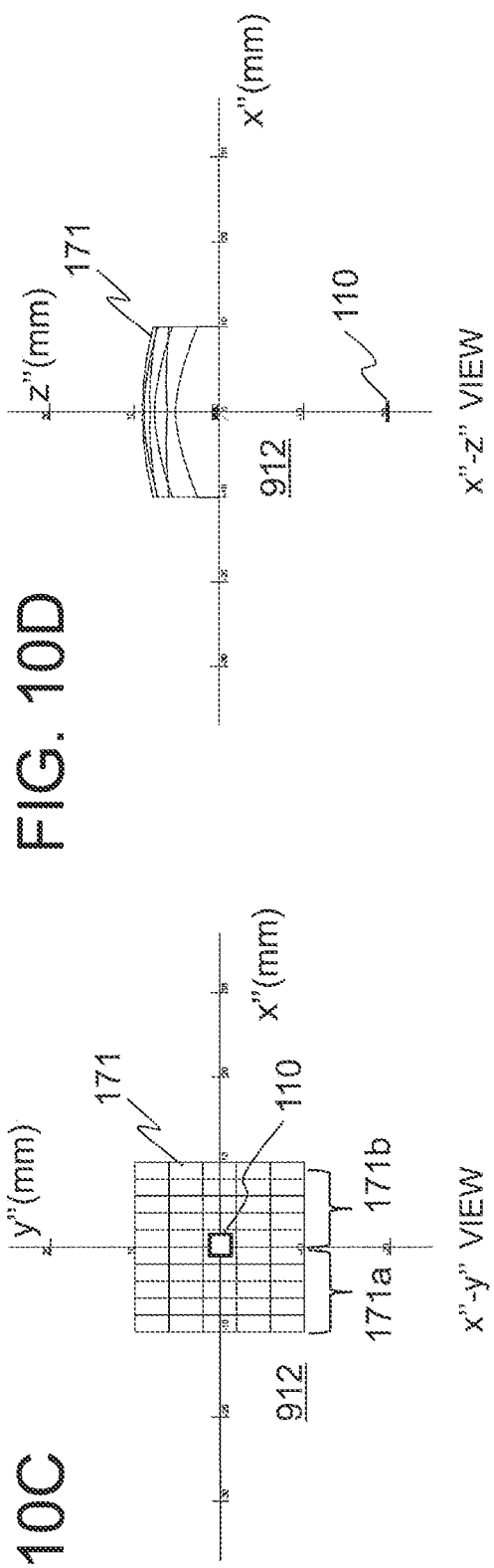

| x" | y" | z" | l" | m" | n" |
|---|---|---|---|---|---|
| -10 | -10 | 5.876007 | -0.06829 | -0.43751 | 0.896616 |
| -8 | -10 | 6.010113 | -0.05505 | -0.46833 | 0.881836 |
| -6 | -10 | 6.126177 | -0.04377 | -0.4979 | 0.866127 |
| -4 | -10 | 6.193882 | -0.01044 | -0.52117 | 0.853392 |
| -2 | -10 | 6.160878 | 0.03898 | -0.53695 | 0.842713 |
| 0 | -10 | 6.021816 | 0.069813 | -0.55406 | 0.829546 |
| -10 | -6 | 7.313773 | -0.1472 | -0.22679 | 0.962757 |
| -8 | -6 | 7.604663 | -0.13212 | -0.25631 | 0.957523 |
| -6 | -6 | 7.858105 | -0.10704 | -0.28176 | 0.953495 |
| -4 | -6 | 8.039224 | -0.06216 | -0.30476 | 0.950399 |
| -2 | -6 | 8.110033 | -0.00436 | -0.32432 | 0.945937 |
| 0 | -6 | 8.064494 | 0.042617 | -0.33986 | 0.939509 |
| -10 | -2 | 7.735801 | -0.20668 | 0.015083 | 0.978293 |
| -8 | -2 | 8.167393 | -0.20084 | -0.01173 | 0.979555 |
| -6 | -2 | 8.525784 | -0.14987 | -0.03414 | 0.988117 |
| -4 | -2 | 8.779008 | -0.10307 | -0.05611 | 0.99309 |
| -2 | -2 | 8.94225 | -0.0557 | -0.0753 | 0.995604 |
| 0 | -2 | 8.961755 | 0.055066 | -0.08856 | 0.994548 |
| -10 | 2 | 7.167774 | -0.25813 | 0.25821 | 0.930965 |
| -8 | 2 | 7.69756 | -0.23231 | 0.235105 | 0.9438 |
| -6 | 2 | 8.140745 | -0.18825 | 0.217036 | 0.95784 |
| -4 | 2 | 8.484789 | -0.14293 | 0.200653 | 0.969181 |
| -2 | 2 | 8.722779 | -0.08381 | 0.182665 | 0.979597 |
| 0 | 2 | 8.788637 | 0.034442 | 0.173207 | 0.984283 |
| -10 | 6 | 5.491635 | -0.27598 | 0.472291 | 0.837123 |
| -8 | 6 | 6.131491 | -0.25516 | 0.460103 | 0.850411 |
| -6 | 6 | 6.674353 | -0.21075 | 0.447377 | 0.86916 |
| -4 | 6 | 7.105532 | -0.16777 | 0.432476 | 0.8859 |
| -2 | 6 | 7.422525 | -0.10848 | 0.422034 | 0.900066 |
| 0 | 6 | 7.529752 | 0.033539 | 0.416603 | 0.90847 |
| -10 | 10 | 2.525119 | -0.26909 | 0.654874 | 0.706208 |
| -8 | 10 | 3.28945 | -0.26398 | 0.643974 | 0.718062 |
| -6 | 10 | 3.963477 | -0.22496 | 0.633609 | 0.740224 |
| -4 | 10 | 4.504827 | -0.18063 | 0.624478 | 0.759868 |
| -2 | 10 | 4.904334 | -0.11961 | 0.62109 | 0.774558 |
| 0 | 10 | 5.061133 | 0.018115 | 0.617844 | 0.786092 |

| x" | y" | z" | l" | m" | n" |
|---|---|---|---|---|---|
| 0 | -10 | 6.021816 | -0.06981 | -0.55406 | 0.829546 |
| 2 | -10 | 6.160878 | -0.03898 | -0.53695 | 0.842713 |
| 4 | -10 | 6.193882 | 0.010437 | -0.52117 | 0.853392 |
| 6 | -10 | 6.126177 | 0.043772 | -0.4979 | 0.866127 |
| 8 | -10 | 6.010113 | 0.055049 | -0.46833 | 0.881836 |
| 10 | -10 | 5.876007 | 0.068293 | -0.43751 | 0.896616 |
| 0 | -6 | 8.064494 | -0.04262 | -0.33986 | 0.939509 |
| 2 | -6 | 8.110033 | 0.004363 | -0.32432 | 0.945937 |
| 4 | -6 | 8.039224 | 0.062157 | -0.30476 | 0.950399 |
| 6 | -6 | 7.858105 | 0.10704 | -0.28176 | 0.953495 |
| 8 | -6 | 7.604663 | 0.132122 | -0.25631 | 0.957523 |
| 10 | -6 | 7.313773 | 0.147197 | -0.22679 | 0.962757 |
| 0 | -2 | 8.961755 | -0.05507 | -0.08856 | 0.994548 |
| 2 | -2 | 8.94225 | 0.055695 | -0.0753 | 0.995604 |
| 4 | -2 | 8.779008 | 0.103071 | -0.05611 | 0.99309 |
| 6 | -2 | 8.525784 | 0.149866 | -0.03414 | 0.988117 |
| 8 | -2 | 8.167393 | 0.200835 | -0.01173 | 0.979555 |
| 10 | -2 | 7.735801 | 0.206679 | 0.015083 | 0.978293 |
| 0 | 2 | 8.788637 | -0.03444 | 0.173207 | 0.984283 |
| 2 | 2 | 8.722779 | 0.083808 | 0.182665 | 0.979597 |
| 4 | 2 | 8.484789 | 0.142925 | 0.200653 | 0.969181 |
| 6 | 2 | 8.140745 | 0.188252 | 0.217036 | 0.95784 |
| 8 | 2 | 7.69756 | 0.232309 | 0.235105 | 0.9438 |
| 10 | 2 | 7.167774 | 0.258129 | 0.25821 | 0.930965 |
| 0 | 6 | 7.529752 | -0.03354 | 0.416603 | 0.90847 |
| 2 | 6 | 7.422525 | 0.108484 | 0.422034 | 0.900066 |
| 4 | 6 | 7.105532 | 0.167768 | 0.432476 | 0.8859 |
| 6 | 6 | 6.674353 | 0.210747 | 0.447377 | 0.86916 |
| 8 | 6 | 6.131491 | 0.25516 | 0.460103 | 0.850411 |
| 10 | 6 | 5.491635 | 0.275982 | 0.472291 | 0.837123 |
| 0 | 10 | 5.061133 | -0.01812 | 0.617844 | 0.786092 |
| 2 | 10 | 4.904334 | 0.119612 | 0.62109 | 0.774558 |
| 4 | 10 | 4.504827 | 0.180633 | 0.624478 | 0.759868 |
| 6 | 10 | 3.963477 | 0.224961 | 0.633609 | 0.740224 |
| 8 | 10 | 3.28945 | 0.263979 | 0.643974 | 0.718062 |
| 10 | 10 | 2.525119 | 0.269091 | 0.654874 | 0.706208 |

FIG. 14A

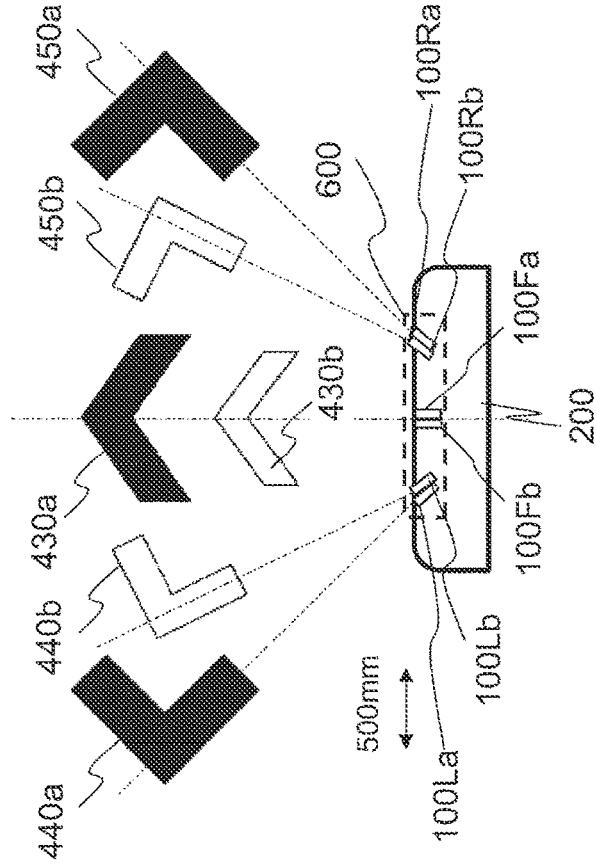

FIG. 14B

| OPTICAL DEVICE | LATERAL INSTALLATION POSITION | INSTALLATION HEIGHT POSITION | DISPLAY POSITION/SHAPE | COLOR | REMARKS |
|---|---|---|---|---|---|
| 100Fa | CENTER OF VEHICLE | 600mm ABOVE GROUND | PATTERN > 2000mm AHEAD | ORANGE | |
| 100Fb | CENTER OF VEHICLE | 600mm ABOVE GROUND | PATTERN > 1200mm AHEAD | WHITE | |
| 100La | 500mm TO THE LEFT FROM CENTER OF VEHICLE | 600mm ABOVE GROUND | PATTERN ⌐ 2221mm AHEAD | ORANGE | DISPLAY FORWARD LEFT AT 45° |
| 100Lb | 450mm TO THE LEFT FROM CENTER OF VEHICLE | 600mm ABOVE GROUND | PATTERN ⌐ 1777mm AHEAD | WHITE | DISPLAY FORWARD LEFT AT 26.57° |
| 100Ra | 500mm TO THE RIGHT FROM CENTER OF VEHICLE | 600mm ABOVE GROUND | PATTERN ⌐ 2221mm AHEAD | ORANGE | DISPLAY FORWARD RIGHT AT 45° |
| 100Rb | 450mm TO THE RIGHT FROM CENTER OF VEHICLE | 600mm ABOVE GROUND | PATTERN ⌐ 1777mm AHEAD | WHITE | DISPLAY FORWARD RIGHT AT 26.57° |

| x'(mm) | y'(mm) | z'(mm) | l' | m' | n' |
|---:|---:|---:|---:|---:|---:|
| -12 | 0 | 2.141909 | 0.265118 | -0.68795 | 0.675597 |
| -9.62963 | 0 | 1.306195 | 0.21986 | -0.67452 | 0.704761 |
| -7.25926 | 0 | 0.666974 | 0.165266 | -0.66342 | 0.729773 |
| -4.88889 | 0 | 0.234987 | 0.104389 | -0.65322 | 0.749936 |
| -2.51852 | 0 | 0.008567 | 0.039222 | -0.64323 | 0.76467 |
| -0.14815 | 0 | -0.0062 | -0.03013 | -0.63402 | 0.77273 |
| -12 | 1.6 | 3.920459 | 0.271203 | -0.74257 | 0.6124 |
| -9.62963 | 1.6 | 2.977947 | 0.22609 | -0.73214 | 0.642541 |
| -7.25926 | 1.6 | 2.255555 | 0.171768 | -0.72371 | 0.668383 |
| -4.88889 | 1.6 | 1.755896 | 0.113605 | -0.71474 | 0.690103 |
| -2.51852 | 1.6 | 1.47765 | 0.049196 | -0.70635 | 0.706151 |
| -0.14815 | 1.6 | 1.426548 | -0.01909 | -0.69805 | 0.71579 |
| -12 | 3.2 | 6.052283 | 0.273991 | -0.79413 | 0.542482 |
| -9.62963 | 3.2 | 4.979025 | 0.229488 | -0.78658 | 0.573264 |
| -7.25926 | 3.2 | 4.15453 | 0.178057 | -0.7798 | 0.600171 |
| -4.88889 | 3.2 | 3.570289 | 0.121784 | -0.77263 | 0.623065 |
| -2.51852 | 3.2 | 3.228699 | 0.059267 | -0.76572 | 0.640434 |
| -0.14815 | 3.2 | 3.132665 | -0.00787 | -0.75855 | 0.651565 |
| -12 | 4.8 | 8.652644 | 0.273305 | -0.84151 | 0.466005 |
| -9.62963 | 4.8 | 7.40954 | 0.230451 | -0.8364 | 0.497326 |
| -7.25926 | 4.8 | 6.447269 | 0.183631 | -0.83064 | 0.525662 |
| -4.88889 | 4.8 | 5.754523 | 0.129338 | -0.82541 | 0.549525 |
| -2.51852 | 4.8 | 5.331161 | 0.069457 | -0.81992 | 0.568252 |
| -0.14815 | 4.8 | 5.178479 | 0.002403 | -0.81435 | 0.580374 |
| -12 | 6.4 | 11.91497 | 0.269323 | -0.88366 | 0.38289 |
| -9.62963 | 6.4 | 10.42496 | 0.231757 | -0.87936 | 0.415946 |
| -7.25926 | 6.4 | 9.266708 | 0.18748 | -0.87555 | 0.445271 |
| -4.88889 | 6.4 | 8.424472 | 0.136365 | -0.87194 | 0.470243 |
| -2.51852 | 6.4 | 7.887752 | 0.079892 | -0.86781 | 0.490437 |
| -0.14815 | 6.4 | 7.662402 | 0.012617 | -0.86406 | 0.503227 |
| -12 | 8 | 16.2022 | 0.266002 | -0.91819 | 0.293543 |
| -9.62963 | 8 | 14.29993 | 0.231599 | -0.91563 | 0.328604 |
| -7.25926 | 8 | 12.83813 | 0.190965 | -0.91343 | 0.359416 |
| -4.88889 | 8 | 11.76916 | 0.143957 | -0.91124 | 0.385906 |
| -2.51852 | 8 | 11.06487 | 0.089401 | -0.90895 | 0.407198 |
| -0.14815 | 8 | 10.73609 | 0.025541 | -0.9065 | 0.421434 |

| x'(mm) | y'(mm) | z'(mm) | l' | m' | n' |
|---|---|---|---|---|---|
| 0.148148 | 0 | -0.0062 | 0.03013 | -0.63402 | 0.77273 |
| 2.518519 | 0 | 0.008567 | -0.03922 | -0.64323 | 0.76467 |
| 4.888889 | 0 | 0.234987 | -0.10439 | -0.65322 | 0.749936 |
| 7.259259 | 0 | 0.666974 | -0.16527 | -0.66342 | 0.729773 |
| 9.62963 | 0 | 1.306195 | -0.21986 | -0.67452 | 0.704761 |
| 12 | 0 | 2.141909 | -0.26512 | -0.68795 | 0.675597 |
| 0.148148 | 1.6 | 1.426548 | 0.019094 | -0.69805 | 0.71579 |
| 2.518519 | 1.6 | 1.47765 | -0.0492 | -0.70635 | 0.706151 |
| 4.888889 | 1.6 | 1.755896 | -0.11361 | -0.71474 | 0.690103 |
| 7.259259 | 1.6 | 2.255555 | -0.17177 | -0.72371 | 0.668383 |
| 9.62963 | 1.6 | 2.977947 | -0.22609 | -0.73214 | 0.642541 |
| 12 | 1.6 | 3.920459 | -0.2712 | -0.74257 | 0.6124 |
| 0.148148 | 3.2 | 3.132665 | 0.007873 | -0.75855 | 0.651565 |
| 2.518519 | 3.2 | 3.228699 | -0.05927 | -0.76572 | 0.640434 |
| 4.888889 | 3.2 | 3.570289 | -0.12178 | -0.77263 | 0.623065 |
| 7.259259 | 3.2 | 4.15453 | -0.17806 | -0.7798 | 0.600171 |
| 9.62963 | 3.2 | 4.979025 | -0.22949 | -0.78658 | 0.573264 |
| 12 | 3.2 | 6.052283 | -0.27399 | -0.79413 | 0.542482 |
| 0.148148 | 4.8 | 5.178479 | -0.0024 | -0.81435 | 0.580374 |
| 2.518519 | 4.8 | 5.331161 | -0.06946 | -0.81992 | 0.568252 |
| 4.888889 | 4.8 | 5.754523 | -0.12934 | -0.82541 | 0.549525 |
| 7.259259 | 4.8 | 6.447269 | -0.18363 | -0.83064 | 0.525662 |
| 9.62963 | 4.8 | 7.40954 | -0.23045 | -0.8364 | 0.497326 |
| 12 | 4.8 | 8.652644 | -0.27331 | -0.84151 | 0.466005 |
| 0.148148 | 6.4 | 7.662402 | -0.01262 | -0.86406 | 0.503227 |
| 2.518519 | 6.4 | 7.887752 | -0.07989 | -0.86781 | 0.490437 |
| 4.888889 | 6.4 | 8.424472 | -0.13637 | -0.87194 | 0.470243 |
| 7.259259 | 6.4 | 9.266708 | -0.18748 | -0.87555 | 0.445271 |
| 9.62963 | 6.4 | 10.42496 | -0.23176 | -0.87936 | 0.415946 |
| 12 | 6.4 | 11.91497 | -0.26932 | -0.88366 | 0.38289 |
| 0.148148 | 8 | 10.73609 | -0.02554 | -0.9065 | 0.421434 |
| 2.518519 | 8 | 11.06487 | -0.0894 | -0.90895 | 0.407198 |
| 4.888889 | 8 | 11.76916 | -0.14396 | -0.91124 | 0.385906 |
| 7.259259 | 8 | 12.83813 | -0.19097 | -0.91343 | 0.359416 |
| 9.62963 | 8 | 14.29993 | -0.2316 | -0.91563 | 0.328604 |
| 12 | 8 | 16.2022 | -0.266 | -0.91819 | 0.293543 |

| x'(mm) | y'(mm) | z'(mm) | l' | m' | n' |
|---|---|---|---|---|---|
| -15 | 0 | 2.930442 | 0.315429 | -0.30843 | 0.897428 |
| -11.6418 | 0 | 1.86704 | 0.257822 | -0.30804 | 0.915773 |
| -8.28353 | 0 | 1.04109 | 0.195704 | -0.30785 | 0.93109 |
| -4.92529 | 0 | 0.456072 | 0.130228 | -0.30774 | 0.942517 |
| -1.56706 | 0 | 0.11299 | 0.062877 | -0.3076 | 0.949435 |
| 1.787874 | 0 | 0.01035 | -0.00461 | -0.30741 | 0.951565 |
| -15 | 6 | 5.536649 | 0.308363 | -0.44549 | 0.840509 |
| -11.6418 | 6 | 4.426243 | 0.25234 | -0.44749 | 0.857951 |
| -8.28353 | 6 | 3.562852 | 0.191876 | -0.44918 | 0.872595 |
| -4.92529 | 6 | 2.950136 | 0.128092 | -0.4503 | 0.88364 |
| -1.56706 | 6 | 2.589143 | 0.062432 | -0.45068 | 0.890499 |
| 1.788332 | 6 | 2.478278 | -0.00341 | -0.45024 | 0.892901 |
| -15 | 12 | 9.368603 | 0.293643 | -0.57626 | 0.762692 |
| -11.6418 | 12 | 8.202322 | 0.240682 | -0.57996 | 0.778277 |
| -8.28353 | 12 | 7.293255 | 0.183583 | -0.58301 | 0.791455 |
| -4.92529 | 12 | 6.645219 | 0.123383 | -0.58505 | 0.801558 |
| -1.56706 | 12 | 6.259296 | 0.061408 | -0.58585 | 0.808088 |
| 1.7867 | 12 | 6.133811 | -0.00077 | -0.58532 | 0.8108 |
| -15 | 18 | 14.72379 | 0.271888 | -0.69429 | 0.666367 |
| -11.6418 | 18 | 13.48616 | 0.2234 | -0.69875 | 0.679592 |
| -8.28353 | 18 | 12.51768 | 0.171237 | -0.70241 | 0.69087 |
| -4.92529 | 18 | 11.82227 | 0.116317 | -0.70491 | 0.699697 |
| -1.56706 | 18 | 11.40102 | 0.059791 | -0.70599 | 0.705695 |
| 1.779642 | 18 | 11.2522 | 0.003142 | -0.70554 | 0.708659 |
| -15 | 24 | 22.07298 | 0.244239 | -0.79484 | 0.555492 |
| -11.6418 | 24 | 20.73684 | 0.201466 | -0.79916 | 0.56635 |
| -8.28353 | 24 | 19.68551 | 0.155555 | -0.80273 | 0.575693 |
| -4.92529 | 24 | 18.92283 | 0.107281 | -0.80523 | 0.583178 |
| -1.56706 | 24 | 18.44978 | 0.057597 | -0.80641 | 0.588543 |
| 1.760326 | 24 | 18.26482 | 0.008015 | -0.80618 | 0.591618 |
| -15 | 30 | 32.30077 | 0.211559 | -0.87632 | 0.432781 |
| -11.6418 | 30 | 30.8116 | 0.175644 | -0.87981 | 0.441685 |
| -8.28353 | 30 | 29.63146 | 0.137072 | -0.88275 | 0.449406 |
| -4.92529 | 30 | 28.76366 | 0.096518 | -0.88487 | 0.455723 |
| -1.56706 | 30 | 28.20863 | 0.05474 | -0.88598 | 0.460475 |
| 1.711983 | 30 | 27.96619 | 0.013562 | -0.88599 | 0.463515 |

| x'(mm) | y'(mm) | z'(mm) | l' | m' | n' |
|---|---|---|---|---|---|
| 2.676814 | 0 | -0.04941 | -0.04332 | -0.31109 | 0.949393 |
| 5.138824 | 0 | 0.065056 | -0.06049 | -0.31143 | 0.948343 |
| 7.604118 | 0 | 0.266397 | -0.09386 | -0.31164 | 0.945552 |
| 10.06941 | 0 | 0.55296 | -0.12521 | -0.31203 | 0.941784 |
| 12.53471 | 0 | 0.919412 | -0.15271 | -0.31271 | 0.937494 |
| 15 | 0 | 1.3432 | -0.1682 | -0.31416 | 0.934349 |
| 2.676357 | 6 | 2.431427 | -0.04375 | -0.44909 | 0.892416 |
| 5.138824 | 6 | 2.549496 | -0.0582 | -0.4491 | 0.891586 |
| 7.604118 | 6 | 2.756139 | -0.09071 | -0.4484 | 0.889221 |
| 10.06941 | 6 | 3.05086 | -0.12123 | -0.44761 | 0.885972 |
| 12.53471 | 6 | 3.428331 | -0.14895 | -0.44689 | 0.882103 |
| 15 | 6 | 3.866733 | -0.1644 | -0.44729 | 0.879149 |
| 2.677978 | 12 | 6.04319 | -0.04434 | -0.57606 | 0.816207 |
| 5.138824 | 12 | 6.163458 | -0.05332 | -0.57597 | 0.815731 |
| 7.604118 | 12 | 6.371249 | -0.08376 | -0.57467 | 0.81409 |
| 10.06941 | 12 | 6.669154 | -0.11239 | -0.57309 | 0.811754 |
| 12.53471 | 12 | 7.051895 | -0.13981 | -0.57126 | 0.808778 |
| 15 | 12 | 7.501543 | -0.15451 | -0.57086 | 0.80638 |
| 2.684985 | 18 | 10.97183 | -0.0445 | -0.68569 | 0.726532 |
| 5.138824 | 18 | 11.09354 | -0.0465 | -0.68577 | 0.726333 |
| 7.604118 | 18 | 11.298 | -0.07382 | -0.68428 | 0.725476 |
| 10.06941 | 18 | 11.59365 | -0.09943 | -0.68243 | 0.724156 |
| 12.53471 | 18 | 11.97524 | -0.12444 | -0.68024 | 0.72235 |
| 15 | 18 | 12.43267 | -0.14013 | -0.67912 | 0.720523 |
| 2.70414 | 24 | 17.46633 | -0.04326 | -0.77522 | 0.630213 |
| 5.138824 | 24 | 17.59041 | -0.03808 | -0.77562 | 0.630052 |
| 7.604118 | 24 | 17.78674 | -0.06215 | -0.77423 | 0.629844 |
| 10.06941 | 24 | 18.07473 | -0.08452 | -0.77252 | 0.629338 |
| 12.53471 | 24 | 18.44964 | -0.10612 | -0.77052 | 0.62852 |
| 15 | 24 | 18.90628 | -0.12476 | -0.76852 | 0.627542 |
| 2.751975 | 30 | 25.87411 | -0.04007 | -0.84508 | 0.533139 |
| 5.138824 | 30 | 26.00446 | -0.02868 | -0.84579 | 0.532749 |
| 7.604118 | 30 | 26.18706 | -0.04967 | -0.84467 | 0.532978 |
| 10.06941 | 30 | 26.46188 | -0.06914 | -0.84329 | 0.532996 |
| 12.53471 | 30 | 26.82381 | -0.08798 | -0.84162 | 0.532849 |
| 15 | 30 | 27.26833 | -0.104 | -0.83996 | 0.532592 |

| x'(mm) | y'(mm) | z'(mm) | l' | m' | n' |
|---|---|---|---|---|---|
| -15 | 0 | 2.801817 | 0.299231 | -0.3405 | 0.891358 |
| -11.7 | 0 | 1.801049 | 0.245599 | -0.33906 | 0.90814 |
| -8.4 | 0 | 1.018976 | 0.187486 | -0.33808 | 0.922252 |
| -5.1 | 0 | 0.460553 | 0.125966 | -0.33745 | 0.932879 |
| -1.8 | 0 | 0.128114 | 0.06244 | -0.33707 | 0.939407 |
| 1.5 | 0 | 0.021301 | -0.00149 | -0.33691 | 0.941537 |
| -15 | 6 | 5.676564 | 0.292665 | -0.48245 | 0.825585 |
| -11.7 | 6 | 4.619506 | 0.240543 | -0.48324 | 0.841797 |
| -8.4 | 6 | 3.792824 | 0.183934 | -0.48404 | 0.855496 |
| -5.1 | 6 | 3.201787 | 0.123891 | -0.48462 | 0.865909 |
| -1.8 | 6 | 2.848862 | 0.061804 | -0.48478 | 0.872448 |
| 1.499696 | 6 | 2.733624 | -0.00072 | -0.48446 | 0.874815 |
| -15 | 12 | 9.90992 | 0.277819 | -0.61743 | 0.735931 |
| -11.7 | 12 | 8.783493 | 0.228752 | -0.61989 | 0.750605 |
| -8.4 | 12 | 7.900842 | 0.175433 | -0.62205 | 0.763072 |
| -5.1 | 12 | 7.267488 | 0.118852 | -0.62357 | 0.772682 |
| -1.8 | 12 | 6.885995 | 0.060303 | -0.6242 | 0.778935 |
| 1.496627 | 12 | 6.755864 | 0.001337 | -0.62382 | 0.781566 |
| -15 | 18 | 15.93519 | 0.254097 | -0.74055 | 0.622113 |
| -11.7 | 18 | 14.71519 | 0.209795 | -0.7437 | 0.634739 |
| -8.4 | 18 | 13.75611 | 0.161671 | -0.74644 | 0.645518 |
| -5.1 | 18 | 13.06358 | 0.110611 | -0.74839 | 0.653971 |
| -1.8 | 18 | 12.64012 | 0.05775 | -0.74929 | 0.659724 |
| 1.487323 | 18 | 12.48516 | 0.004592 | -0.749 | 0.662559 |
| -15 | 24 | 24.57031 | 0.22206 | -0.84484 | 0.486757 |
| -11.7 | 24 | 23.20589 | 0.184201 | -0.84773 | 0.497422 |
| -8.4 | 24 | 22.12847 | 0.143055 | -0.85026 | 0.506545 |
| -5.1 | 24 | 21.34319 | 0.099376 | -0.85212 | 0.513823 |
| -1.8 | 24 | 20.85217 | 0.054104 | -0.85306 | 0.519009 |
| 1.460881 | 24 | 20.65492 | 0.008846 | -0.85294 | 0.521931 |
| -15 | 30 | 37.80629 | 0.180357 | -0.92776 | 0.326692 |
| -11.7 | 30 | 36.15367 | 0.15104 | -0.92958 | 0.336262 |
| -8.4 | 30 | 34.84284 | 0.118883 | -0.93127 | 0.344398 |
| -5.1 | 30 | 33.87566 | 0.084575 | -0.93257 | 0.350935 |
| -1.8 | 30 | 33.25166 | 0.048857 | -0.93331 | 0.355744 |
| 1.381922 | 30 | 32.9721 | 0.013869 | -0.93336 | 0.358687 |

| x'(mm) | y'(mm) | z'(mm) | l' | m' | n' |
|---|---|---|---|---|---|
| 2.382353 | 0 | 0.055559 | -0.0563 | -0.33642 | 0.940028 |
| 4.905882 | 0 | 0.183613 | -0.06169 | -0.33721 | 0.939408 |
| 7.429412 | 0 | 0.395778 | -0.09567 | -0.33773 | 0.936367 |
| 9.952941 | 0 | 0.697611 | -0.12742 | -0.33855 | 0.932282 |
| 12.47647 | 0 | 1.083527 | -0.15651 | -0.33968 | 0.927429 |
| 15 | 0 | 1.547023 | -0.18268 | -0.34115 | 0.922088 |
| 2.382655 | 6 | 2.754073 | -0.0554 | -0.4792 | 0.875958 |
| 4.905882 | 6 | 2.888372 | -0.05988 | -0.47976 | 0.875355 |
| 7.429412 | 6 | 3.10964 | -0.09304 | -0.4794 | 0.872651 |
| 9.952941 | 6 | 3.424699 | -0.124 | -0.47906 | 0.868979 |
| 12.47647 | 6 | 3.827684 | -0.15237 | -0.47884 | 0.864576 |
| 15 | 6 | 4.311798 | -0.17791 | -0.47883 | 0.859689 |
| 2.385701 | 12 | 6.698598 | -0.05314 | -0.61198 | 0.789083 |
| 4.905882 | 12 | 6.838835 | -0.0553 | -0.61243 | 0.788588 |
| 7.429412 | 12 | 7.066289 | -0.08636 | -0.61145 | 0.786554 |
| 9.952941 | 12 | 7.391162 | -0.11543 | -0.61029 | 0.783722 |
| 12.47647 | 12 | 7.807527 | -0.1422 | -0.60908 | 0.78026 |
| 15 | 12 | 8.308526 | -0.16639 | -0.60795 | 0.776346 |
| 2.39493 | 18 | 12.17794 | -0.04987 | -0.72736 | 0.684443 |
| 4.905882 | 18 | 12.32456 | -0.04842 | -0.72785 | 0.684028 |
| 7.429412 | 18 | 12.55495 | -0.07617 | -0.72665 | 0.682769 |
| 9.952941 | 18 | 12.8859 | -0.10238 | -0.72517 | 0.68092 |
| 12.47647 | 18 | 13.31169 | -0.12667 | -0.72352 | 0.678578 |
| 15 | 18 | 13.82567 | -0.14882 | -0.72187 | 0.675842 |
| 2.421116 | 24 | 19.63993 | -0.04557 | -0.82128 | 0.5687 |
| 4.905882 | 24 | 19.79514 | -0.03985 | -0.82191 | 0.568221 |
| 7.429412 | 24 | 20.02519 | -0.06357 | -0.82084 | 0.567607 |
| 9.952941 | 24 | 20.35877 | -0.08614 | -0.81949 | 0.566588 |
| 12.47647 | 24 | 20.79057 | -0.10727 | -0.81794 | 0.565209 |
| 15 | 24 | 21.31441 | -0.12674 | -0.81633 | 0.563511 |
| 2.499064 | 30 | 29.84945 | -0.04011 | -0.8933 | 0.44767 |
| 4.905882 | 30 | 30.01821 | -0.03083 | -0.89402 | 0.446962 |
| 7.429412 | 30 | 30.24523 | -0.04982 | -0.89328 | 0.446723 |
| 9.952941 | 30 | 30.57945 | -0.06829 | -0.89232 | 0.446214 |
| 12.47647 | 30 | 31.01599 | -0.08578 | -0.89119 | 0.445444 |
| 15 | 30 | 31.54934 | -0.10209 | -0.88998 | 0.444421 |

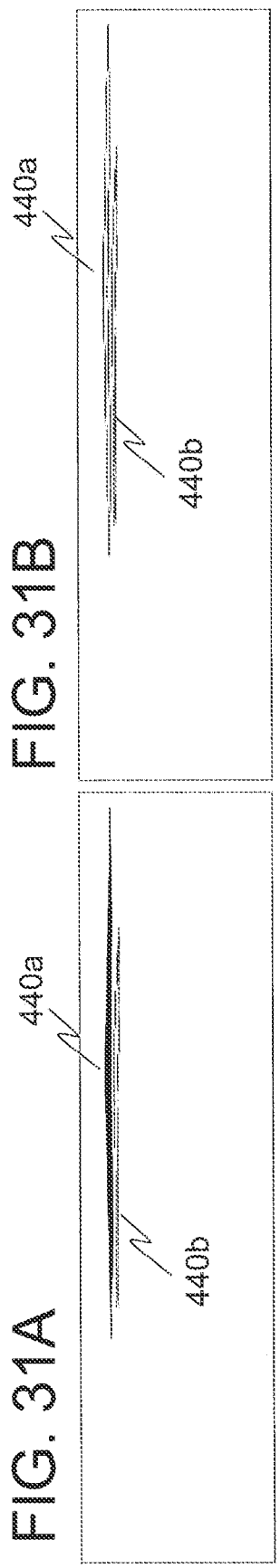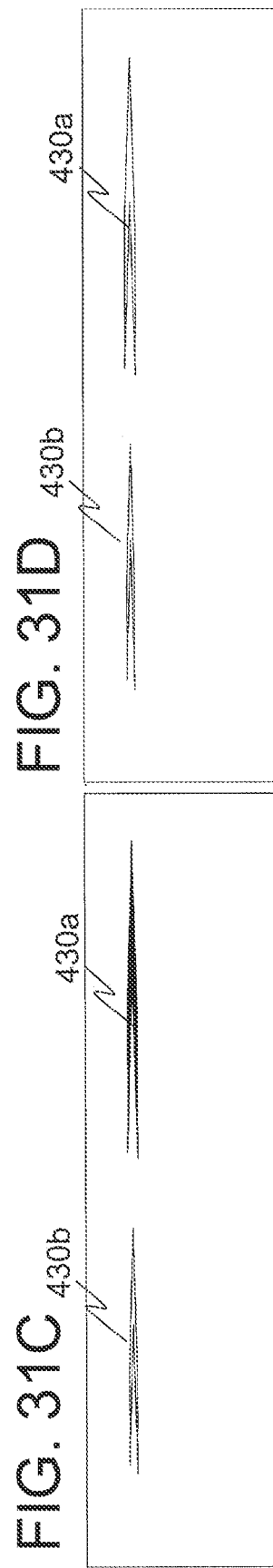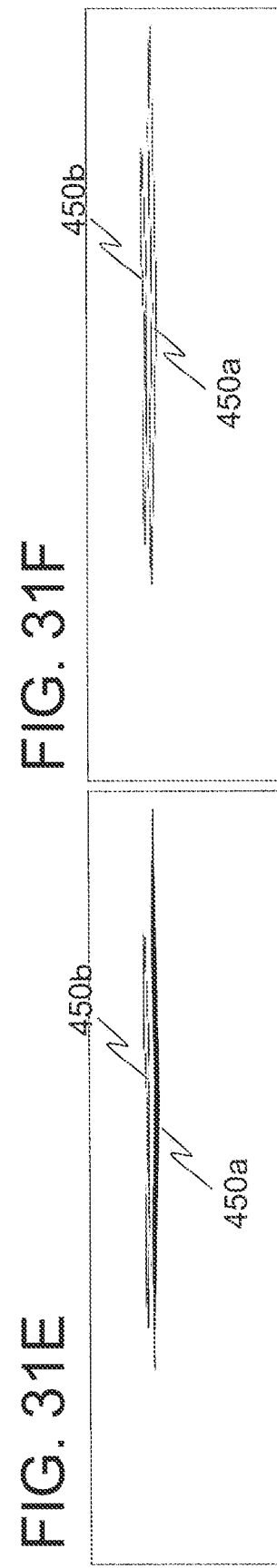

| x' | y' | z' | l' | m' | n' |
|---:|---:|---:|---:|---:|---:|
| -15 | 0 | 1.460283 | 0.184935 | -0.3702 | 0.910358 |
| -12.9222 | 0 | 1.06831 | 0.159632 | -0.36499 | 0.917225 |
| -10.8444 | 0 | 0.738361 | 0.132256 | -0.3602 | 0.923451 |
| -8.76667 | 0 | 0.475802 | 0.101287 | -0.35629 | 0.92887 |
| -6.68889 | 0 | 0.279836 | 0.075723 | -0.35075 | 0.933403 |
| -4.614 | 0 | 0.139286 | 0.050338 | -0.34513 | 0.937204 |
| -15 | 6 | 4.428575 | 0.194632 | -0.49729 | 0.845472 |
| -12.9222 | 6 | 3.982816 | 0.169346 | -0.4938 | 0.852928 |
| -10.8444 | 6 | 3.606192 | 0.140562 | -0.49114 | 0.859668 |
| -8.76667 | 6 | 3.299991 | 0.115634 | -0.48688 | 0.86578 |
| -6.68889 | 6 | 3.05149 | 0.091713 | -0.48197 | 0.871372 |
| -4.62695 | 6 | 2.865632 | 0.065644 | -0.47757 | 0.876139 |
| -15 | 12 | 8.594931 | 0.19777 | -0.61615 | 0.762395 |
| -12.9222 | 12 | 8.093315 | 0.171647 | -0.61485 | 0.769736 |
| -10.8444 | 12 | 7.663927 | 0.149591 | -0.61167 | 0.77684 |
| -8.76667 | 12 | 7.29359 | 0.128278 | -0.60779 | 0.783666 |
| -6.68889 | 12 | 6.986498 | 0.104337 | -0.60431 | 0.789885 |
| -4.64486 | 12 | 6.749086 | 0.079312 | -0.60086 | 0.795407 |
| -15 | 18 | 14.23804 | 0.193467 | -0.72102 | 0.665355 |
| -12.9222 | 18 | 13.66485 | 0.176289 | -0.71832 | 0.673007 |
| -10.8444 | 18 | 13.15182 | 0.157697 | -0.71561 | 0.680469 |
| -8.76667 | 18 | 12.70433 | 0.136933 | -0.71315 | 0.687507 |
| -6.68889 | 18 | 12.32513 | 0.114938 | -0.71059 | 0.69416 |
| -4.66998 | 18 | 12.03395 | 0.085662 | -0.70957 | 0.699409 |
| -15 | 24 | 21.73658 | 0.195245 | -0.80387 | 0.561852 |
| -12.9222 | 24 | 21.0474 | 0.179706 | -0.80212 | 0.569485 |
| -10.8444 | 24 | 20.42736 | 0.162507 | -0.80052 | 0.576852 |
| -8.76667 | 24 | 19.87817 | 0.143831 | -0.79891 | 0.583994 |
| -6.68889 | 24 | 19.41433 | 0.117718 | -0.79869 | 0.590119 |
| -4.7081 | 24 | 19.05991 | 0.092531 | -0.79802 | 0.595489 |
| -15 | 30 | 31.64489 | 0.19485 | -0.86775 | 0.457218 |
| -12.9222 | 30 | 30.79654 | 0.181469 | -0.86669 | 0.464672 |
| -10.8444 | 30 | 30.0243 | 0.16596 | -0.86591 | 0.471874 |
| -8.76667 | 30 | 29.34738 | 0.143972 | -0.86632 | 0.47829 |
| -6.68889 | 30 | 28.77042 | 0.121399 | -0.8664 | 0.484368 |
| -4.77014 | 30 | 28.33311 | 0.101805 | -0.86586 | 0.489824 |

| x' | y' | z' | l' | m' | n' |
|---|---|---|---|---|---|
| -3.77434 | 0 | 0.170843 | 0.05832 | -0.3946 | 0.917 |
| -2.26667 | 0 | 0.093973 | 0.035199 | -0.39425 | 0.918328 |
| -0.75556 | 0 | 0.055325 | 0.011762 | -0.39408 | 0.919002 |
| 0.755556 | 0 | 0.055325 | -0.01176 | -0.39408 | 0.919002 |
| 2.266667 | 0 | 0.093973 | -0.0352 | -0.39425 | 0.918328 |
| 3.77512 | 0 | 0.170896 | -0.05834 | -0.3946 | 0.916999 |
| -3.75888 | 6 | 3.309046 | 0.057777 | -0.52815 | 0.847182 |
| -2.26667 | 6 | 3.227334 | 0.035018 | -0.52813 | 0.84844 |
| -0.75556 | 6 | 3.185717 | 0.011702 | -0.52813 | 0.849086 |
| 0.755556 | 6 | 3.185717 | -0.0117 | -0.52813 | 0.849086 |
| 2.266667 | 6 | 3.227334 | -0.03502 | -0.52813 | 0.84844 |
| 3.762893 | 6 | 3.30932 | -0.05784 | -0.52815 | 0.847178 |
| -3.73744 | 12 | 7.746431 | 0.054649 | -0.65305 | 0.755345 |
| -2.26667 | 12 | 7.660811 | 0.033304 | -0.65329 | 0.756371 |
| -0.75556 | 12 | 7.616413 | 0.011129 | -0.65343 | 0.756909 |
| 0.755556 | 12 | 7.616413 | -0.01113 | -0.65343 | 0.756909 |
| 2.266667 | 12 | 7.660811 | -0.0333 | -0.65329 | 0.756371 |
| 3.742007 | 12 | 7.746762 | -0.05472 | -0.65304 | 0.755341 |
| -3.7073 | 18 | 13.81621 | 0.049091 | -0.76015 | 0.647894 |
| -2.26667 | 18 | 13.72812 | 0.030145 | -0.76052 | 0.648612 |
| -0.75556 | 18 | 13.68126 | 0.010071 | -0.76073 | 0.648997 |
| 0.755556 | 18 | 13.68126 | -0.01007 | -0.76073 | 0.648997 |
| 2.266667 | 18 | 13.72812 | -0.03015 | -0.76052 | 0.648612 |
| 3.712794 | 18 | 13.81663 | -0.04916 | -0.76015 | 0.647891 |
| -3.66139 | 24 | 22.03902 | 0.041655 | -0.84606 | 0.531453 |
| -2.26667 | 24 | 21.9504 | 0.025881 | -0.84642 | 0.531892 |
| -0.75556 | 24 | 21.90134 | 0.008644 | -0.84662 | 0.532136 |
| 0.755556 | 24 | 21.90134 | -0.00864 | -0.84662 | 0.532136 |
| 2.266667 | 24 | 21.9504 | -0.02588 | -0.84642 | 0.531892 |
| 3.668365 | 24 | 22.03956 | -0.04173 | -0.84606 | 0.531451 |
| -3.58616 | 30 | 33.26736 | 0.03333 | -0.90933 | 0.414749 |
| -2.26667 | 30 | 33.18073 | 0.021126 | -0.90958 | 0.414999 |
| -0.75556 | 30 | 33.12942 | 0.007054 | -0.90973 | 0.415146 |
| 0.755556 | 30 | 33.12942 | -0.00705 | -0.90973 | 0.415146 |
| 2.266667 | 30 | 33.18073 | -0.02113 | -0.90958 | 0.414999 |
| 3.595481 | 30 | 33.26811 | -0.03342 | -0.90932 | 0.414747 |

| x' | y' | z' | l' | m' | n' |
|---|---|---|---|---|---|
| -3.77434 | 0 | 0.170843 | 0.05832 | -0.3946 | 0.917 |
| -2.26667 | 0 | 0.093973 | 0.035199 | -0.39425 | 0.918328 |
| -0.75556 | 0 | 0.055325 | 0.011762 | -0.39408 | 0.919002 |
| 0.755556 | 0 | 0.055325 | -0.01176 | -0.39408 | 0.919002 |
| 2.266667 | 0 | 0.093973 | -0.0352 | -0.39425 | 0.918328 |
| 3.77512 | 0 | 0.170896 | -0.05834 | -0.3946 | 0.916999 |
| -3.75888 | 6 | 3.309046 | 0.057777 | -0.52815 | 0.847182 |
| -2.26667 | 6 | 3.227334 | 0.035018 | -0.52813 | 0.84844 |
| -0.75556 | 6 | 3.185717 | 0.011702 | -0.52813 | 0.849086 |
| 0.755556 | 6 | 3.185717 | -0.0117 | -0.52813 | 0.849086 |
| 2.266667 | 6 | 3.227334 | -0.03502 | -0.52813 | 0.84844 |
| 3.762893 | 6 | 3.30932 | -0.05784 | -0.52815 | 0.847178 |
| -3.73744 | 12 | 7.746431 | 0.054649 | -0.65305 | 0.755345 |
| -2.26667 | 12 | 7.660811 | 0.033304 | -0.65329 | 0.756371 |
| -0.75556 | 12 | 7.616413 | 0.011129 | -0.65343 | 0.756909 |
| 0.755556 | 12 | 7.616413 | -0.01113 | -0.65343 | 0.756909 |
| 2.266667 | 12 | 7.660811 | -0.0333 | -0.65329 | 0.756371 |
| 3.742007 | 12 | 7.746762 | -0.05472 | -0.65304 | 0.755341 |
| -3.7073 | 18 | 13.81621 | 0.049091 | -0.76015 | 0.647894 |
| -2.26667 | 18 | 13.72812 | 0.030145 | -0.76052 | 0.648612 |
| -0.75556 | 18 | 13.68126 | 0.010071 | -0.76073 | 0.648997 |
| 0.755556 | 18 | 13.68126 | -0.01007 | -0.76073 | 0.648997 |
| 2.266667 | 18 | 13.72812 | -0.03015 | -0.76052 | 0.648612 |
| 3.712794 | 18 | 13.81663 | -0.04916 | -0.76015 | 0.647891 |
| -3.66139 | 24 | 22.03902 | 0.041655 | -0.84606 | 0.531453 |
| -2.26667 | 24 | 21.9504 | 0.025881 | -0.84642 | 0.531892 |
| -0.75556 | 24 | 21.90134 | 0.008644 | -0.84662 | 0.532136 |
| 0.755556 | 24 | 21.90134 | -0.00864 | -0.84662 | 0.532136 |
| 2.266667 | 24 | 21.9504 | -0.02588 | -0.84642 | 0.531892 |
| 3.668365 | 24 | 22.03956 | -0.04173 | -0.84606 | 0.531451 |
| -3.58616 | 30 | 33.26736 | 0.03333 | -0.90933 | 0.414749 |
| -2.26667 | 30 | 33.18073 | 0.021126 | -0.90958 | 0.414999 |
| -0.75556 | 30 | 33.12942 | 0.007054 | -0.90973 | 0.415146 |
| 0.755556 | 30 | 33.12942 | -0.00705 | -0.90973 | 0.415146 |
| 2.266667 | 30 | 33.18073 | -0.02113 | -0.90958 | 0.414999 |
| 3.595481 | 30 | 33.26811 | -0.03342 | -0.90932 | 0.414747 |

| x'(mm) | y'(mm) | z'(mm) | l' | m' | n' |
|---|---|---|---|---|---|
| -13 | 0 | 1.484891 | 0.172813 | -0.51893 | 0.837165 |
| -10.4658 | 0 | 1.000329 | 0.147971 | -0.51105 | 0.846719 |
| -7.93165 | 0 | 0.606976 | 0.115186 | -0.50522 | 0.855268 |
| -5.39747 | 0 | 0.32084 | 0.078063 | -0.49994 | 0.862536 |
| -2.86329 | 0 | 0.152431 | 0.036401 | -0.49526 | 0.867982 |
| -0.32911 | 0 | 0.112585 | -0.01126 | -0.49132 | 0.870906 |
| -13 | 3 | 3.531173 | 0.17958 | -0.58866 | 0.788185 |
| -10.4658 | 3 | 2.997663 | 0.152953 | -0.58291 | 0.798008 |
| -7.93165 | 3 | 2.564948 | 0.12026 | -0.57843 | 0.806822 |
| -5.39747 | 3 | 2.24458 | 0.083671 | -0.57428 | 0.814372 |
| -2.86329 | 3 | 2.047942 | 0.043045 | -0.57037 | 0.820263 |
| -0.32911 | 3 | 1.98935 | -0.00624 | -0.56748 | 0.823365 |
| -13 | 6 | 5.982257 | 0.183447 | -0.65365 | 0.73423 |
| -10.4658 | 6 | 5.399091 | 0.155804 | -0.64979 | 0.743976 |
| -7.93165 | 6 | 4.923831 | 0.12433 | -0.64634 | 0.752855 |
| -5.39747 | 6 | 4.56709 | 0.088058 | -0.64333 | 0.760508 |
| -2.86329 | 6 | 4.339693 | 0.047642 | -0.64035 | 0.766604 |
| -0.32911 | 6 | 4.262285 | -0.00083 | -0.63808 | 0.769967 |
| -13 | 9 | 8.893407 | 0.184095 | -0.71316 | 0.676397 |
| -10.4658 | 9 | 8.257489 | 0.157165 | -0.71049 | 0.685936 |
| -7.93165 | 9 | 7.735108 | 0.126572 | -0.70806 | 0.694721 |
| -5.39747 | 9 | 7.338232 | 0.091808 | -0.70581 | 0.702426 |
| -2.86329 | 9 | 7.078301 | 0.05054 | -0.704 | 0.708402 |
| -0.32911 | 9 | 6.979142 | 0.00481 | -0.702 | 0.712161 |
| -13 | 12 | 12.33356 | 0.182922 | -0.76619 | 0.616034 |
| -10.4658 | 12 | 11.63777 | 0.15739 | -0.76431 | 0.625352 |
| -7.93165 | 12 | 11.06239 | 0.127722 | -0.76279 | 0.633905 |
| -5.39747 | 12 | 10.61842 | 0.095014 | -0.76112 | 0.641612 |
| -2.86329 | 12 | 10.32445 | 0.053837 | -0.76027 | 0.64737 |
| -0.32911 | 12 | 10.19817 | 0.010626 | -0.75857 | 0.6515 |
| -13 | 15 | 16.38757 | 0.18082 | -0.8123 | 0.554503 |
| -10.4658 | 15 | 15.62144 | 0.156449 | -0.81115 | 0.563519 |
| -7.93165 | 15 | 14.98422 | 0.128721 | -0.81018 | 0.571871 |
| -5.39747 | 15 | 14.48563 | 0.095842 | -0.8095 | 0.579241 |
| -2.86329 | 15 | 14.15256 | 0.057236 | -0.80902 | 0.584995 |
| -0.32911 | 15 | 13.99358 | 0.014494 | -0.80792 | 0.589116 |

| x'(mm) | y'(mm) | z'(mm) | l' | m' | n' |
|---|---|---|---|---|---|
| 0.329114 | 0 | 0.138016 | 0.011258 | -0.4917 | 0.87069 |
| 2.863291 | 0 | 0.177975 | -0.03647 | -0.49564 | 0.867762 |
| 5.397468 | 0 | 0.346717 | -0.07819 | -0.50032 | 0.862306 |
| 7.931646 | 0 | 0.633387 | -0.11537 | -0.5056 | 0.855023 |
| 10.46582 | 0 | 1.027448 | -0.14818 | -0.51142 | 0.846457 |
| 13 | 0 | 1.512841 | -0.17305 | -0.51931 | 0.836883 |
| 0.329114 | 3 | 2.016843 | 0.006236 | -0.56793 | 0.823056 |
| 2.863291 | 3 | 2.075563 | -0.04311 | -0.57081 | 0.81995 |
| 5.397468 | 3 | 2.272564 | -0.08379 | -0.57472 | 0.814049 |
| 7.931646 | 3 | 2.593512 | -0.12043 | -0.57886 | 0.806486 |
| 10.46582 | 3 | 3.026997 | -0.15316 | -0.58334 | 0.797656 |
| 13 | 3 | 3.561431 | -0.1798 | -0.58908 | 0.787816 |
| 0.329114 | 6 | 4.292587 | 0.000827 | -0.63858 | 0.769558 |
| 2.863291 | 6 | 4.370142 | -0.0477 | -0.64084 | 0.766192 |
| 5.397468 | 6 | 4.597944 | -0.08817 | -0.64381 | 0.760087 |
| 7.931646 | 6 | 4.95532 | -0.12448 | -0.64681 | 0.752422 |
| 10.46582 | 6 | 5.431423 | -0.15599 | -0.65026 | 0.74353 |
| 13 | 6 | 6.015612 | -0.18365 | -0.65411 | 0.73377 |
| 0.329114 | 9 | 7.01318 | -0.00482 | -0.70251 | 0.711654 |
| 2.863291 | 9 | 7.112514 | -0.05059 | -0.70451 | 0.707891 |
| 5.397468 | 9 | 7.372904 | -0.0919 | -0.70631 | 0.701908 |
| 7.931646 | 9 | 7.770488 | -0.1267 | -0.70855 | 0.694194 |
| 10.46582 | 9 | 8.293805 | -0.15732 | -0.71097 | 0.685398 |
| 13 | 9 | 8.930858 | -0.18427 | -0.71364 | 0.675846 |
| 0.329114 | 12 | 10.23711 | -0.01064 | -0.75909 | 0.650902 |
| 2.863291 | 12 | 10.36361 | -0.05388 | -0.76078 | 0.646768 |
| 5.397468 | 12 | 10.65812 | -0.0951 | -0.76162 | 0.641004 |
| 7.931646 | 12 | 11.10289 | -0.12783 | -0.76329 | 0.633289 |
| 10.46582 | 12 | 11.67933 | -0.15752 | -0.76479 | 0.624727 |
| 13 | 12 | 12.3764 | -0.18307 | -0.76666 | 0.615399 |
| 0.329114 | 15 | 14.03891 | -0.0145 | -0.80842 | 0.588435 |
| 2.863291 | 15 | 14.1982 | -0.05728 | -0.80951 | 0.584311 |
| 5.397468 | 15 | 14.5319 | -0.09591 | -0.80999 | 0.578551 |
| 7.931646 | 15 | 15.03144 | -0.12881 | -0.81066 | 0.571176 |
| 10.46582 | 15 | 15.66989 | -0.15656 | -0.81162 | 0.562816 |
| 13 | 15 | 16.4375 | -0.18094 | -0.81276 | 0.553793 |

OPTICAL DEVICE AND DIRECTION DISPLAY DEVICE

TECHNICAL FIELD

The present invention relates to an optical device and a direction display device.

BACKGROUND ART

There has been introduced a technology to be installed in a vehicle for displaying a predetermined shape pattern such as course information on the road surface to the front periphery of the vehicle.

For example, Japanese Unexamined Patent Application Publication No. 2016-107761 discloses the lamp unit for drawing on the road surface, which includes "a light source module which has a plurality of light sources corresponding to the respective drawing patterns arranged and configured to allow lighting on/off individually so as to draw the drawing patterns each being long in the first direction, that is, the road width direction, and being short in the second direction, that is, the direction orthogonal to both the road width direction and the emission axis of the light source on the road at a plurality of parts along the second direction, and an optical system for emitting light that has been emitted from the light sources to the front of the vehicle (excerpted from the abstract)".

Japanese Unexamined Patent Application Publication No. H11-301346 discloses the road surface irradiation device for vehicle, "configured to mount an auxiliary turn signal lamp on the lower surfaces of the front and rear bumpers, which blinks in association with the turn signal lamp mounted on the front and rear sides of the vehicle body so that the road surface is irradiated (excerpted from the abstract)".

Japanese Unexamined Patent Application Publication No. 2016-135629 discloses the lamp unit for road surface drawing, which includes "at least one semiconductor light emitting element as a light source or more, a plurality of diffraction grating parts each different in shape for transmitting the light emitted from the semiconductor light emitting element to the front of the vehicle, and a switching unit for selecting the diffraction grating part which transmits the emitted light (excerpted from the abstract)".

Japanese Unexamined Patent Application Publication No. 2008-04587 discloses the drawing system configured to "draw the warning mark on the road surface along the vehicle travelling direction if the vehicle is predicted to enter into the entry prohibited road where entry of the vehicle is especially prohibited at the intersection ahead of the traveling vehicle based on various types of information derived from the vehicle speed sensor, the steering sensor, and the direction indicator detection sensor (excerpted from the abstract)".

Japanese Unexamined Patent Application Publication No. 2004-136838 discloses the projection device for vehicle, which "includes a headlight, a projector, and a light extraction port. The projector is located between the headlight to the light extraction port on the optical path for projecting the formed optical image on the screen, and located at the position that does not block the optical path from the headlight to the light extraction port while the headlight is functioning so that the predetermined range of the road surface is illuminated (excerpted from the abstract)".

Japanese Unexamined Patent Application Publication No. 2010-262889 discloses the vehicular lamp which is "disposed on the outer periphery of the vehicle body, and projects a predetermined display serving as a sign on the road surface using a plurality of light emitting diodes which are scatteredly arranged as light sources (excerpted from the abstract)".

SUMMARY

Preferably, the above-described display device is capable of displaying the desired pattern while being simply structured. The display of the mark such as an arrow allows notification of an intended behavior to the surroundings, leading to improved safety against a car accident. For example, the technology disclosed in Japanese Unexamined Patent Application Publication No. 2016-107761 or H11-301346 allows only the light source and the reflector to display the mark on the road surface, which calls attention of other vehicles. The technology allows display of the simple mark such as circle, ellipse, and quadrilateral. However, it is difficult to display the complex mark such as the arrow. Therefore, the use of the above-described display device installed in the vehicle may fail to display the direction intending to go.

The technology disclosed in Japanese Unexamined Patent Application Publication No. 2016-135629 is configured to draw the differently shaped drawing patterns on the road surface by selecting the diffraction grating part or the semiconductor light emitting element to be lit. However, it is difficult for the above-described structure to display the complex mark. This may require the complicated mechanism and control. Furthermore, a large number of semiconductor light emitting elements will be necessary for performing the above-described drawing through selection of the semiconductor light emitting element for light emission.

Japanese Unexamined Patent Application Publication No. 2008-04587 discloses the technology that utilizes the laser drawing device for drawing the mark. The technology disclosed in Japanese Unexamined Patent Application Publication No. 2008-04587 allows display of the complex mark. However, the complicated mechanism is required for operating the laser irradiation head, which may cause severe wear of the sliding part.

Japanese Unexamined Patent Application Publication No. 2004-136838 discloses the technology that utilizes the liquid crystal projector for drawing the mark. The liquid crystal projector is configured to allow the light source and the liquid crystal bulb to generate a secondary light source shaped as the desired mark on the liquid crystal bulb, and to draw the mark on the road surface through projection of the secondary light source using the optical system. The technology allows display of the complex mark. However, the light transmittance of the liquid crystal bulb is low. As the liquid crystal bulb is configured to generate the secondary light source of the desired mark by shielding the light in the region of the liquid crystal bulb except the mark, the resultant light utilization efficiency is further deteriorated. In addition to the light source and the liquid crystal bulb, a plurality of optical systems such as a straight advancing light generation optical system and a projection optical system are required, resulting in the complicated structure. It is possible to use DMD (Digital Micromirror Device), and the mark-shaped metal mask for generating the secondary light source instead of the liquid crystal bulb. In the above-described case, the light in the region except the mark is shielded as described above. The resultant light utilization efficiency is deteriorated. It is necessary to use the optical system for guiding the light from the light source to the DMD and the metal mask, and furthermore, the projection optical system. Therefore, the structure is inevitably complicated.

The technology disclosed in Japanese Unexamined Patent Application Publication No. 2010-262889 requires a plurality of light emitting diodes, which may cause the cost increase. The complicated mechanism and control are inevitable for controlling those light emitting diodes. As the light emitting diodes are used to display the single mark, the resultant resolution of the mark is deteriorated.

Another technology has been introduced for making the light source in accordance with the shape of the desired mark to be displayed, for example. Making the light source in accordance with the mark shape may cause the cost increase.

The present invention has been made in consideration of the above-described circumstances. It is an object of the present invention to provide a simply structured optical device configured to exhibit excellent light utilization efficiency, and allow display of a complex pattern at low cost.

An optical device for displaying a condensing mark according to the present invention includes a light source, and an optical element for condensing a light emitted from the light source into a shape of the condensing mark on an irradiated surface. A deflection surface of the optical element is divided into a plurality of regions. The deflection surface is a surface for condensing the light. Lights emitted through the each regions on the deflection surface of the optical element form partial irradiation images on the irradiated surface corresponding to the regions on the deflection surface so that the partial irradiation images are combined into at least one condensing mark on the irradiated surface.

A direction display device installed in a vehicle according to the present invention includes the above-described optical device, and a lamp controller for controlling lighting or blinking of the optical device. The irradiated surface is a road surface around the vehicle. The condensing mark is a pattern indicating a travelling direction of the vehicle. The lamp controller acquires a detection signal from a state detection device. The state detection device is mounted on the vehicle for detecting a behavior of the vehicle and peripheral environmental information of the vehicle. The lamp controller lights or blinks the optical device based on the detection signal.

The present invention allows a simple structure to display the complex pattern with excellent light utilization efficiency at low cost. Any other issues, structures and advantageous effects will be clarified by explaining the embodiments as follows.

BRIEF DESCRIPTION OF DRAWINGS

FIG. 1A is an explanatory view representing a utilization example of an optical device according to a first embodiment, and FIG. 1B is an enlarged view of a section B shown in FIG. 1A;

FIG. 2A is a view showing a structure of the optical device according to the first embodiment, and FIG. 2B is a sectional view taken along line A-A' of FIG. 2A;

FIG. 5 shows point sequence data of the effective region of a first region on the reflection surface of the reflector according to the first embodiment;

FIG. 6 shows point sequence data of the effective region of a second region on the reflection surface of the reflector according to the first embodiment;

FIGS. 10A to 10D are explanatory views each showing a positional relationship between an effective region on an emission surface of a lens and a light source according to the second embodiment;

FIG. 11 shows point sequence data of the effective region of a first region on the emission surface of the lens according to the second embodiment;

FIG. 12 shows point sequence data of the effective region of a second region on the emission surface of the lens according to the second embodiment;

FIG. 14A is an explanatory view representing an outline of a direction intending to go displayed by a direction display device according to a third embodiment, and FIG. 14B is a table representing installation positions of the respective optical devices, and displayed contents;

FIG. 21 shows point sequence data of the effective region of a first region on the reflection surface of the reflector of the second forward optical device according to the third embodiment;

FIG. 22 shows point sequence data of the effective region of a second region on the reflection surface of the reflector of the second forward optical device according to the third embodiment;

FIG. 25 shows point sequence data of the effective region of the first region on the reflection surface of the reflector of the first right turn optical device according to the third embodiment;

FIG. 26 shows point sequence data of the effective region of the second region on the reflection surface of the reflector of the first right turn optical device according to the third embodiment;

FIG. 29 shows point sequence data of the effective region of the first region on the reflection surface of the reflector of the second right turn optical device according to the third embodiment;

FIG. 30 shows point sequence data of the effective region of the second region on the reflection surface of the reflector of the second right turn optical device according to the third embodiment;

FIGS. 31A to 31F are views each showing a result of simulating a display example of the direction display device according to the third embodiment;

FIG. 34 shows point sequence data of the effective region of the first region on the reflection surface of the reflector according to the first modified example;

FIG. 35 shows point sequence data of the effective region of a second region on the reflection surface of the reflector according to a first modified example;

FIG. 36 shows point sequence data of the effective region of a third region on the reflection surface of the reflector according to the first modified example;

FIG. 39 shows point sequence data of the effective region of a first region on the reflection surface of the reflector according to the second modified example;

FIG. 40 shows point sequence data of the effective region of a second region on the reflection surface of the reflector according to the second modified example.

DESCRIPTION OF EMBODIMENTS

Figure 3:
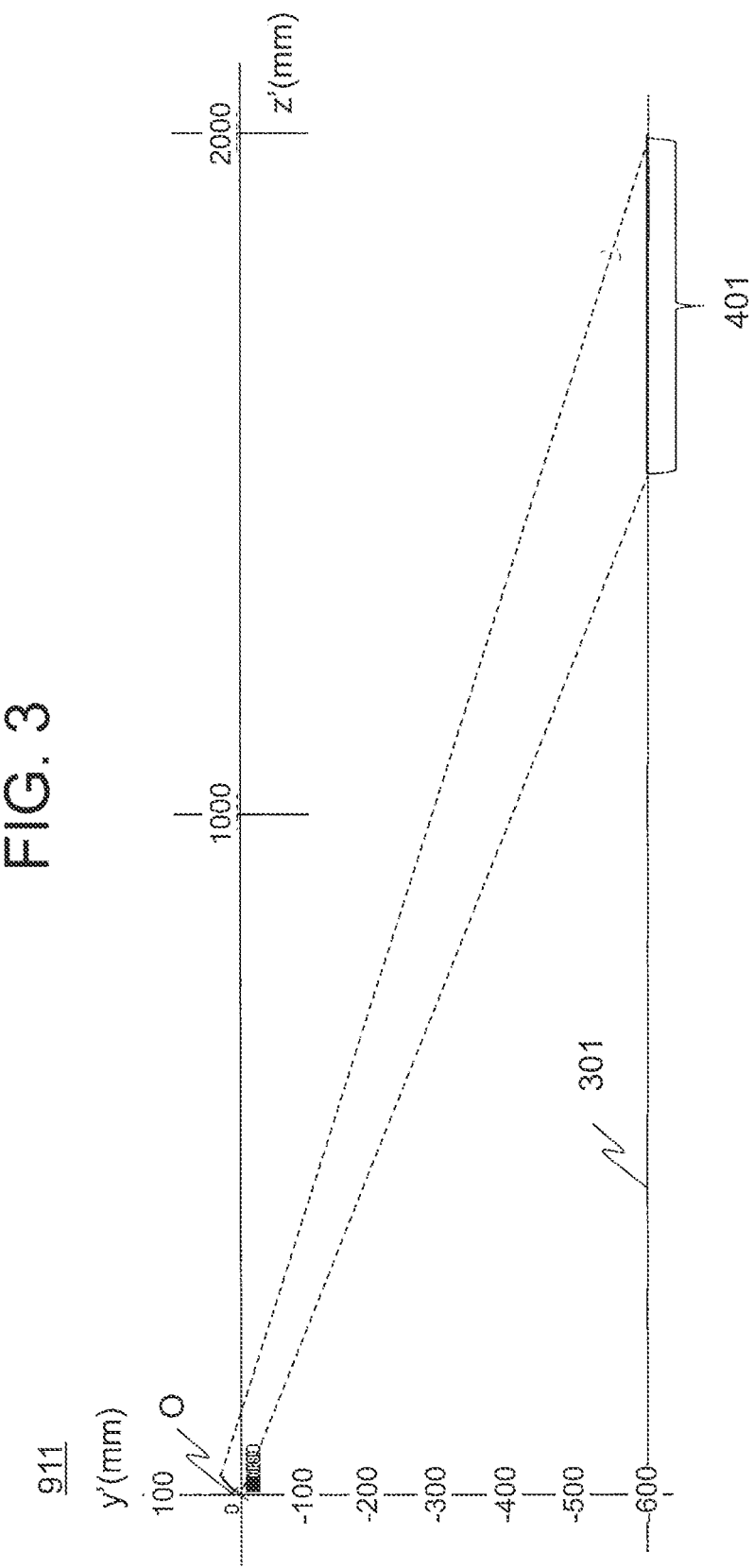
FIG. 3 is an explanatory view of a coordinate system used for explaining a structure of the optical device according to the first embodiment.

Embodiments according to the present invention will be described in detail based on the drawings. In all the drawings for explaining the embodiments, in principle, the same components will be designated with the same codes, and repetitive explanations thereof, thus will be omitted. Meanwhile, the component designated with the code, which has been already explained will not be shown again upon explanation in reference to another drawing. However, such component may be referred as the one designated with the same code.

First Embodiment

An optical device as a first embodiment according to the present invention will be described. A utilization example of an optical device 100 according to the embodiment is shown in FIGS. 1A and 1B. FIG. 1A is a perspective view of a vehicle 200 having the optical device 100 according to the embodiment installed therein. FIG. 1B is an enlarged view of a section B enclosed with broken line as shown in FIG. 1A.

As FIGS. 1A and 1B show, the optical device 100 according to the embodiment is installed in the vehicle 200 to form an irradiation image (condensing pattern, condensing mark) 400 on a road surface 300 to a front periphery of the vehicle 200 from a predetermined height. The optical device 100 according to the embodiment is not limited to the on-board type.

[Optical Device]

A structure of the optical device 100 according to the embodiment is shown in FIGS. 2A and 2B. FIG. 2A is a front view of the optical device 100 according to the embodiment. FIG. 2B is a sectional view taken along line A-A' of FIG. 2A.

As the drawings show, the explanation will be made in reference to a left-right direction and an up-down direction as shown in FIG. 2A, and a front-back direction which is shown as the left-right direction in the drawing, and the up-down direction as shown in FIG. 2B. The above-described up, down, front, back, left, and right directions will be referred to as Up, Dw, Fr, Bk, Le, and Ri, respectively.

The optical device 100 according to the embodiment includes a substrate 111, a light source (LED) 110, a reflector 120, a support member 130, a cover 140, a body 150, and a lighting control circuit 160.

The body 150 has, for example, a box-like shape having an opening formed at its front. The cover 140 with light transmission property is disposed to close the opening of the body 150. The light reflected by the reflector 120 to be described later is emitted outside the optical device 100 through the cover 140.

An LED (Light Emitting Diode) is used as the light source 110, for example, and mounted on the substrate 111 on the support member 130. The light source 110 is not limited to the LED. For example, it is possible to employ an organic EL (Electro Luminescence), an inorganic EL, a laser, and an electric bulb for the light source 110. The substrate 111 is disposed around the front end of the support member 130 at approximately the center of the support member in the left-right direction.

The reflector 120 is an optical element that condenses the light emitted from the light source 110 disposed at the predetermined location to a specific region on a predetermined surface (irradiated surface) so that an irradiation image is formed on the irradiated surface. In the case that the optical device 100 is installed in the vehicle 200 as shown in FIG. 1B, the irradiated surface corresponds to the road surface 300 to the front periphery of the vehicle 200. A resultant irradiation image 400 has a shape indicating the specific intention, for example, the direction intending to go.

The reflector 120 includes a reflection surface 121 as a deflection surface for condensing the light emitted from the light source 110. The reflection surface 121 of the reflector 120 is divided into a plurality of regions. The respective divided regions (divided regions) form different partial irradiation images on the irradiated surfaces. The irradiation image 400 is formed by combining the respective partial irradiation images. Each of the divided regions has an aspherical shape or a free-form surface shape.

The shape of the reflection surface 121 of the reflector 120 is determined in accordance with the desired irradiation image 400, the illuminance distribution and the like. The relationship among the position of the light source 110, the shape of the reflection surface 121 of the reflector 120, and the region for forming the irradiation image on the irradiated surface will be described in detail later.

The reflector is made of, for example, resin, glass, and metal. For example, an aluminum film is deposited on the reflection surface 121 of the reflector 120. It is also possible to deposit the high-reflectance film on the reflection surface 121 of the reflector 120.

The reflector 120 is fixed onto the support member 130 using a fixing screw 131, for example. The reflector 120 is disposed above the light source 110 so as to be in a directional angle range of the light source 110. It is possible to fix the position of the reflector 120 relative to the light source 110 using a positioning pin 132 or the like, for example.

The lighting control circuit 160 controls lighting of the light source 110. The lighting control circuit 160 receives a control signal from outside, and controls lighting of the light source 110 in accordance with the control signal.

The lighting control circuit 160 may be configured to include a CPU (Central Processing Unit), a RAM (Random Access Memory), and a ROM (Read Only Memory) so as to control lighting of the light source 110 by loading the program preliminarily stored in the ROM through the CPU to the memory for execution.

The support member 130 is supported at the surface of the box-like body 150 on the surface opposite the cover 140 using the fixing screws 131 and the like. The support member 130 is made of such material as metal. It is possible to provide the support member 130 with a cooling fin. The support member 130 may be supported with an aiming screw so as to make the position and the angle of the reflector 120 adjustable.

The light source 110, the reflector 120, the substrate 111, the support member 130, and the lighting control circuit 160 are disposed in a lamp chamber 151 defined by the body 150 and the cover 140.

[Details of Reflector Shape]

Described below is an example of a relationship among a shape of an effective region on the reflection surface 121 of the reflector 120 according to the embodiment, the light source 110, and the irradiation image 400 displayed on an irradiated surface 301.

In the embodiment, a local coordinate system 911 (x', y', z') as shown in FIG. 3 is set, which will be simply referred to as a coordinate system 911.

Referring to the coordinate system 911, the direction perpendicular to the irradiated surface 301 is set to a y'-axis direction. A coordinate value of the irradiated surface 301 in the y'-axis direction is set to −600 mm. In other words, the position on the y'-axis 600 mm apart from the irradiated surface 301 is set to an origin O.

The direction of the plane including the y'-axis, and the center of the light emitting region of the light source 110, which is parallel to the irradiated surface 301 is set to a z'-axis direction. The direction orthogonal to a y'-z' plane is set to an x'-axis direction.

In this case, the LED (for example, nichia NCSW170C/NCSA170C) with the light emitting region set to 1.15 mm both in the x'-axis and z'-axis directions is employed for the light source 110. Described below is an example of a shape of the reflection surface 121 in the case of forming an arrowhead shape as the irradiation image 400 to a pattern display region 401 on the irradiated surface 301. The pattern display region 401 ranges from 1500 mm to 2000 mm in the z'-axis direction, and ranges from −500 mm to 500 mm in the x'-axis direction on the irradiated surface 301.

Figure 4A:
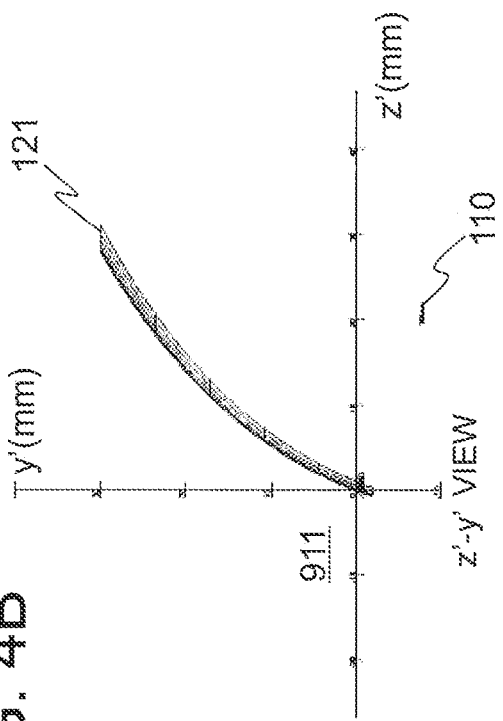
FIGS. 4A to 4D are explanatory views each showing a positional relationship between an effective region of a reflection surface of a reflector, and a light source according to the first embodiment.
Figure 4B:
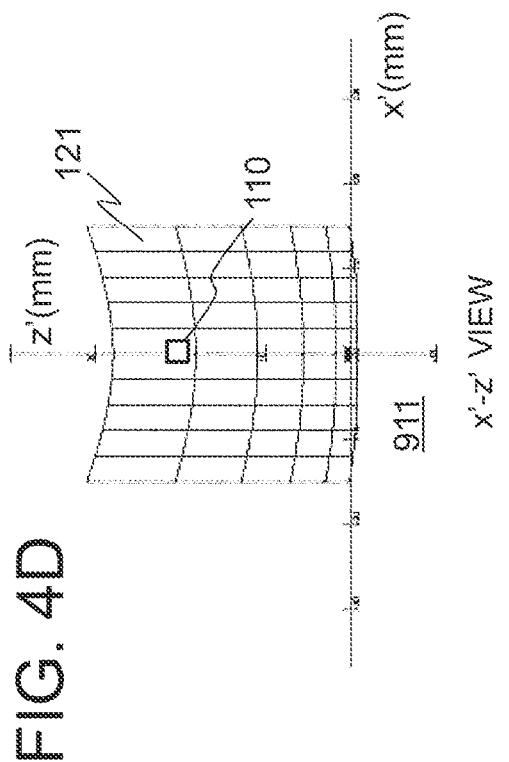
Figure 4C:
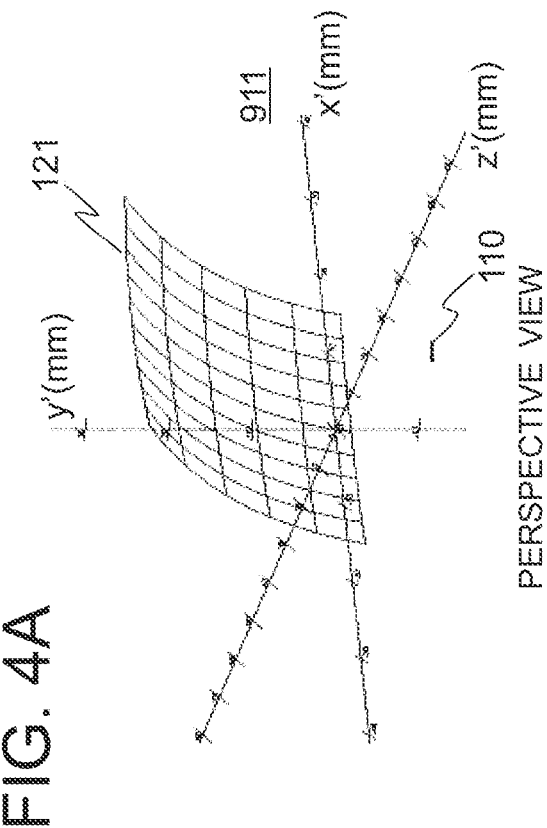
Figure 4D:
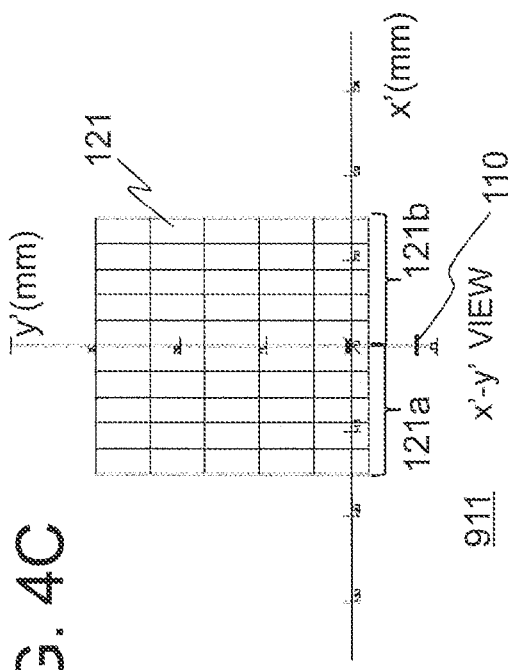

FIGS. 4A to 4D are views each showing a positional relationship between the effective region on the reflection surface 121 of the reflector 120, and the light source 110. FIG. 4A is a perspective view. FIG. 4B is a z'-y' plan view. FIG. 4C is an x'-y' plan view. FIG. 4D is an x'-z' plan view.

Referring to the coordinate system 911, the light source 110 is disposed so that the center coordinate of the light emitting region becomes (0, −7.5, 20), and the center axis direction of the directional angle is oriented toward the y'-axis direction.

As FIG. 4C shows, the reflection surface 121 of the reflector 120 includes a first region 121a and a second region 121b each having a different free-form surface shape. The first region 121a and the second region 121b are obtained by dividing the reflection surface 121 of the reflector 120 by the plane parallel to the z'-y' plane while passing through the origin of the coordinate system 911. Referring to the drawing, the left section is the first region 121a, and the right section is the second region 121b.

The first region 121a reflects the light to form a first irradiation image as a partial irradiation image on a region ranging from −500 mm to 0 mm at the x'-coordinate, in the pattern display region 401. The second region 121b reflects the light to form a second irradiation image as a partial irradiation image on a region ranging from 0 mm to 500 mm at the x'-coordinate, in the pattern display region 401.

The free-form surfaces of the first region 121a and the second region 121b correspond to the quintic and quintic NURBS (Non-Uniform Rational B-Spline) curved surface, which are different from each other. The free-form surface shape is formed so that the arrowhead shape is displayed on the irradiated surface 301 by a combination of the first irradiation image on the irradiated surface 301 and the second irradiation image on the irradiated surface 301. The first irradiation image is obtained by reflecting the light emitted from the light source 110 at the first region 121a, and the second irradiation image is obtained by reflecting the light emitted from the light source 110 at the second region 121b. The free-form surface suitable for display of the desired condensing mark (irradiation image) may be selected without being limited to the quintic and quintic NURBS curved surface.

Point sequence data of the effective regions of the first regions 121a and the second region 121b each having the free-form surface shape are shown in a table 511 of FIG. 5, and a table 512 of FIG. 6, respectively. The point sequence data represent a direction cosine (l', m', n') of each position (x', y', z') of the coordinate system 911.

As FIGS. 5 and 6 show, the respective points in the boundary area between the first region 121a and the second region 121b take different values of direction cosine in the first region 121a and the second region 121b. For example, the direction cosine at (0, 0, −0.00898) corresponds to (−0.04226,−0.33936,−0.939708) in the first region 121a, and (−0.042256, −0.33936, 0.939708) in the second region 121b. In other words, there is no continuity between the first region 121a and the second region 121b. Therefore, each of the first region 121a and the second 121b has the different free-form surface shape.

Figure 7A:
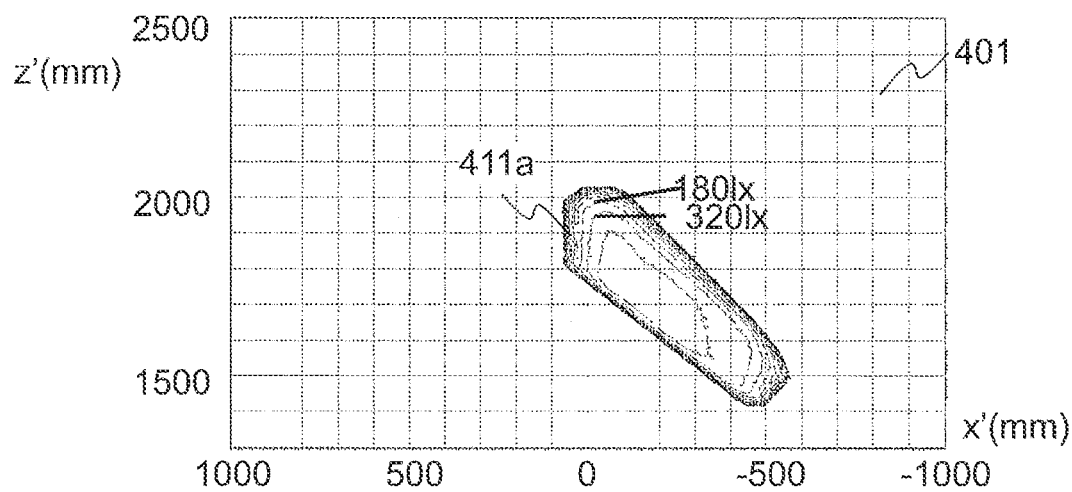
FIG. 7A shows a result of simulating an irradiation image formed on the first region of the reflection surface of the reflector according to the first embodiment.
Figure 7B:
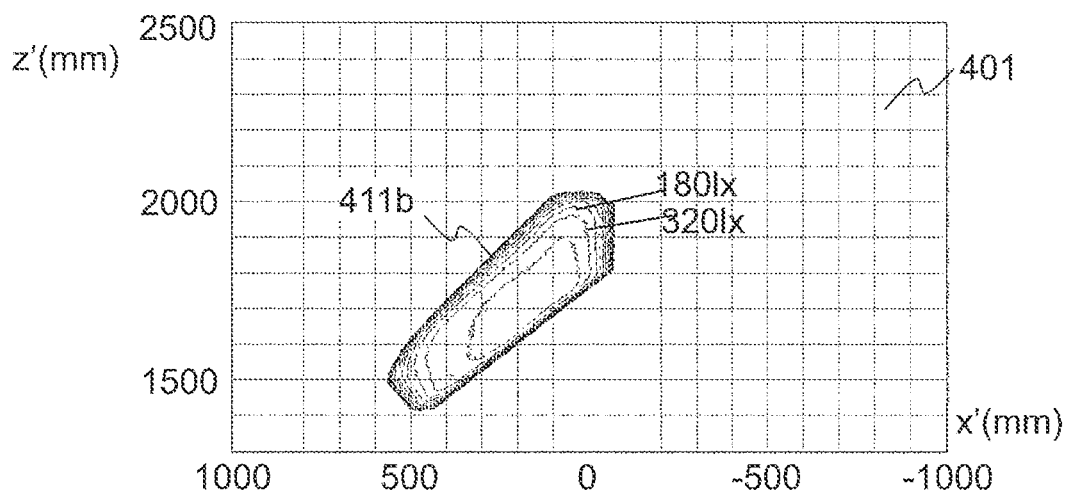
FIG. 7B shows a result of simulating an irradiation image formed on the second region of the reflection surface of the reflector according to the first embodiment.
Figure 7C:
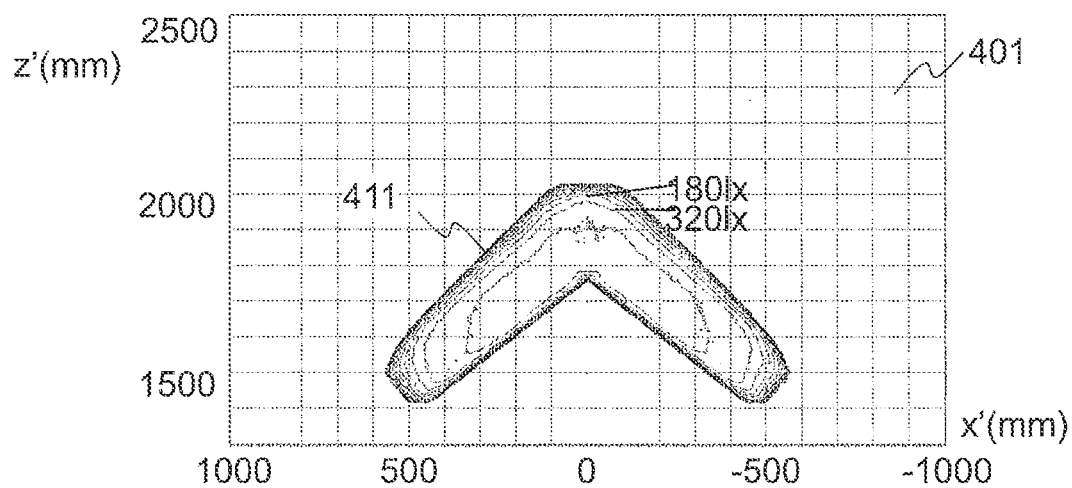
FIG. 7C shows a result of simulating an irradiation image formed on the reflection surface of the reflector according to the first embodiment.

FIGS. 7A to 7C are views each showing a result of ray tracing simulation of the illuminance distribution on the irradiated surface 301 derived from the above-specified optical device 100. In the above-described case, the nichia NCDW170C (350 lm) selected from the LED with the above-described light emitting region is employed for the light source 110.

FIG. 7A shows an illuminance distribution (first irradiation image) 411a on the pattern display region 401 of the irradiated surface 301, which has been derived from reflection of the light irradiated from the light source 110 at the first region 121a. FIG. 7B shows an illuminance distribution (second irradiation image) 411b on the pattern display region 401 of the irradiated surface 301, which has been derived from reflection at the second region 121b. FIG. 7C shows an illuminance distribution (irradiation image: condensing mark) 411 derived from the first region 121a and the second region 121b.

As FIG. 7C shows, the optical device 100 according to the embodiment is capable of displaying the arrowhead pattern (condensing mark 411) on the pattern display region 401 of the irradiated surface 301.

As described above, the embodiment allows formation of arrowhead pattern indicating the direction on the desired irradiated surface by the single reflector 120 with the reflection surface 121 having a plurality of different free-form surface shapes, and the single light source. In other words, the embodiment does not need the lighting control using the light source array arranged into the condensing mark shape, and the use of a plurality of optical systems. Accordingly, it is possible to realize the simply structured optical device capable of forming the shape indicating the specific intention on the desired surface.

The embodiment generates the shape indicating the specific intention as the shape of the reflection surface 121 of the reflector 120. In other words, the irradiation image is formed without using the mask or the like. Accordingly, all the luminous flux reaching the reflector 120 from the light source 110 may be used for forming the irradiation image 400. This makes it possible to realize the optical device that exhibits excellent light utilization efficiency, leading to high energy saving effects.

Second Embodiment

[Optical Device]

Figures 8A, 8B:
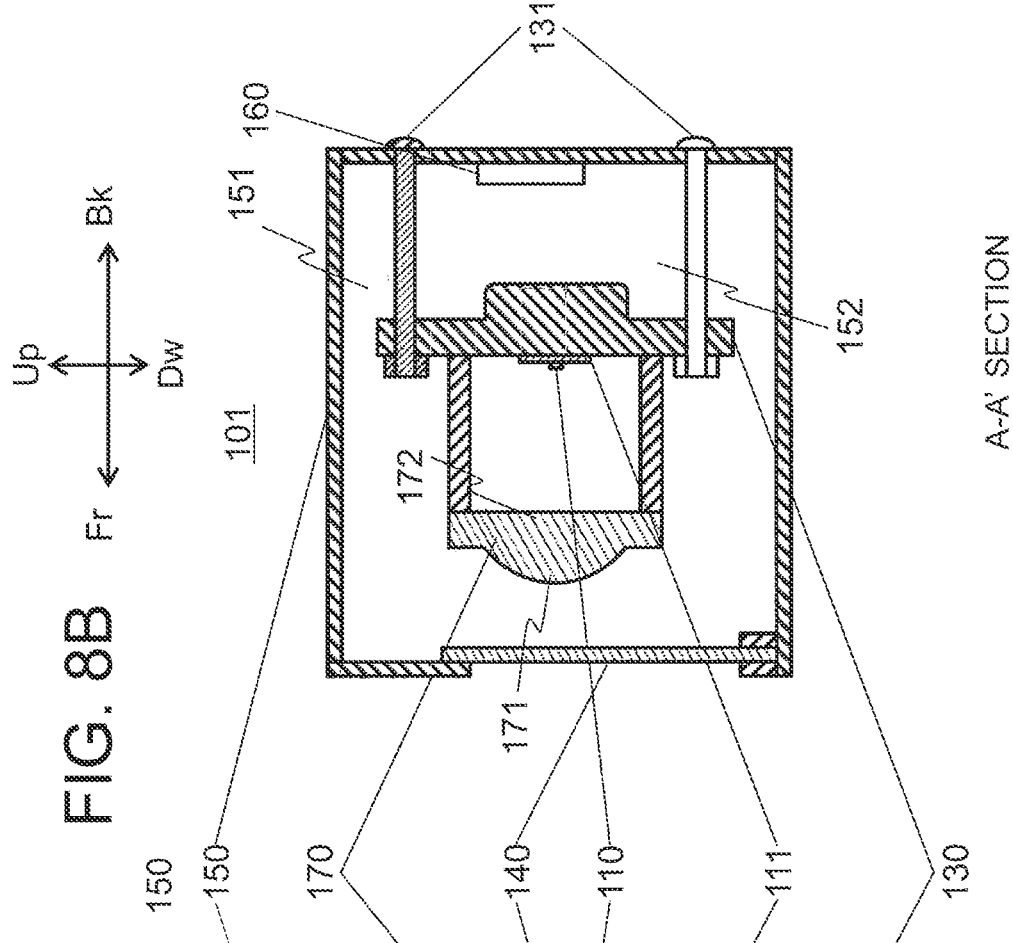
FIG. 8A is a view showing a structure of an optical device according to a second embodiment.
FIG. 8B is a sectional view taken along line A-A' of FIG. 8A.

An optical device as a second embodiment according to the present invention will be described. FIGS. 8A and 8B show a structure of an optical device 101 according to the embodiment. FIG. 8A is a front view of the optical device 101 according to the embodiment, and FIG. 8B is a sectional view taken along line A-A' of FIG. 8A.

In this embodiment, the optical device 101 is installed in the vehicle 200 likewise the first embodiment, and configured to form the irradiation image 400 from the predetermined height onto the road surface 300 and the like to the front periphery of the vehicle 200. The optical device 101 according to the embodiment is not limited to the on-board type.

In the following description about the optical device 101 according to the embodiment, the same structures as those of the optical device 100 according to the first embodiment will be designated as the same codes, and repetitive explanations thereof, thus will be omitted.

As the drawings show, the optical device 101 according to the embodiment includes the substrate 111, the light source 110, a lens 170, the support member 130, the cover 140, the body 150, and the lighting control circuit 160.

The light source 110 is mounted on the substrate 111 on the support member 130. The substrate 111 is disposed at substantially the center of the support member 130 both in the up-down and left-right directions. The support member 130 is supported with the fixing screw 131 parallel to the surface opposite the opening of the body 150 while forming a space 152.

The lighting control circuit 160 is disposed in the space 152, for example.

The lens 170 is an optical element which condenses the light emitted from the light source 110 to a pattern display region 402 on a predetermined irradiated surface 302 for forming the irradiation image 400. The lens 170 is made of the transparent resin such as acryl, polycarbonate, and polyolefin, or the transparent glass. An incident surface 172 and an emission surface 171 of the lens 170 may be coated with an antireflection film.

The lens 170 disposed to the front of the light source 110 is configured to make the light emitted from the light source 110 incident on the incident surface 172 of the lens 170, and to emit the light from the emission surface 171. At least one of the incident surface 172 and the emission surface 171 is formed as the deflection surface for condensing the light emitted from the light source 110. The deflection surface of the lens 170 is divided into a plurality of regions. Each of the divided regions (divided region) forms a different partial irradiation image on the irradiated surface 302. The irradiation image 400 is formed by combining the respective partial irradiation images. Each of the divided regions includes an aspherical shape or a free-form surface shape.

The shape of the deflection surface of the lens 170 is determined in accordance with the desired irradiation image 400 and the illuminance distribution. Details of the relationship among the position of the light source 110, the shape of the deflection surface of the lens 170, and the pattern display region 401 on the irradiated surface 302 will be described later.

The lens 170 is fixed onto the support member 130 using a not shown fixing screw and the like. In this case, the lens 170 is disposed so that the deflection surface is positioned in the range of the directional angle of the light source 110.

The light source 110, the lens 170, the substrate 111, the support member 130, and the lighting control circuit 160 are disposed inside the lamp chamber 151 defined by the body 150 and the cover 140.

[Details of Lens Shape]

An example of the relationship among the shape of the effective region of the condensing surface of the lens 170 according to the embodiment, the light source 110, and the irradiation image 400 to be displayed on the irradiated surface 302 will be described. The example will be made by taking the case where the emission surface 171 is the deflection surface with the free-form surface shape, and the incident surface 172 is a flat surface. In this example, the lens 170 is made of polycarbonate.

Figure 9:
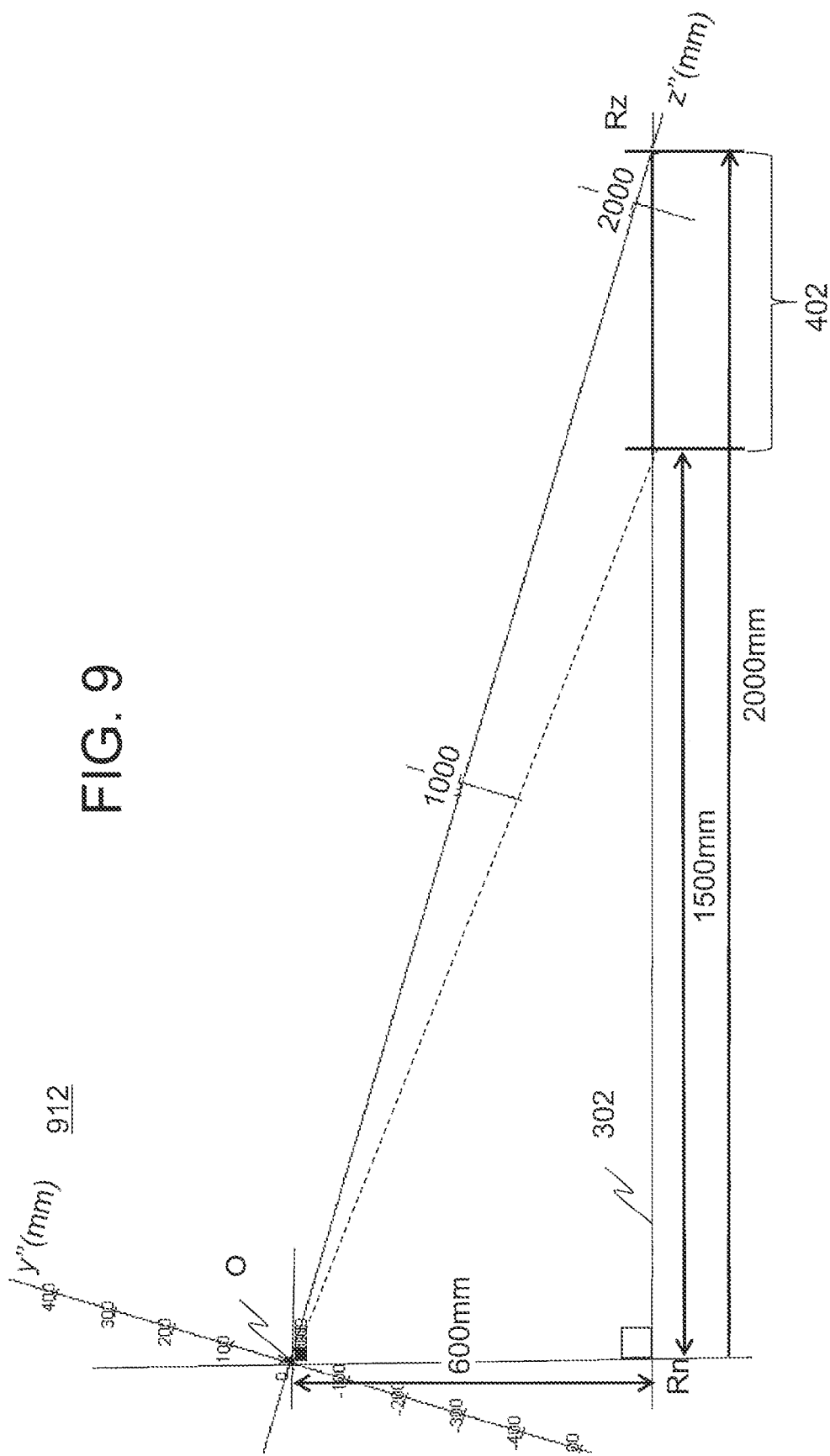
FIG. 9 is an explanatory view of a coordinate system used for explaining a structure of the optical device according to the second embodiment.

In this embodiment, a local coordinate system 912 (x", y", z") as shown in FIG. 9 is set, which will be simply referred to as a coordinate system 912.

Referring to the coordinate system 912, the origin O is set to the position 600 mm apart from a point Rn on the irradiated surface 302 in the direction perpendicular thereto. The direction oriented from the origin O to a point Rz that is positioned on the irradiated surface 302, and 2000 mm apart from the Rn is set to the z"-axis direction.

The direction that passes through the origin 0 on the plane perpendicular to the z"-axis while being parallel to the irradiated surface 302 is set to the x"-axis direction, and the direction orthogonal to the x"-z" plane is set to the y"-axis direction.

The embodiment employs the LED (for example, nichia NCSW170C/NCSA170C) having the light emitting region set to 1.15 mm in the x"-axis direction and the y"-axis direction, for example. An explanation will be made about the shape of the emission surface 171 in the case that the irradiation image 400 having the arrowhead shape is formed on the pattern display region 402 of the irradiated surface 302 as an example. The pattern display region 402 ranges from 1500 mm to 2000 mm in the direction from the Rn to Rz, and ranges from −500 mm to 500 mm in the x'-axis direction on the irradiated surface 302.

FIGS. 10A to 10D are views each showing a positional relationship between the effective region on the emission surface 171 of the lens 170, and the light source 110. FIG. 10A is a perspective view. FIG. 10B is a z"-y" plan view. FIG. 10C is an x"-y" plan view. FIG. 10D is an x"-z" plan view.

Referring to the coordinate system 912, the light source 110 is disposed so that the center coordinate of the light emitting region becomes (0, 0, −20), and the center axis direction of the directional angle is oriented toward the z"-axis direction.

As FIG. 10C shows, the emission surface 171 of the lens 170 according to the embodiment includes a first region 171a and a second region 171b. The first region 171a and the second region 171b are obtained by dividing the emission surface 171 by the plane parallel to the z"-y" plane while passing through the center of the light emitting region of the light source 110. Referring to the drawing, the left section is the first region 171a, and the right section is the second region 171b.

The first region 171a deflects the light to form a first irradiation image as the partial irradiation image on the region ranging from −500 mm to 0 mm at the x"-coordinate, in the pattern display region 402. The second region 171b deflects the light to form a second irradiation image as the partial irradiation image on the region ranging from 0 mm to 500 mm at the x"-coordinate, in the pattern display region 402.

The free-form surfaces of the first region 171a and the second region 171b correspond to the quintic and quintic NURBS (Non-Uniform Rational B-Spline) curved surface, which are different from each other. The free-form surface shape is formed so that the arrowhead shape is displayed on the irradiated surface 302 by a combination of the first irradiation image on the irradiated surface 302 and the second irradiation image on the irradiated surface 302. The first irradiation image is obtained by refracting the light emitted from the light source 110 at the first region 171a, and the second irradiation image is obtained by refracting the light emitted from the light source 110 at the second region 171b. The free-form surface suitable for display of the desired condensing mark (irradiation image) may be selected with no limitation to the quintic and quintic NURBS curved surface.

Point sequence data of the effective regions of the first region 171a and the second region 171b each having the free-form surface shape are shown in a table 521 of FIG. 11, and a table 522 of FIG. 12, respectively. The point sequence data represent a direction cosine (l", m", n") of each position (x", y", z") of the coordinate system 912.

As FIGS. 11 and 12 show, the respective points in the boundary area between the first region 171a and the second region 171b take different values of direction cosine in the first region 171a and the second region 171b. For example, the direction cosine at (0, −10, 6.021816) corresponds to (0.069813, −0.55406, 0.829546) in the first region 171a, and (−0.06981, −0.55406, 0.829546) in the second region 171b. In other words, there is no continuity between the first region 171a and the second region 171b. Therefore, each of the first region 171a and the second region 171b has the different free-form surface shape.

As described above, the incident surface 172 is a flat surface, having its effective region as a quadrangular flat plane defined by four vertexes (−10, −10, 0), (−10, 10, 0), (10, 10, 0), (10, −10, 0).

Figure 13A:
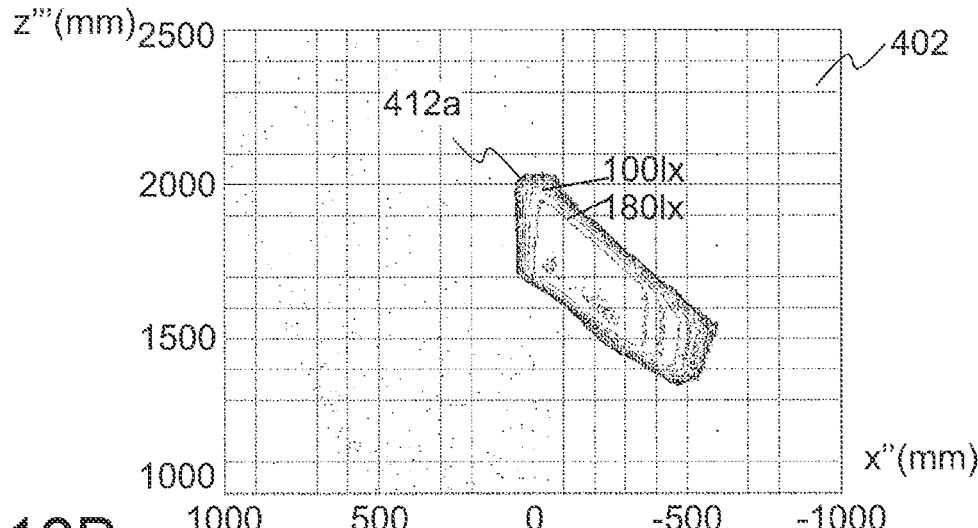
FIG. 13A shows a result of simulating an irradiation image formed on the first region of the emission surface of the lens according to the second embodiment.
Figure 13B:
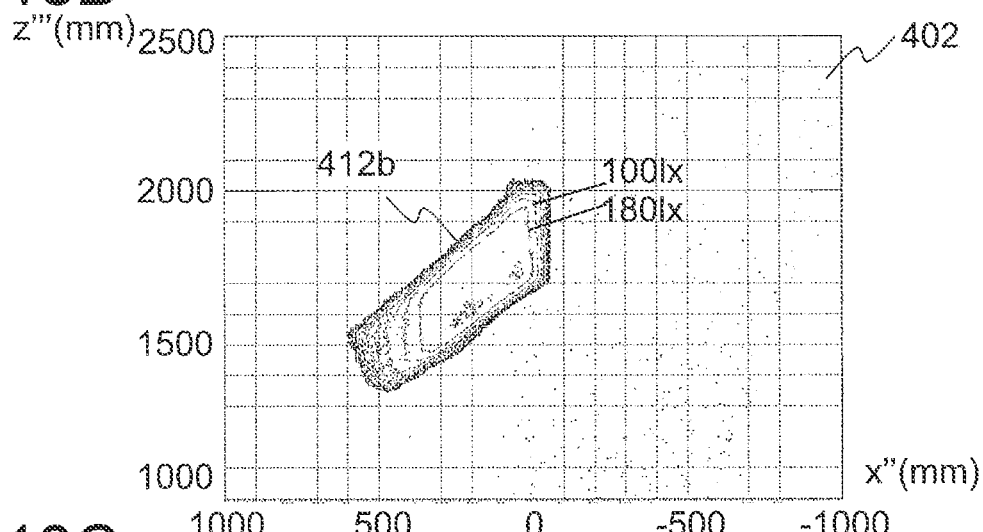
FIG. 13B shows a result of simulating an irradiation image formed on the second region of the emission surface of the lens according to the second embodiment.
Figure 13C:
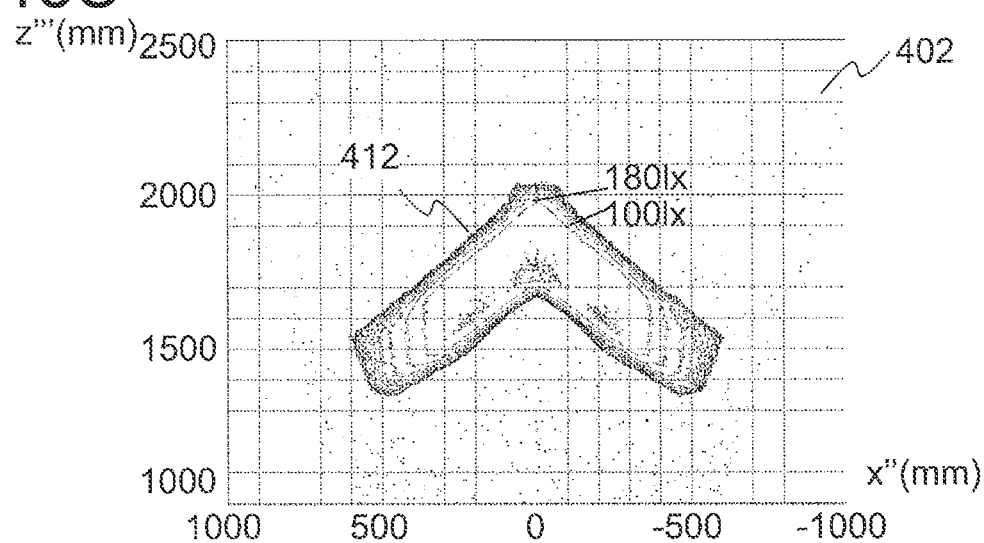
FIG. 13C shows a result of simulating an irradiation image formed on the emission surface of the lens according to the second embodiment.

FIGS. 13A to 13C are views each showing a result of ray tracing simulation of the illuminance distribution on the irradiated surface 302 derived from the above-specified optical device 101. In the above-described case, the nichia NCDW170C (350 lm) selected from the LED with the above-described light emitting region is employed for the light source 110. Each axis of ordinates shown in FIGS. 13A to 13C represents the distance from the Rn in the direction from the Rn to the Rz (z"' axis) on the irradiated surface 302.

FIG. 13A shows an illuminance distribution (first irradiation image) 412a on the pattern display region 402 of the irradiated surface 302, which has been derived from refraction of the light irradiated from the light source 110 at the first region 171a. FIG. 13B shows an illuminance distribution (second irradiation image) 412b on the pattern display region 402 of the irradiated surface 302, which has been derived from refraction at the second region 171b. FIG. 13C shows an illuminance distribution (condensing mark) 412 derived from the first region 171a and the second region 171b.

As FIG. 13C shows, the optical device 101 according to the embodiment is capable of displaying the arrowhead pattern (condensing mark 412) on the pattern display region 402 of the irradiated surface 302.

As described above, likewise the first embodiment, the embodiment allows formation of the arrowhead pattern indicating the direction on the desired irradiated surface 302 by the single lens 170 with the deflection surface (emission surface 171) having regions in which a plurality of different free-form surface shapes exist, and the single light source. In other words, the embodiment does not need the lighting control using the light source array arranged into the condensing mark shape, and the use of a plurality of optical systems. Accordingly, it is possible to realize the simply structured optical device capable of forming the shape indicating the specific intention on the desired surface.

The embodiment generates the shape indicating the specific intention as the shape of the deflection surface (emission surface 171) of the lens 170. In other words, the irradiation image is formed without using the mask or the like. Accordingly, all the luminous flux reaching the lens 170 from the light source 110 may be used for forming the irradiation image 400. This makes it possible to realize the optical device that exhibits excellent light utilization efficiency, leading to high energy saving effects.

The explanation of the embodiment has been made as an exemplified case that the emission surface 171, of the lens 170 is formed into the deflection surface with the free-form surface shape, in a non-restrictive manner. It is possible to realize the deflection surface with the above-described function by the use of the incident surface 172 of the lens 170, or both the incident surface 172 and the emission surface 171.

Third Embodiment

A third embodiment will be described. In the embodiment, the optical device 100 or 101 as described in the respective embodiments is installed in the vehicle 200 so as to display the condensing mark 400 indicating the direction intending to go of the vehicle 200 on the road surface 300 to the front periphery of the vehicle 200 in accordance with the direction intending to go. An explanation will be made by exemplifying the case of using the optical device 100 to display the condensing mark 400 on the road surface 300 to the front of the vehicle 200.

[Direction Display Device]

FIGS. 14A and 14B are views for explaining an outline of displaying the direction intending to go performed by a direction display device 600 according to the embodiment.

As the drawings show, the direction display device 600 includes six optical devices 100 at the front end of the vehicle 200.

As FIG. 14A shows, the six optical devices 100 are grouped in twos, which are installed in the front center, the front left, and the front right of the vehicle 200, respectively. The optical device 100 according to the embodiment is embedded in a bumper or the like, which is mounted onto the front part of the vehicle.

The two units of the optical devices 100 to be installed in the front center of the vehicle will be referred to as a forward optical device 100F including a first forward optical device 100Fa and a second forward optical device 100Fb. Another two units of the optical devices 100 to be installed in the front left side of the vehicle will be referred to as a left turn optical device 100L including a first left turn optical device 100La and a second left turn optical device 100Lb. Another two units of the optical devices 100 to be installed in the front right side of the vehicle will be referred to as a right turn optical device 100R including a first right turn optical device 100Ra and a second right turn optical device 100Rb.

Forward patterns 430a and 430b, left turn patterns 440a and 440b, and right turn patterns 450a and 450b are displayed on the road surface 300 as the condensing marks 400 by the first and the second forward optical devices 100Fa and 100Fb, the first and the second left turn optical devices 100La and 100Lb, the first and the second right turn optical devices 100Ra and 100Rb, respectively.

As FIG. 14A shows, among the condensing marks irradiated by the forward optical device 100F, the left turn optical device 100L, and the right turn optical device 100R, those distant from the vehicle 200 (that is, the forward pattern 430a, the left turn pattern 440a, the right turn pattern 450a) are colored differently from those close to the vehicle 200 (that is, the forward pattern 430b, the left turn pattern 440b, the right turn pattern 450b). Specifically, the condensing marks distant from the vehicle having the six optical devices 100 installed therein are differently colored from those close to the vehicle.

The left turn patterns 440a, 440b are positioned side by side in the travelling direction of the vehicle on the lane orthogonal to the lane on which the vehicle 200 exists. Likewise, the right turn patterns 450a, 450b are positioned side by side in the travelling direction of the vehicle on the lane orthogonal to the lane on which the vehicle 200 exists.

Table 531 of FIG. 14B shows details of installation position of the respective optical devices 100, and each shape, color, and display position of the respective condensing marks 400. The detailed explanation of the shape of the reflector 120 for generating the respective condensing marks 400 will be described later.

Figure 15:
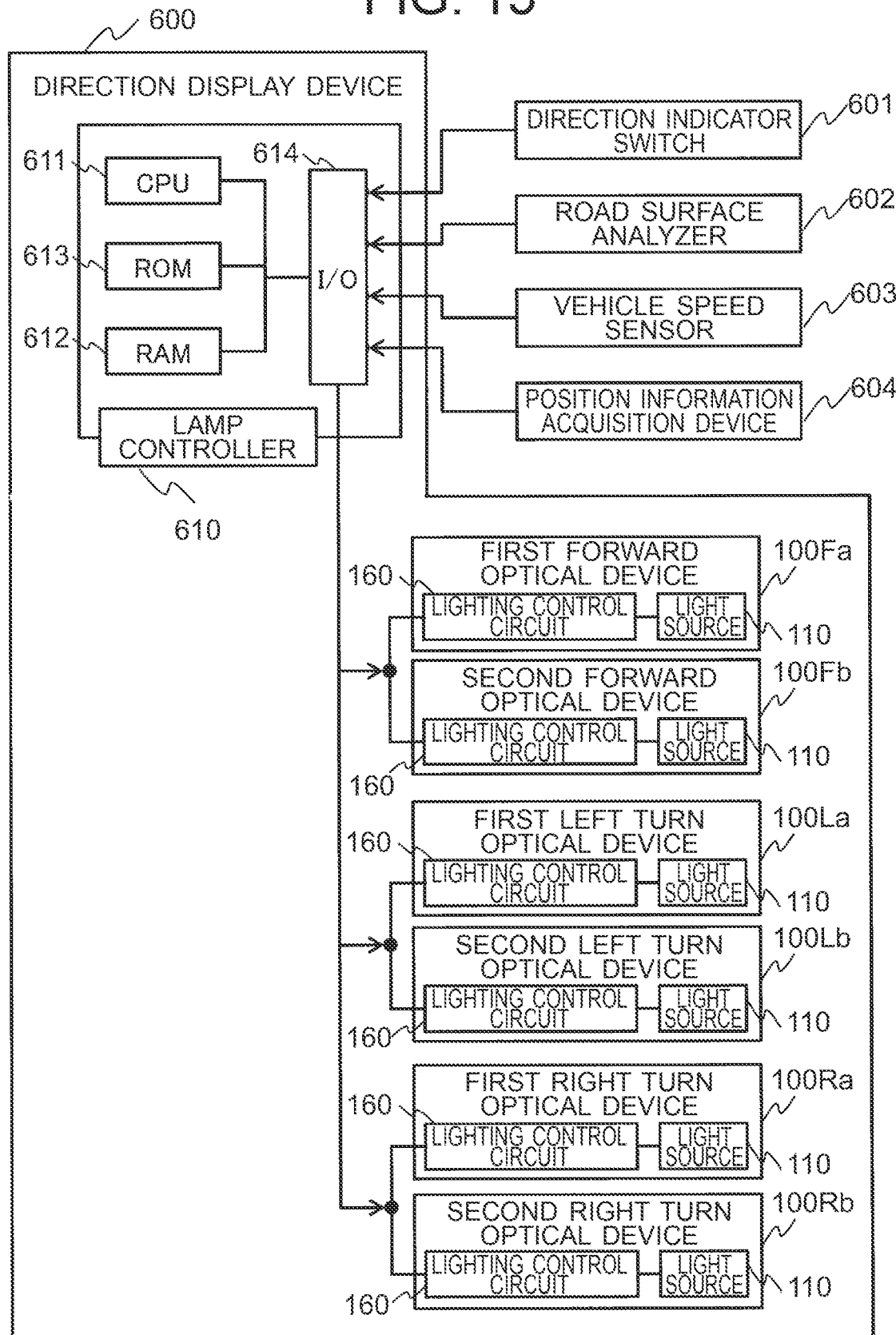
FIG. 15 is a view showing a structure of a control system for the direction display device according to the third embodiment.

FIG. 15 is a view showing a structure of a control system for the direction display device 600 according to the embodiment. As the drawing shows, the direction display device 600 includes six optical devices 100, and a lamp controller 610.

The lamp controller 610 transmits a control signal which instructs lighting to the lighting control circuit 160 of the optical device 100. The lamp controller 610 is connected to various state detection units for outputting signals, based on which the control signal is calculated.

The state detection unit detects a behavior of the vehicle 200, and environmental information on the periphery of the vehicle 200 so that the detection result is output to the lamp controller 610 as the detection signal. In this embodiment, a direction indicator switch 601, a road surface analyzer 602, a vehicle speed sensor 603, a position information acquisition device 604, and the like are connected as the state detection units. It is also possible to connect a steering sensor and a back gear sensor.

The direction indicator switch 601 outputs an operation signal (direction indication signal) to the lamp controller 610 after lighting the direction indicator. The direction indication signal includes information on direction indicated.

The road surface analyzer 602 analyzes the state of the road surface 300, and outputs the analysis result to the lamp controller 610. The road surface analyzer 602 of this embodiment includes a light source, a polarization camera, and an analyzer for analyzing the image acquired by the polarization camera of the state where the light from the light source is irradiated to the road surface. The road surface analyzer 602 outputs the signal that identifies the state of the road surface 300 (road surface signal) as the analysis result to the lamp controller 610. In the embodiment, the road surface signal includes the reflectance of the road surface 300 as the information that allows identification of the state of the road surface 300, for example, dry, wet, freezing and the like.

The vehicle speed sensor 603 detects the traveling speed (vehicle speed) of the own vehicle, and outputs the vehicle speed signal to the lamp controller 610. For example, the vehicle speed sensor 603 makes the sensor generate a pulse signal proportional to the rotation speed of the axle, and detects the vehicle speed in accordance with the number of pulse signals.

The position information acquisition device 604 outputs the current position information of the own vehicle, and map information in neighborhood. The position information acquisition device 604 calculates the current position of the own vehicle using the information from the navigation satellite such as GPS, and the vehicle speed sensor 603, for example. The map information is preliminarily stored. It is possible to employ the navigation device for the position information acquisition device 604.

The lamp controller 610 may be connected to the respective state detection units via a multiple communication line such as CAN (Controller Area Network) communication line, a serial communication line, a wireless communication network, and the like.

The lamp controller 610 executes lighting/blinking control to the six optical devices 100 independently in accordance with the signals from the respective state detection units.

The lamp controller 610 includes a CPU 611, a RAM 612, a ROM 613, and an I/O interface 614, all of which are connected via an internal bus.

The respective functions executed by the lamp controller 610 are partially or entirely actualized by the CPU 611 which loads the program (software) stored in the ROM 613 to the RAM 612 for execution. It is also possible to actualize the respective functions partially or entirely through such hardware as LSI (Large Scale Integration) and ASIC (Application Specific Integrated Circuit). They may be actualized through combination of the software and the hardware. The information and data required for execution of the process are stored in the ROM 613 and the RAM 612.

The lamp controller 610 in the direction display device 600 according to the embodiment executes the lighting on/off control of the optical device 100 based on the vehicle speed. The lamp controller 610 controls the illuminance of the optical device 100 in accordance with the state of the road surface 300. The lamp controller 610 determines the optical device 100 to be lit in accordance with the direction intending to go of the vehicle 200.

Specifically, when the vehicle 200 is stopped or in the slow traveling state, the lamp controller 610 lights the optical device 100. In this case, the forward patterns 430a, 430b are normally displayed. Upon reception of the direction indication signal, the lamp controller 610 lights the optical device 100 displaying the pattern corresponding to the direction to be identified based on the direction indication signal (left turn patterns 440a, 440b, or right turn patterns 450a, 450b).

Meanwhile, the lamp controller 610 controls the optical device 100 to change the illuminance in accordance with the state of the road surface 300. For example, if the condensing mark 400 is displayed on the road surface 300 at the high reflectance, which may dazzle the driver of the other vehicle, the lamp controller 610 turns off the optical device, or controls the optical device 100 to reduce the illuminance.

If the luminous flux of the light source 110 is controllable, the illuminance will be lowered by changing the luminous flux of the light source 110 in accordance with the reflectance. The luminous flux may be changed by controlling the current value, for example. Alternatively, it may be changed through pulse width modulation (PWM: Pulse Width Modulation). The light control through pulse width modulation is executed to lower the illuminance of the condensing mark 400 by blinking the light source 110 at the cycle invisible to human eyes in synchronization with the PWM signal. In this case, reduction in the lighting time ratio in one cycle (duty ratio) may further lower the illuminance of the condensing mark 400.

For example, the lamp controller 610 may blinks the optical device 100 in synchronization with blinking of the direction indicator. In this case, the lamp controller 610 performs the blinking control of the light source 110 in the cycle invisible to human eyes repeatedly in the blinking cycle of the direction indicator so as to allow blinking display of the condensing mark 400 while having the illuminance kept in the lowered state.

Figure 16:
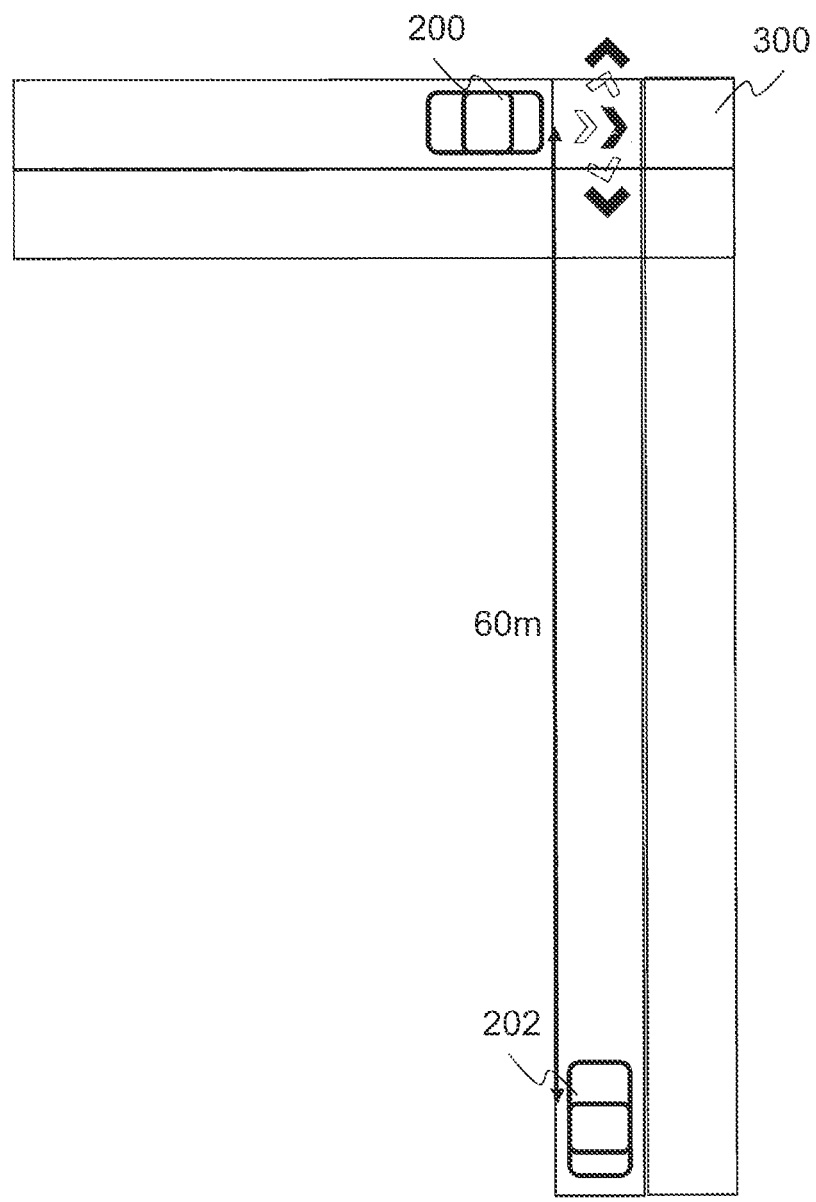
FIG. 16 is an explanatory view of a blind spot example according to the third embodiment.

Only in the case that the own vehicle is in a blind spot for the driver of the other vehicle, the lamp controller 610 of the embodiment allows lighting of the forward optical device 100F. The blind spot may be the intersection, the T-junction and the like as shown in FIG. 16.

Figure 17:
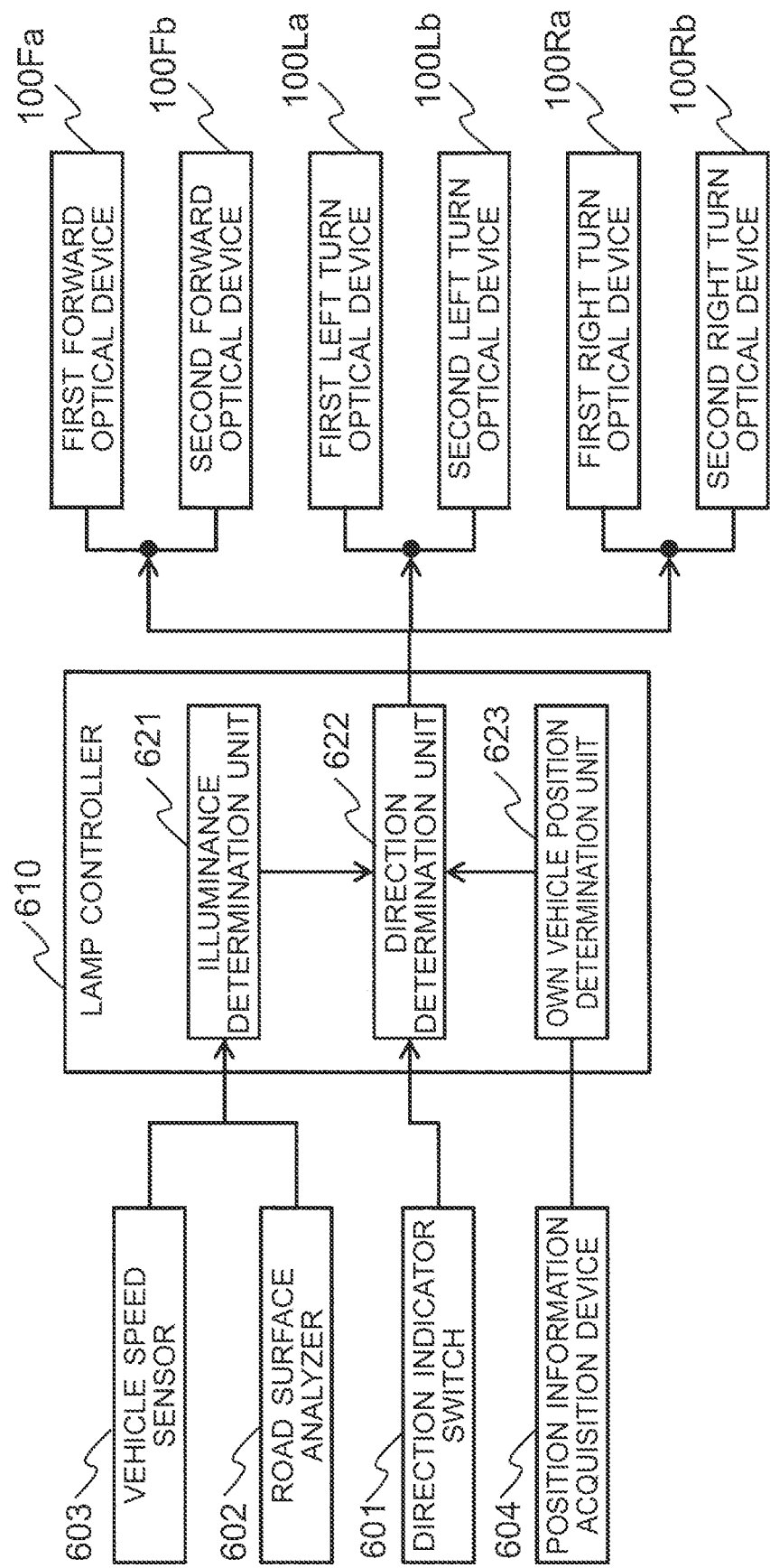
FIG. 17 is a function block diagram of a lamp controller according to the third embodiment.

An exemplified case of executing the above-described control will be described. FIG. 17 is a function block diagram of the lamp controller 160 of the embodiment. The lamp controller 610 of the embodiment includes an illuminance determination unit 621, a direction determination unit 622, and an own vehicle position determination unit 623.

The illuminance determination unit 621 determines whether or not the optical device 100 is to be lit. If the determination is made to light the optical device 100, illuminance determination unit 621 determines the illuminance of the condensing mark. The illuminance determination unit 621 outputs the determination result to the direction determination unit 622.

In the embodiment, the determination is made in accordance with signals from the vehicle speed sensor 603 and the road surface analyzer 602. Upon reception of the signal indicating that the vehicle speed is lower than the predetermined value from the vehicle speed sensor 603, the illuminance determination unit 621 determines to light the optical device 100. The illuminance determination unit 621 determines the aimed illuminance value (target illuminance value) for irradiation based on the reflectance contained in the road surface signal received from the road surface analyzer 602. Based on the determined target illuminance value, the illuminance determination unit 621 determines the duty ratio under the pulse width modulation control, for example. The information about the correspondence relation between the target illuminance value and the duty ratio is preliminarily stored in the ROM 613.

If the illuminance determination unit 621 determines to light, the direction determination unit 622 determines the optical device 100 to be lit. The optical device 100 to be lit is determined in accordance with the direction indication signal.

Upon reception of the direction indication signal indicating the right turn, the direction determination unit 622 determines to light the right turn optical device 100R. Upon reception of the direction indication signal indicating the left turn, the direction determination unit 622 determines to light the left turn optical device 100L. In other cases, the direction determination unit 622 determines to light the forward optical device 100F.

The own vehicle position determination unit 623 determines whether or not the own vehicle is in a predetermined blind spot, and outputs the determination result to the direction determination unit 622. Upon reception of the current position information of the own vehicle and the map information from the position information acquisition device 604, the own vehicle position determination unit 623 determines whether or not the current position of the own vehicle is in the blind spot for the driver of the other vehicle. The information for locating the place to be the blind spot for the driver of the other vehicle is preliminarily set and stored in the ROM 613.

Figure 18:
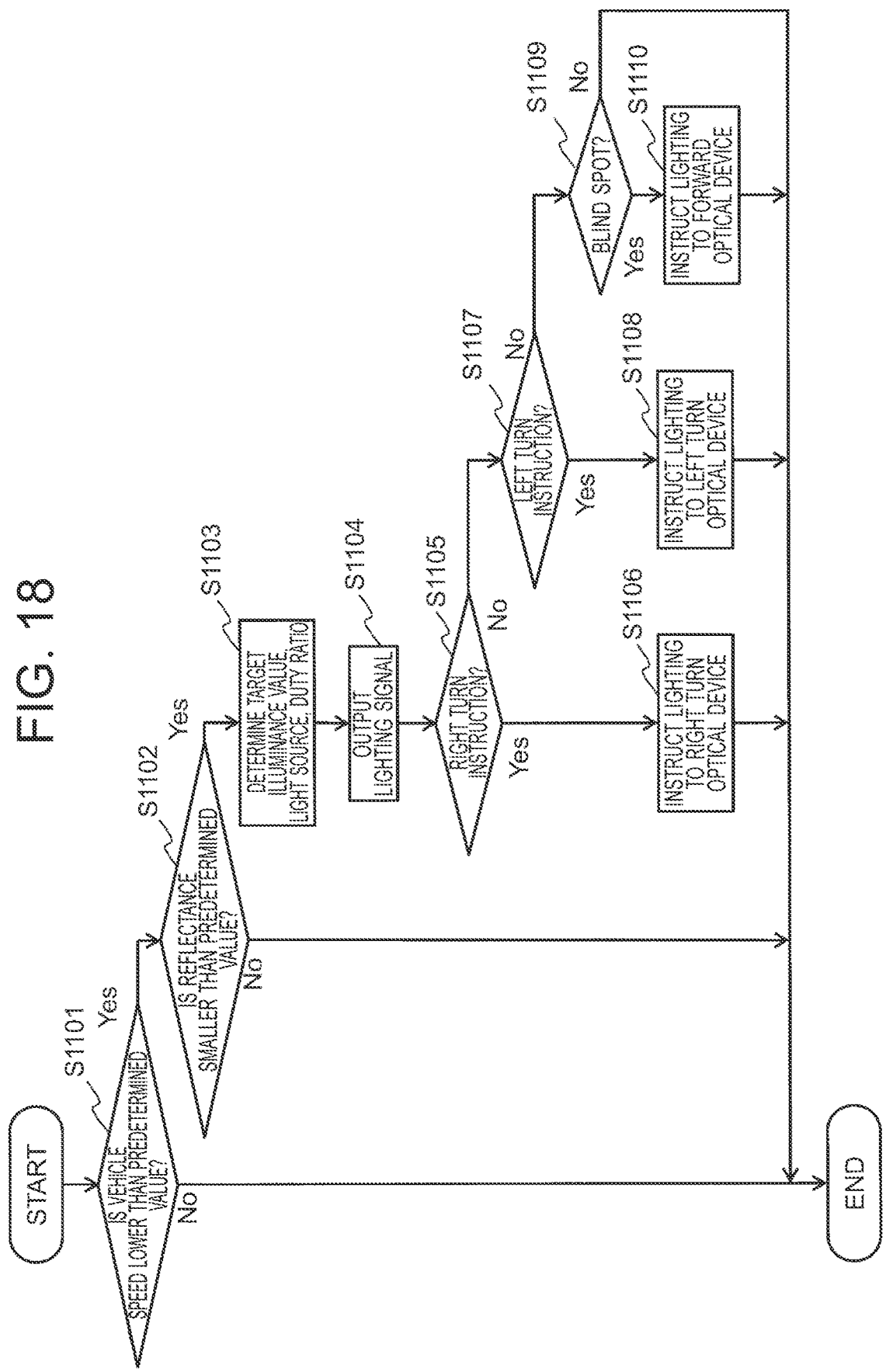
FIG. 18 is a flowchart representing a lighting control process executed by the lamp controller according to the third embodiment.

FIG. 18 is a flowchart representing an example of the lighting control process executed by the lamp controller 610 of the embodiment. The process will be executed at predetermined time intervals. In this case, the lighting control circuit 160 of the optical device 100 is configured to light the light source 110 only when the lighting instruction signal is received.

The illuminance determination unit 621 determines whether or not the vehicle speed is lower than a predetermined value in accordance with the vehicle speed signal received from the vehicle speed sensor 603 (step S1101).

If the vehicle speed is equal to or higher than the predetermined value, the process ends.

If the vehicle speed is lower than the predetermined value, the illuminance determination unit 621 determines whether or not the reflectance of the road surface 300 is smaller than the predetermined value in accordance with the road surface signal received from the road surface analyzer 602 (step S1102).

If the reflectance is smaller than the predetermined value, the illuminance determination unit 621 determines the target illuminance value of the condensing mark 400, and further determines the duty ratio (light source duty ratio) under the pulse width modulation control (step S1103). The illuminance determination unit 621 outputs the lighting signal that contains the light source duty ratio information to the direction determination unit 622 (step S1104). Meanwhile, if the reflectance is equal to or larger than the predetermined value, the process ends.

Upon reception of the lighting signal, the direction determination unit 622 determines whether or not the direction indication signal indicating the right turn has been received (step S1105).

If the direction indication signal indicating the right turn has been received, the direction determination unit 622 outputs the lighting instruction signal to the right turn optical device 100R (step S1106). Then the process ends.

If the direction indication signal indicating the right turn has not been received, the direction determination unit 622 determines whether or not the direction indication signal indicating the left turn has been received (step S1107).

If the direction indication signal indicating the left turn has been received, the direction determination unit 622 outputs the lighting instruction signal to the left turn optical device 100L (step S1108). Then the process ends.

If the direction indication signal indicating the left turn has not been received, the own vehicle position determination unit 623 determines whether or not the current position of the own vehicle is in the blind spot (step S1109). If it is determined that the own vehicle is in the blind spot, the determination result is output to the direction determination unit 622.

If receiving the determination that the own vehicle is in the blind spot, the direction determination unit 622 outputs the lighting instruction signal to the forward optical device 100F (step S1110). The process then ends.

Meanwhile, if it is determined that the own vehicle is not in the blind spot, the process ends.
[Reflector Configuration]

As described above, six optical devices 100 are employed for the embodiment. As FIG. 14B shows, the first forward optical device 100Fa is disposed at a position 600 mm in height, and displays the arrowhead pattern on the road surface 300 at the position of 2000 mm ahead. Accordingly, the display may be performed by the optical devices 100 according to the first embodiment, which has been described referring to FIGS. 4A to 7C. The irradiated surface 301 corresponds to the road surface 300, and the nichia NCDA170C (2301 m) is employed for the light source 110.

Figure 19:
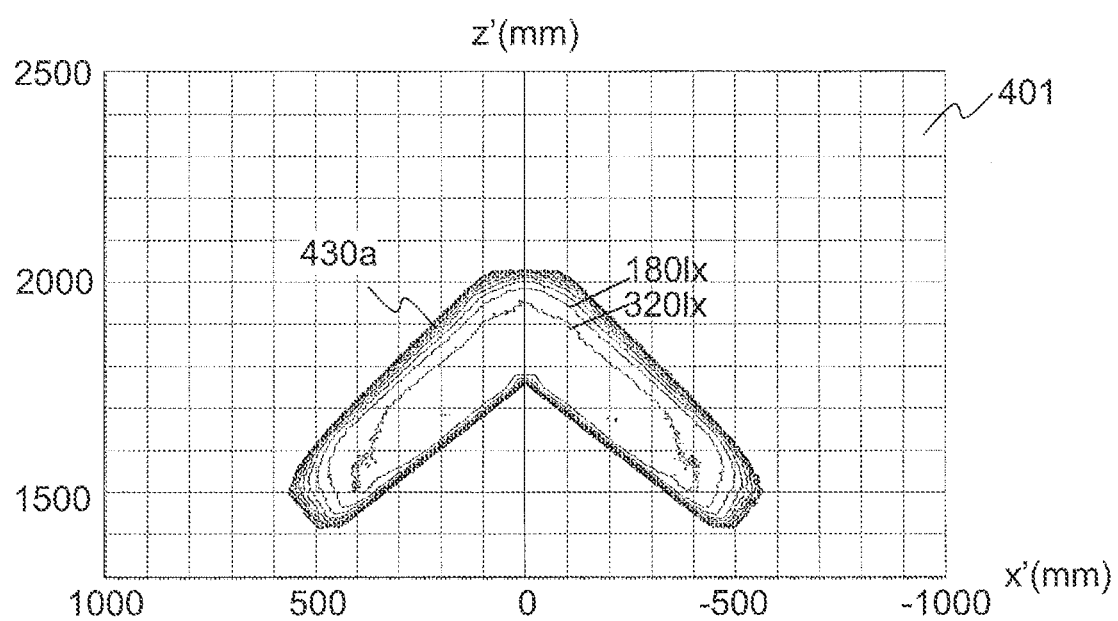
FIG. 19 is a view showing a result of simulating an irradiation image formed by a first forward optical device according to the third embodiment.

FIG. 19 shows the result of ray tracing simulation of the illuminance distribution on the road surface 300, which has been derived from the first forward optical device 100Fa. Referring to the drawing, the first forward optical device 100Fa forms an orange-colored forward pattern 430a on the pattern display region 401 of the road surface 300.

An example of the positional relationship between the shape of the reflector 120 and the light source 110 will be described with respect to the second forward optical device 100Fb and the right turn optical devices (first right turn optical device 100Ra and the second right turn optical device 100Rb) to be constituted by the reflector 120, which represent those including the second forward optical device 100Fb, and right/left turn optical devices. The explanation will be further made by setting the irradiated surface 301 to the road surface 300 in reference to the coordinate system 911 that has been used for explanation of the optical device 100 according to the first embodiment. The explanation of the exemplified case will be made in the state where they are arranged at the positions as shown in FIG. 14B to display the shapes as specified in FIG. 14B at the display position as shown in FIG. 14B on the road surface 300.
[Second Forward Optical Device]

An example of the positional relationship between the shape of the effective region on the reflection surface 121 of the reflector 120 of the second forward optical device 100Fb, and the light source 110 will be explained referring to FIGS. 20A to 22. The second forward optical device 100Fb forms the forward pattern 430b with the arrowhead shape on the road surface 300 located 600 mm below the optical device at the position of 1200 mm ahead.

Figure 20B:
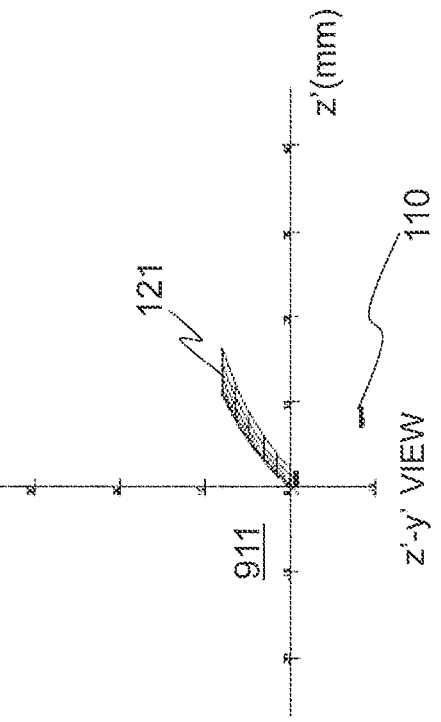
FIGS. 20A to 20D are explanatory views each showing a positional relationship between an effective region on a reflection surface of a reflector of a second forward optical device and a light source according to the third embodiment.
Figure 20D:
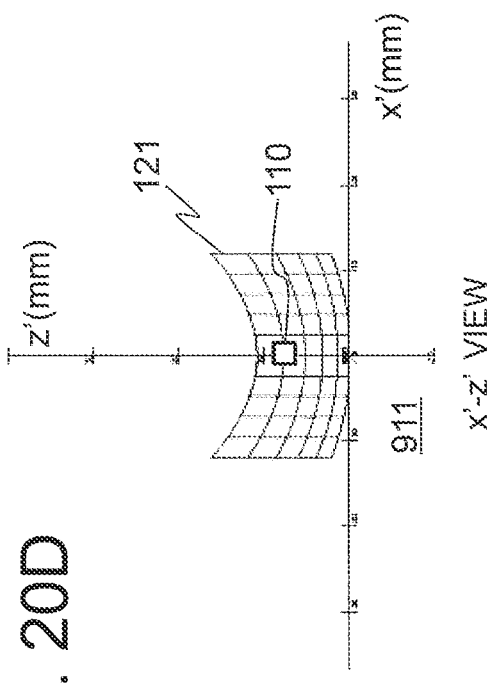
Figure 20A:
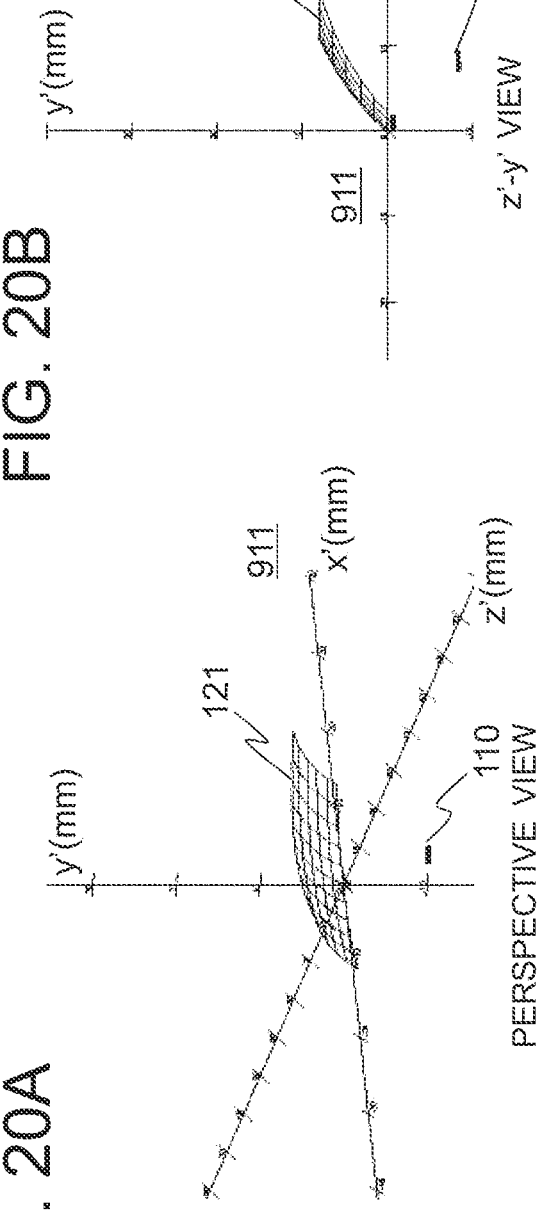
Figure 20C:
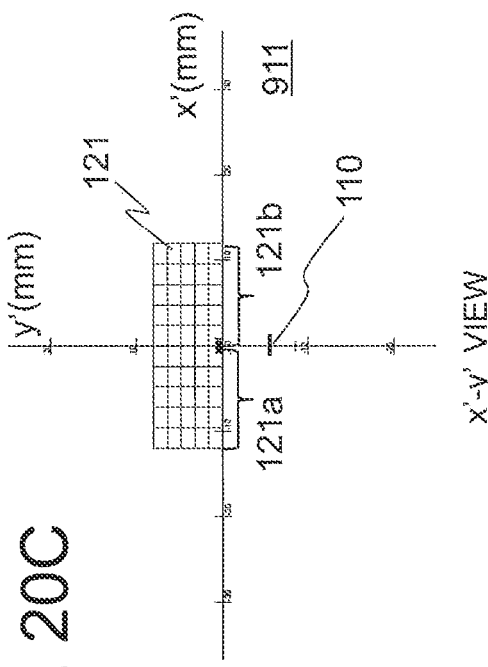

FIGS. 20A to 20D are views each showing a positional relationship between the effective region of the reflection surface 121 of the reflector 120, and the light source 110. FIG. 20A is a perspective view. FIG. 20B is a z'-y' plan view. FIG. 20C is an x'-y' plan view. FIG. 20D is an x'-z' plan view.

In this case, the light source 110 which is the same as that of the optical device 100 according to the first embodiment is employed. The first region 121a and the second region 121b have the same settings.

The center coordinate of the light emitting region of the light source 110 is set to (0, −8.5, 7.5). The pattern display region 401 ranges from 700 mm to 1200 mm in the z'-axis direction. The first region 121a reflects the light to form the first irradiation image as the partial irradiation image on the region ranging from −400 mm to 0 mm at the x'-coordinate, in the pattern display region 401. The second region 121b reflects the light to form the second irradiation image as the partial irradiation image on the region ranging from 0 mm to 400 mm at the x'-coordinate, in the pattern display region 401.

The point sequence data of the effective regions of the first region 121a and the second region 121b each in the free-form surface shape are shown in a table 541 of FIG. 21, and a table 542 of FIG. 22, respectively. In this case, the point sequence data represent a direction cosine (l', m', n') of each position (x', y', z') of the coordinate system 911.

Figure 23:
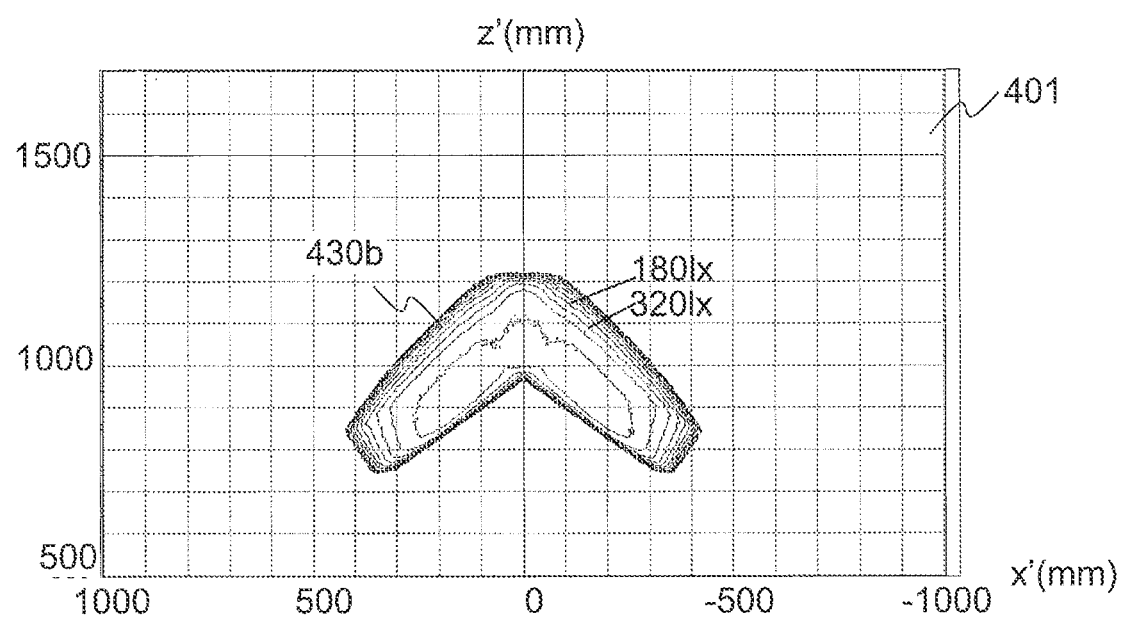
FIG. 23 is a view showing a result of simulating an irradiation image formed by the second forward optical device according to the third embodiment.

FIG. 23 shows a result of ray tracing simulation of the illuminance distribution on the road surface 300 derived from the above-specified second forward optical device 100Fb. In this case, the nichia NCDW170C (350 lm) selected from the LED with the above-described light emitting region is employed for the light source 110 so that the irradiation image is formed on the road surface 300.

As the drawing shows, the second forward optical device 100Fb forms the forward pattern 430b on the pattern display region 401 of the road surface 300.

[First Right Turn Optical Device]

An example of a positional relationship between the shape of the effective region on the reflection surface 121 of the reflector 120 of the first right turn optical device 100Ra, and the light source 110 will be described referring to FIGS. 24A to 26. The first right turn optical device 100Ra forms the arrowhead right turn pattern 450a that has been rotated clockwise at 45° on the road surface 300 located 600 mm below the optical device at the position 2221 mm forward as shown in FIG. 14B.

Figure 24B:
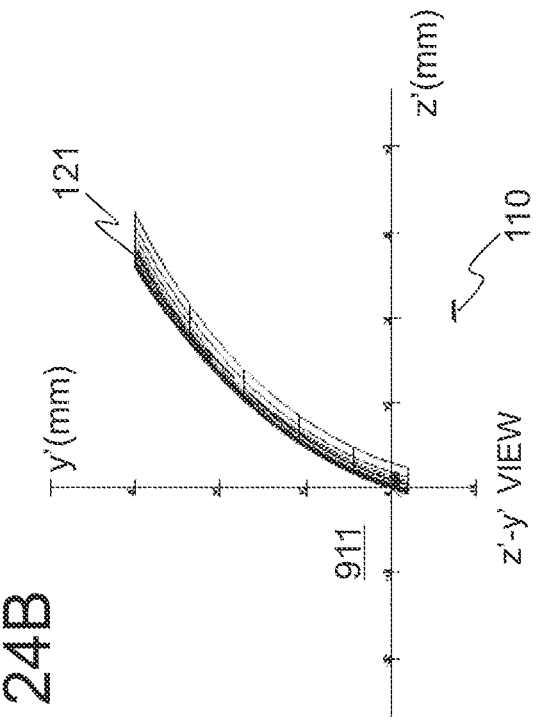
FIGS. 24A to 24D are explanatory views each showing a positional relationship between an effective region on a reflection surface of a reflector of a first right turn optical device and a light source according to the third embodiment.
Figure 24D:
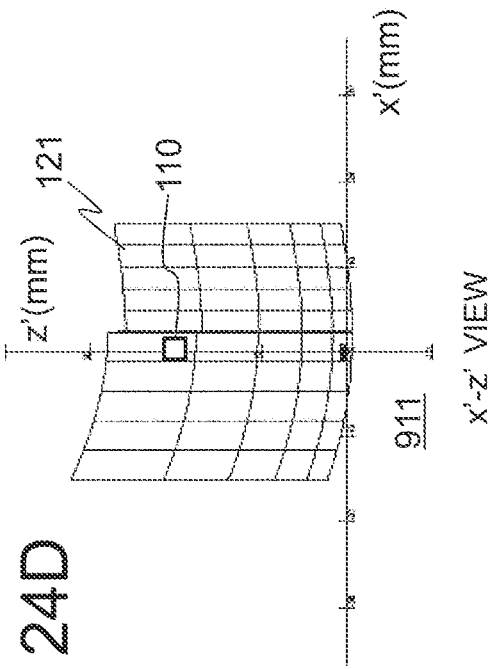
Figure 24A:
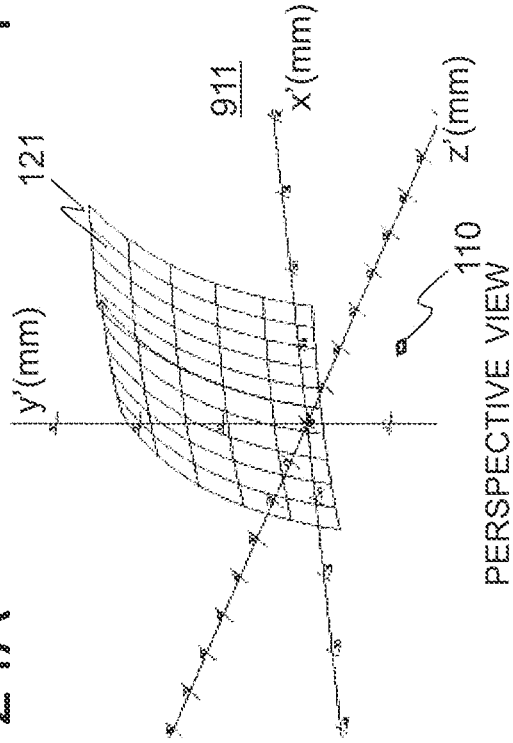
Figure 24C:
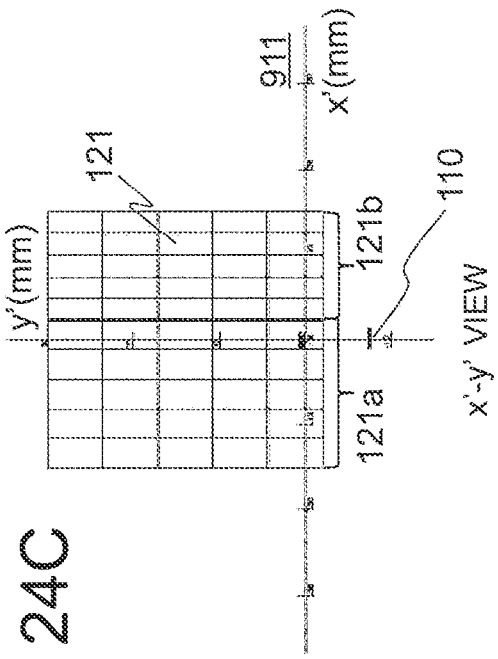

FIGS. 24A to 24D are views each showing a positional relationship between the effective region on the reflection surface of the reflector 120, and the light source 110. FIG. 24A is a perspective view. FIG. 24B is a z'-y' plan view. FIG. 24C is an x'-y' plan view. FIG. 24D is an x'-z' plan view.

In this case, the light source 110 which is the same as that of the first forward optical device 100Fa is used. The center coordinate of the light emitting region of the light source 110 is also the same.

The pattern display region 401 ranges from 1461 mm to 2321 mm in the z'-axis direction. As FIG. 24C shows, the first region 121a and the second region 121b are obtained by dividing the reflection surface 121 of the reflector 120 by the plane parallel to the z'-y' plane while passing through the point (2.3, 0, 0) of the coordinate system 911. Referring to the drawing, the left section is the first region 121a, and the right section is the second region 121b. The first region 121a reflects the light to form the first irradiation image as the partial irradiation image on the region ranging from −200 mm to 200 mm at the x'-coordinate, in the pattern display region 401. The second region 121b reflects the light to form the second irradiation image as the partial irradiation image on the region ranging from −200 mm to 650 mm at the x'-coordinate, in the pattern display region 401.

Point sequence data of the effective regions of the first region 121a and the second region 121b are shown in a table 551 of FIG. 25, and a table 552 of FIG. 26, respectively. In this case, the point sequence data represent a direction cosine (l', m', n') of each position (x', y', z') of the coordinate system 911.

Figure 27A:
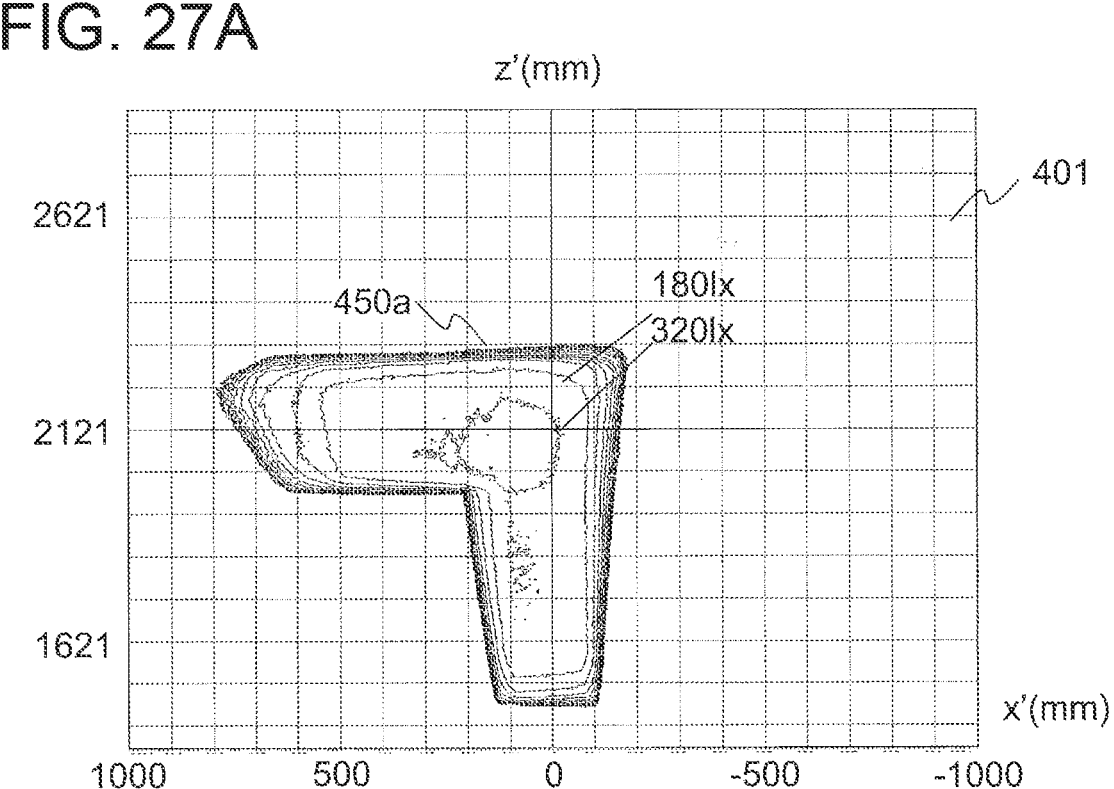
FIG. 27A is a view showing a result of simulating an irradiation image formed by the first right turn optical device according to the third embodiment.

FIG. 27A shows a result of ray tracing simulation of the illuminance distribution on the road surface 300, which has been derived from the above-specified first right turn optical device 100Ra. In this case, the nichia NCDA170C (2301 m) selected from the LED with the above-described light emitting region is employed for forming the irradiation image on the road surface 300.

As shown in the drawing, the first right turn optical device 100Ra forms the right turn pattern 450a on the pattern display region 401 of the road surface 300.

[Second Right Turn Optical Device]

Figure 28B:
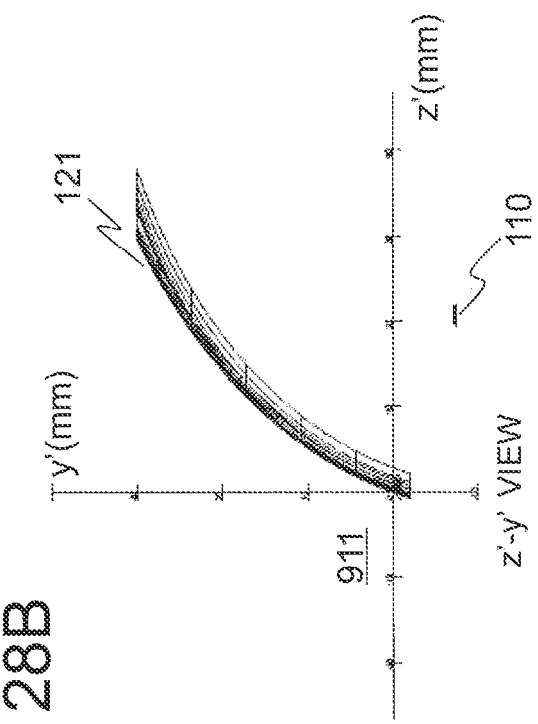
FIGS. 28A to 28D are explanatory views each showing a positional relationship between an effective region on a reflection surface of a reflector of the second right turn optical device and a light source according to the third embodiment.
Figure 28D:
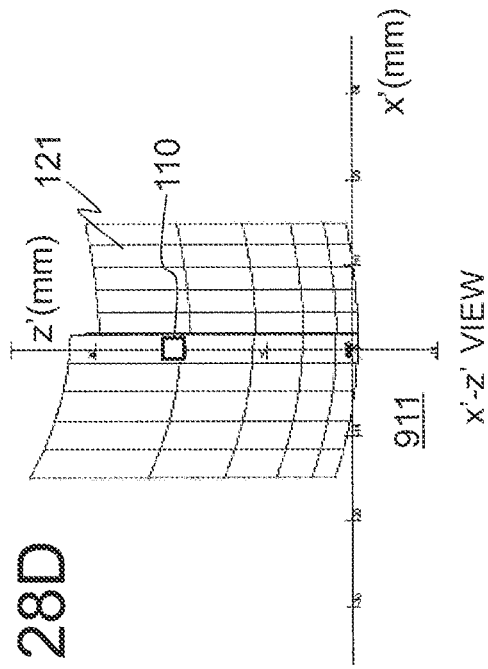
Figure 28A:
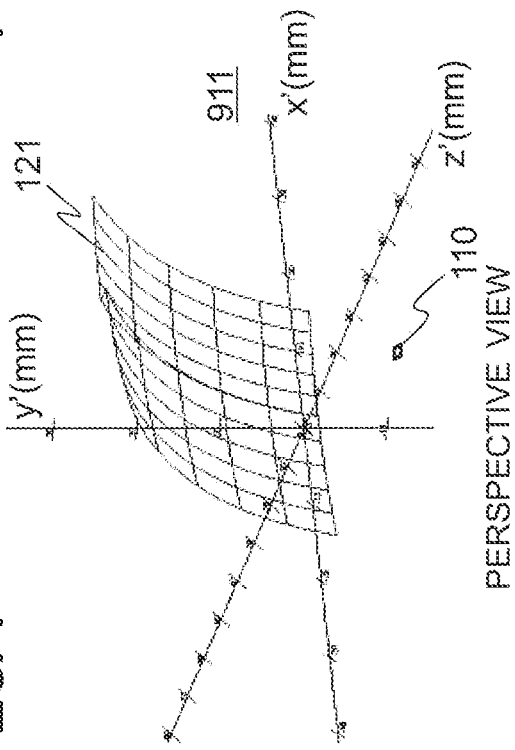

An example of a positional relationship between the shape of the effective region on the reflection surface 121 of the reflector 120 of the second right turn optical device 100Rb, and the light source 110 will be described referring to FIGS. 28A to 29. The second right turn optical device 100Rb forms the arrowhead right turn pattern 450b that has been rotated clockwise at 26.57° on the road surface 300 located 600 mm below the optical device at the position 1777 mm forward as shown in FIG. 14B.

In this case, the light source 110 which is the same as that of the optical device 100 according to the first embodiment is used. The center coordinate of the light emitting region of the light source 110 is also the same.

Figure 28C:
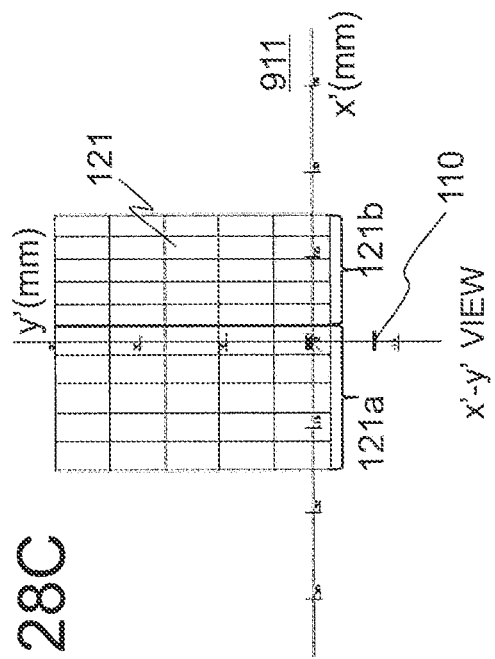

The pattern display region 401 ranges from 1177 mm to 1777 mm in the z'-axis direction. As FIG. 28C shows, the first region 121a and the second region 121b are obtained by dividing the reflection surface 121 of the reflector 120 by the plane parallel to the z'-y' plane while passing through the point (3, 0, 0) of the coordinate system 911. Referring to the drawing, the left section is the first region 121a, and the right section is the second region 121b. The first region 121a reflects the light to form the first irradiation image as the partial irradiation image on the region ranging from −150 mm to 150 mm at the x'-coordinate, in the pattern display region 401. The second region 121b reflects the light to form the second irradiation image as the partial irradiation image on the region ranging from −150 mm to 550 mm at the x'-coordinate, in the pattern display region 401.

Point sequence data of the effective regions of the first region 121a and the second region 121b as the free-form surface shapes are shown in a table 561 of FIG. 29, and a table 562 of FIG. 30, respectively. In this case, the point sequence data represent a direction cosine (l', m', n') of each position (x', y', z') of the coordinate system 911.

Figure 27B:
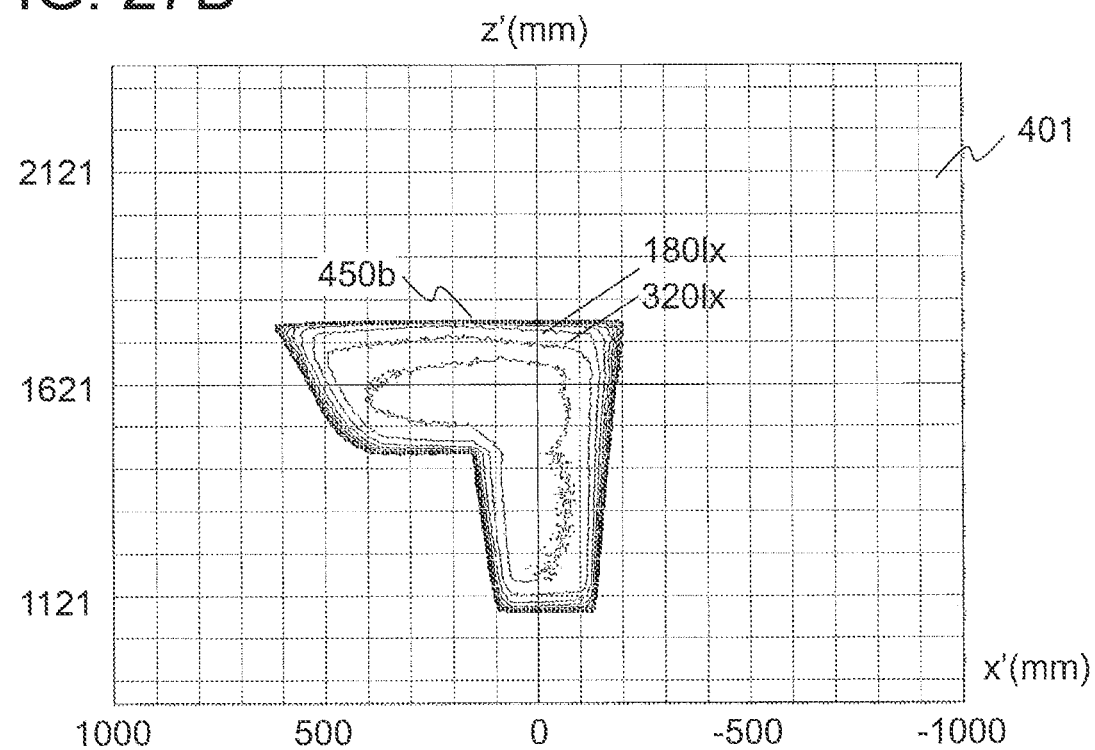
FIG. 27B is a view showing a result of simulating an irradiation image formed by the second right turn optical device according to the third embodiment.

FIG. 27B shows a result of ray tracing simulation of the illuminance distribution on the road surface 300, which has been derived from the above-specified second right turn optical device 100Rb. In this case, the nichia NCDA170C (3501 m) selected from the LED with the above-described light emitting region is employed for the light source 110 to form the irradiation image on the road surface 300.

As shown in the drawing, the second right turn optical device 100Rb forms the right turn pattern 450a on the pattern display region 401 of the road surface 300.

As described above, the embodiment provides the direction display device 600 using the optical devices 100, 101 which have been explained in the first embodiment and/or the second embodiment. In other words, the embodiment allows the simple structure to form the shape indicating the specific intention on the road surface 300 while exhibiting excellent light utilization efficiency. This makes it possible to notify others (driver of the other vehicle, pedestrian) of existence of the own vehicle, and furthermore, the possible intention such as the course of the own vehicle.

FIGS. 31A to 31F are views each showing a simulation result of the view of the condensing mark 400 on the road surface 300 to the front of the vehicle 200 using the above-described optical device 100, which has been seen from the other vehicle 202. In this case, as FIG. 16 shows, the other vehicle 202 is located in the distance, more specifically, 60 m apart from the own vehicle on the road orthogonal to the one on which the own vehicle exists.

As described above, among the condensing marks irradiated by the forward optical device 100F, the left turn optical device 100L, the right turn optical device 100R, those distant from the vehicle 200 (forward pattern 430a, left turn pattern 440a, right turn pattern 450a) are orange-colored. The condensing marks close to the vehicle (forward pattern 430b, left turn pattern 440b, right turn pattern 450b) are white-colored. The left turn patterns 440a and 440b are positioned side by side in the travelling direction of the other vehicle 202. Likewise, the right turn patterns 450a and 450b are positioned side by side in the travelling direction of the other vehicle 202.

FIG. 31A shows an example that each of the left turn patterns 440a, 440b is displayed in the different color as indicated by FIG. 14B. FIG. 31B shows an example that the left turn patterns 440a, 440b are displayed in the same color. FIG. 31C shows an example that each of the forward patterns 430a, 430b is displayed in the different color as indicated by FIG. 14B. FIG. 31D shows an example that the forward patterns 430a, 430b are displayed in the same color. FIG. 31E shows an example that each of the right turn patterns 450*a*, 450*b* is displayed in the different color as indicated by FIG. 14B. FIG. 31F shows an example that the right turn patterns 450*a*, 450*b* are displayed in the same color.

As the drawings show, the respective condensing marks 400 look deformed from a distance (60 m ahead). In the embodiment, upon right or left turn, two condensing marks 400 are displayed to be seen from others that they are vertically overlapped and differently colored as well. This makes the direction intending to go of the own vehicle, that is, the intention of the driver easily predictable. Especially, the arrow indicating the travelling direction of the own vehicle (arrow distant from the own vehicle) is preliminarily set, and further set to be in the fixed color so that the intention is further clarified.

Normally, others are not necessarily located at the fixed position relative to the own vehicle. The view of the condensing mark 400 displayed by the own vehicle seen from others located relatively close thereto becomes different from the view seen from a distance.

Assuming that the driver of the other vehicle 202 sees the condensing mark 400 from the height of 1.2 m. In the case that the driver is positioned 60 m ahead of the own vehicle, he/she will see the condensing mark 400 that looks contracted by approximately 0.19 times in the lateral direction, and approximately 0.04 times in the depth direction compared with the case that he/she is located 10 m ahead.

In other words, the condensing mark designed to be observed by others located nearby hardly allows those located in a distance to determine the own vehicle intention. Meanwhile, the condensing mark designed to be observed by others located in a distance hardly allows those located nearby to determine the own vehicle intention.

In the embodiment, the two of more condensing marks 400 indicating travelling directions may be displayed in case of a left turn or a right turn. The condensing mark 400 close to the own vehicle may be displayed in a color different from the one distant from the own vehicle.

When others near the own vehicle see the condensing mark 400, the direction display device 600 of the embodiment allows those who have seen the condensing mark 400 to easily recognize the own vehicle intention. When others distant from the own vehicle see the condensing mark 400, the detailed shape is hard to distinguish, but the condensing mark 400 may be seen in the state having two colors overlapped with each other. Depending on the state that a specific color is seen at either an upper or lower position, others can judge easily whether the own vehicle is about to turn to the right or the left. In the case of a forward mark, the two colors may be seen separately. It is therefore others can judge easily that the own vehicle will move forward movement.

The direction display device 600 of the embodiment makes others aware of the direction intending to go regardless of positions where they are located at. The embodiment ensures to realize the direction display device 600 which is simply structured at low costs while exhibiting high light utilization efficiency.

The lens 170 may be employed as the optical element for the direction display device 600 of the embodiment.

In the case of an example according to the embodiment, each of the forward optical device 100F, the left turn optical device 100L, and the right turn optical device 100R includes two optical devices, which are configured to display the differently colored condensing marks in accordance with the distance from the vehicle. However, the number of the optical devices 100 to be arranged in the respective directions is not limited. It is possible to provide three or more optical devices 100 in the respective directions. The respective optical devices 100 of the forward optical device 100F, the left turn optical device 100L, and the right turn optical device 100R may be configured to display differently colored condensing marks on different pattern display regions of the road surface 300.

The body 150 and the cover 140 may be shared by the optical devices 100 in the respective directions. That is, multiple pairs of the light source 110 and the reflector 120 may be stored in the single body 150.

It is possible to provide the single optical device 100, or a pair of optical devices for displaying the condensing marks side by side in the specific direction instead of disposing the optical devices 100 in the respective directions. In the above-described case, the direction display device 600 further includes a movable mechanism configured to change the direction of the optical device 100 or the pair of optical devices 100. The lamp controller 610 outputs the signal to the movable mechanism for changing the direction of the optical device 100 in accordance with the direction indication signal from the direction indicator switch 601. The movable mechanism may be formed as a motor and the like, for example.

In the embodiment, the forward optical device 100F is lit only when the own vehicle is located in the blind spot and is travelling at the speed lower than the predetermined value. However, the structure may be formed without being limited to the one as described above. The forward optical device 100F may be configured to be always lit when the direction indicator is not operated even when the own vehicle is travelling at the speed lower than the predetermined value. In the above-described case, the lamp controller 610 does not have to employ an own vehicle position determination unit 623.

In the embodiment, the optical device 100 is lit to display the condensing mark 400 only when the vehicle is stopped or low-speed traveling. The control executed in accordance with the vehicle speed is not limited to the case as described above. For example, the optical device 100 may be lit or blinked so long as it is in the environment where no pedestrian exists nearby even when the own vehicle is travelling at high speed on an motorway, etc.

In the above-described case, the lamp controller 610 determines whether the own vehicle has been traveling on the motorway in reference to the information from the position information acquisition device 604 as the navigation satellite such as GPS, and the vehicle speed sensor 603. It is possible to configure the optical device 100 to be lit or blinked based on the determination that the own vehicle has been traveling on the motorway.

In the embodiment, the condensing mark 400 indicating the travelling direction of the vehicle 200 is displayed on the road surface 300 to the front of the vehicle 200. The position at which the condensing mark 400 is displayed is not limited to the front of the vehicle 200. The mark may be displayed to the position around the vehicle 200 in the region with a predetermined range from the vehicle 200, specifically, located at least at any one of the front side, lateral side, and rear side of the vehicle 200.

For example, the optical device 100 may be disposed at the rear side of the vehicle 200 so that the condensing mark 400 is displayed to the rear of the vehicle 200 based on the signal from a not shown back gear sensor connected to the lamp controller 610, indicating that a back gear has been enabled. In the above-described case, the travelling direction upon reversing of the vehicle may be displayed on the road surface 300 to the rear of the vehicle.

In the case where the front and rear parts of the vehicle 200 are respectively provided with the optical devices 100, upon forward movement of the vehicle 200, the travelling direction may be displayed on the road surface 300 to the front of the vehicle 200. Upon backward movement, the travelling direction may be displayed on the road surface 300 to the rear of the vehicle 200.

In other words, the many kinds of travelling directions may be displayed as the condensing marks for indicating the rear in addition to the front, left, and right in the non-restricted manner. In the above-described case, the optical devices 100 may be disposed in association with the respective directions to be displayed as the condensing marks. The lamp controller 610 identifies the travelling direction of the vehicle 200 based on the detection signal of the state detection unit. The lamp controller 610 lights or blinks the optical device 100 disposed in association with the specified travelling direction.

In the above-described case, the optical devices 100 fewer than the number of the travelling directions to be displayed as the condensing marks may be configured to realize the above-described display. In other words, it is possible to employ the above-described movable mechanism for changing the direction of the optical device 100 or the pair of optical devices 100. In this case, the lamp controller 610 outputs the signal to the movable mechanism so that the travelling direction of the vehicle 200 is specified, and the condensing mark is displayed in the specified travelling direction based on the detection signal of the state detection unit. The single optical device 100 may be configured to display the condensing marks corresponding to all the travelling directions to be displayed. Alternatively, it is possible to use a pair of the first optical device 100 capable of displaying the condensing marks corresponding to all the forward travelling directions, and the second optical device 100 capable of displaying the condensing marks corresponding to all the backward travelling directions.

In this case, the respective optical devices 100 may be configured to display the condensing marks on the display regions each located differently distant from the vehicle 200, and each differently colored in accordance with the distance, on the road surface 300 as the irradiated surface.

First Modified Example

In the above-described embodiments, the arrowhead pattern is formed as the irradiation image (condensing mark) 400 indicating the specific intention on the road surface 300 as the irradiated surface. However, the condensing mark 400 to be displayed is not limited to the one as described above. For example, a shaft of an arrow may be used as the arrow pattern.

The configuration of the above-described reflector 120 will be explained referring to FIGS. 32 to 36.

In this case, the coordinate system 911 used for explaining the optical device 100 according to the first embodiment will be employed. The light source 110 which is the same as that of the optical device 100 according to the first embodiment will be used, as well as the center coordinates of the light emitting region of the light source 110.

Figure 32:
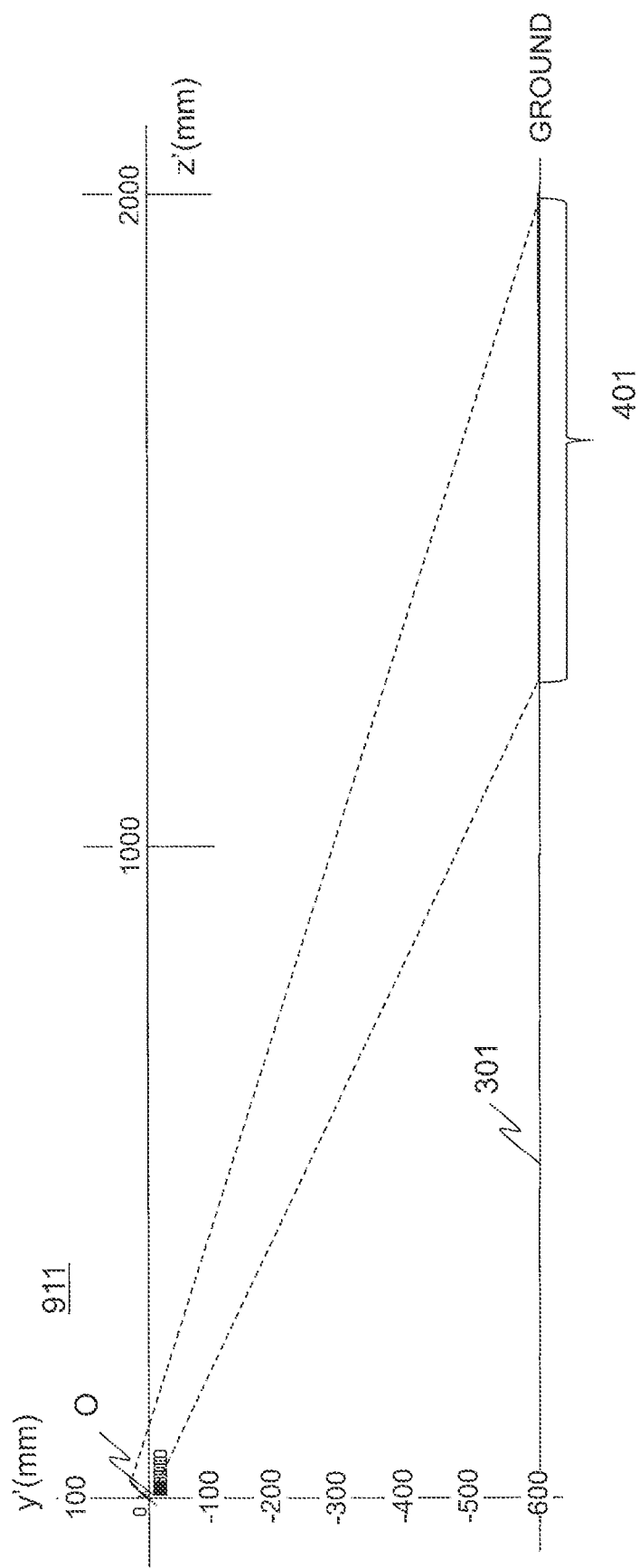
FIG. 32 is an explanatory view of a coordinate system used for explaining a structure of an optical device according to a first modified example.

As FIG. 32 shows, in the modified example, the pattern display region 401 in the z'-axis direction ranges from 1200 mm to 2000 mm. The range in the x'-axis direction is the same.

Figure 33B:
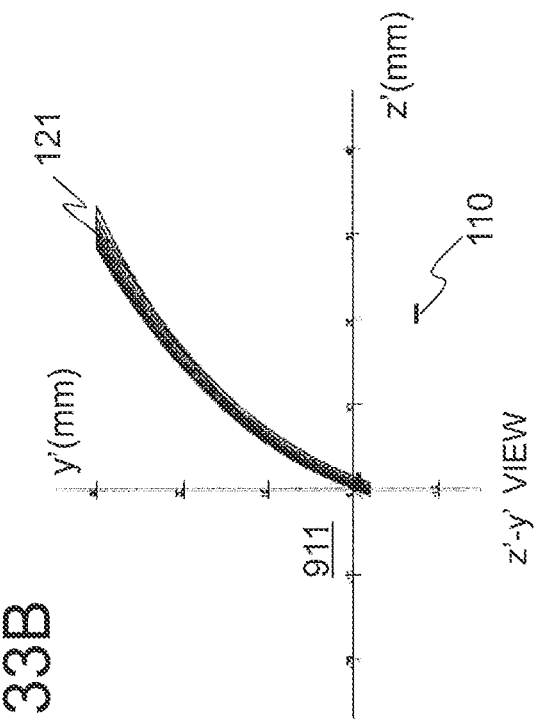
FIGS. 33A to 33D are explanatory views each showing a positional relationship between an effective region on a reflection surface of a reflector and a light source according to the first modified example.
Figure 33D:
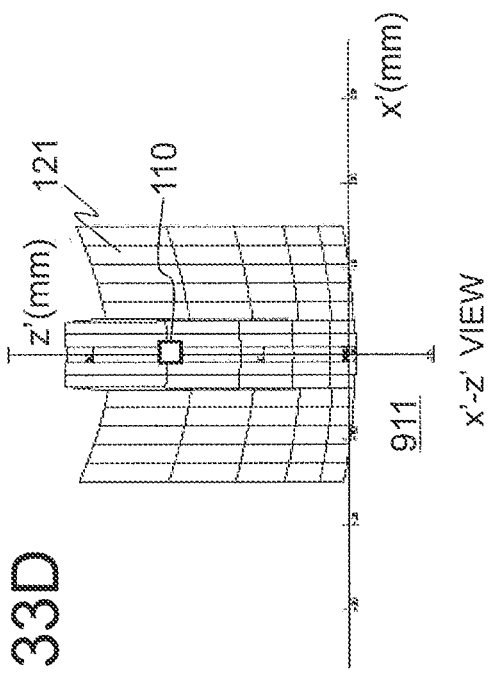
Figure 33A:
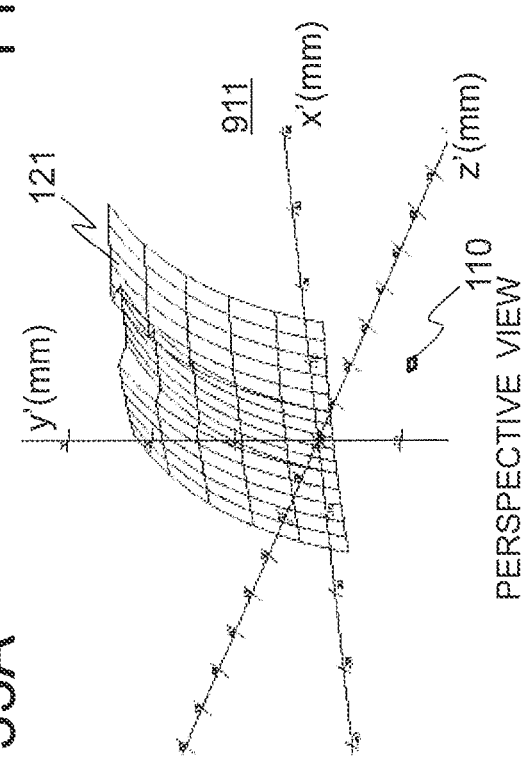
Figure 33C:
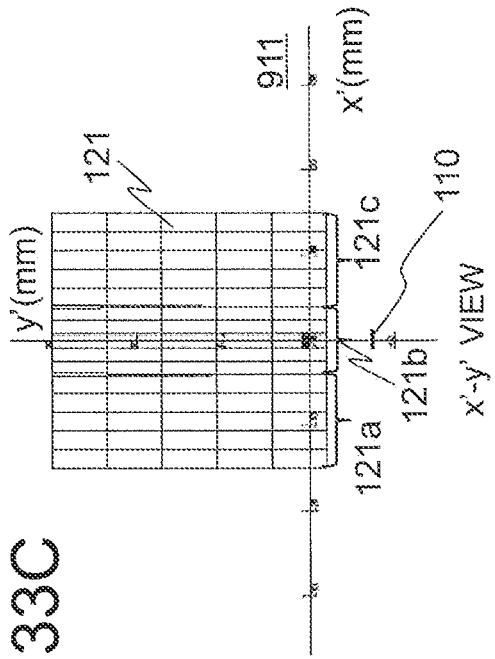

FIGS. 33A to 33D are views each showing a positional relationship between the effective region on the reflection surface 121 of the reflector 120, and the light source 110. FIG. 33A is a perspective view. FIG. 33B is a Z'-y' plan view. FIG. 33C is an x'-y' plan view. FIG. 33D is an x'-z' plan view.

In the modified example, as FIG. 33C shows, the reflection surface 121 of the reflector 120 includes three different free-form surface regions (first region 121a, second region 121b, third region 121c). As FIG. 33C shows, the first region 121a, the second region 121b and the third region 121c are obtained by dividing the reflection surface 121 of the reflector 120 by a plane parallel to the z'-y' plane passing through the point (−4, 0, 0), and a plane parallel to the z'-y' plane passing through the point (4, 0, 0) at the coordinate system 911. Referring to the drawing, the left region is the first region 121a, the center region is the second region 121b, and the right region is the third region 121c. The first region 121a reflects the light to form a first irradiation image as the partial irradiation image on the region ranging from −500 mm to 0 mm at the x'-coordinate, in the pattern display region 401. The second region 121b reflects the light to form a second irradiation image as the partial irradiation image on the region ranging from −100 mm to 100 mm at the x'-coordinate, in the pattern display region 401. The third region 121c reflects the light to form a third irradiation image as the partial irradiation image on the region ranging from 0 mm to 500 mm at the x'-coordinate, in the pattern display region 401.

The respective point sequence data of the effective regions as the free-form surface shapes of the first region 121a, the second region 121b, and the third region 121c are shown in a table 571 of FIG. 34, a table 572 of FIG. 35, and a table 573 of FIG. 36. In this case, the point sequence data represent a direction cosine (l', m', n') of each position (x', y', z') of the coordinate system 912.

FIGS. 37A to 37D are views each showing a result of the ray tracing simulation of the illuminance distribution on the irradiated surface 301 derived from the above-specified optical device 100. In this case, the nichia NCDW170C (350 lm) selected from the LED with the above-described light emitting region is used for forming the irradiation image on the irradiated surface 301.

Figure 37A:
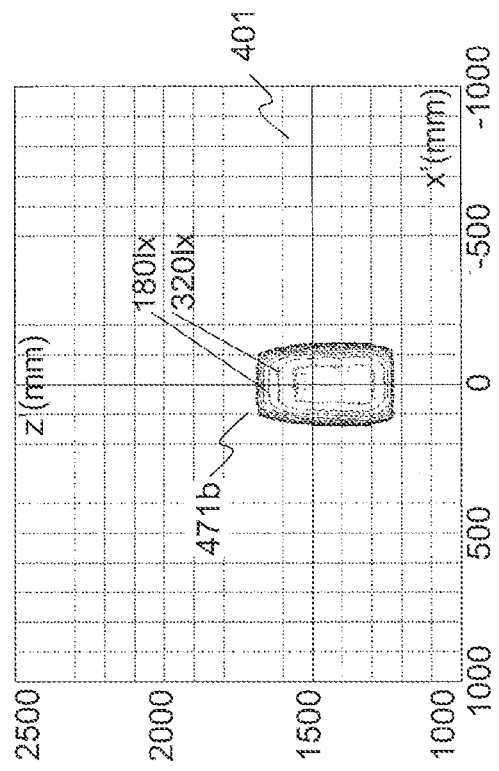
FIG. 37A shows a result of simulating an irradiation image formed on the first region of the reflection surface of the reflector according to the first modified example.
Figure 37B:
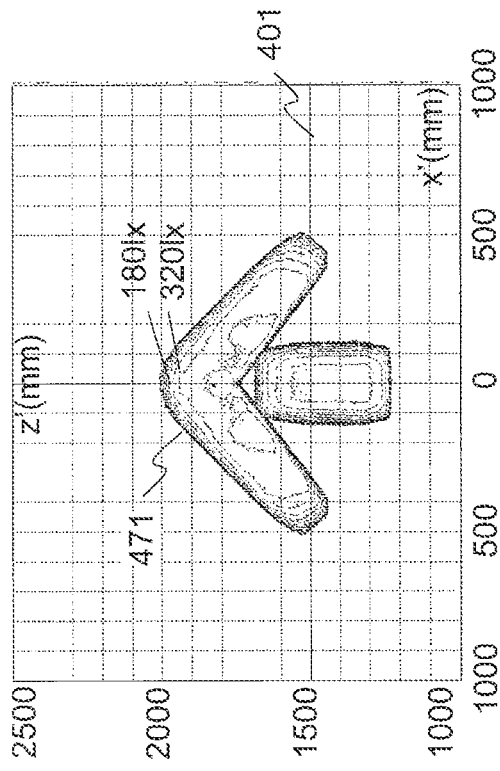
FIG. 37B shows a result of simulating an irradiation image formed on the second region of the reflection surface of the reflector according to the first modified example.
Figure 37C:
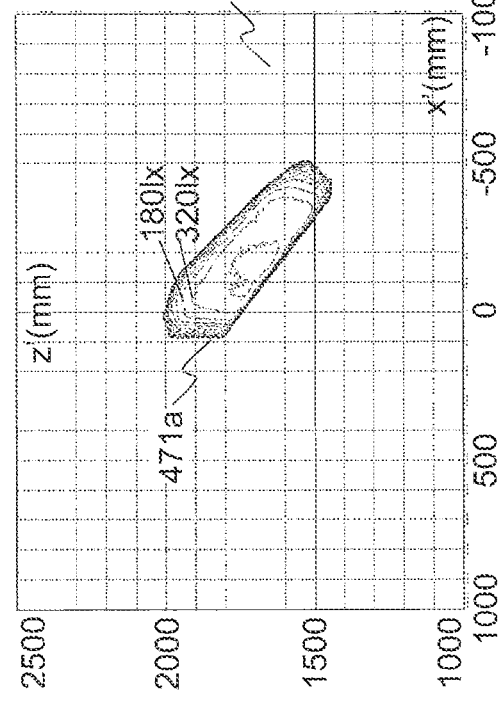
FIG. 37C shows a result of simulating an irradiation image formed on the third region of the reflection surface of the reflector according to the first modified example.
Figure 37D:
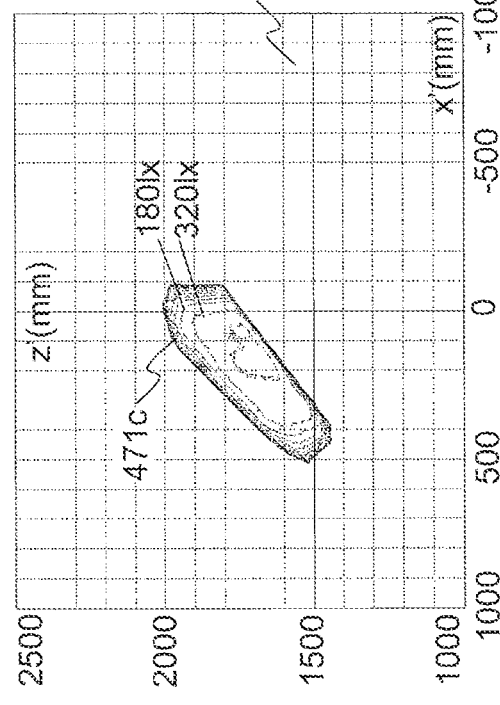
FIG. 37D shows a result of simulating an irradiation image on the reflection surface of the reflector according to the first modified example.

FIG. 37A shows an illuminance distribution (first irradiation image) 471a on the pattern display region 401 of the irradiated surface 301, which has been derived from reflection of the light irradiated from the light source 110 at the first region 121a. FIG. 37B shows an illuminance distribution (second irradiation image) 471b on the pattern display region 401 of the irradiated surface 301, which has been derived from reflection at the second region 171b. FIG. 37C shows an illuminance distribution (third irradiation image) 471c on the pattern display region 401 of the irradiated surface 301, which has been derived from reflection at the third region 121c. FIG. 37D shows an illuminance distribution (condensing mark) 471 derived from the first region 121a, the second region 121b, and the third region 121c.

As FIG. 37D shows, the optical device 100 of the modified example allows formation of the arrow condensing mark 471 on the pattern display region 401 of the irradiated surface 301.

In the modified example, the lens 170 may be employed as the optical element.

The condensing mark indicating the specific intention is not limited to the one indicating the direction such as the arrowhead and the arrow. For example, the deflection surface may be divided into a plurality of divided regions so that different partial irradiation images are formed on the irradiated surface 301, for example, X-shape, polygonal shape, and the like. The resultant partial irradiation images may be combined to form various marks to be displayed.

Second Modified Example

The above-described embodiments and modified example have been described as the exemplified case that the optical device 100 includes the single light source 110. However, multiple light sources 110 may be employed. Light from the multiple light sources 110 are condensed by the single optical element so that the resultant irradiation images are formed on the irradiated surface 301 at the different positions.

An explanation will be made with respect to the use of the optical device 102 which includes two light sources 110, and the reflector 120 as the optical element. If the two light sources 110 of the optical device 102 have to be discriminated from each other, they will be referred to as a first light source 110*a* and a second light source 110*b*.

FIGS. 38A to 38D are views each showing a positional relationship between the effective region of the reflection surface 121 of the reflector 120, and centers of the light emitting regions of the first light source 110*a* and the second light source 110*b*.

Figure 38B:
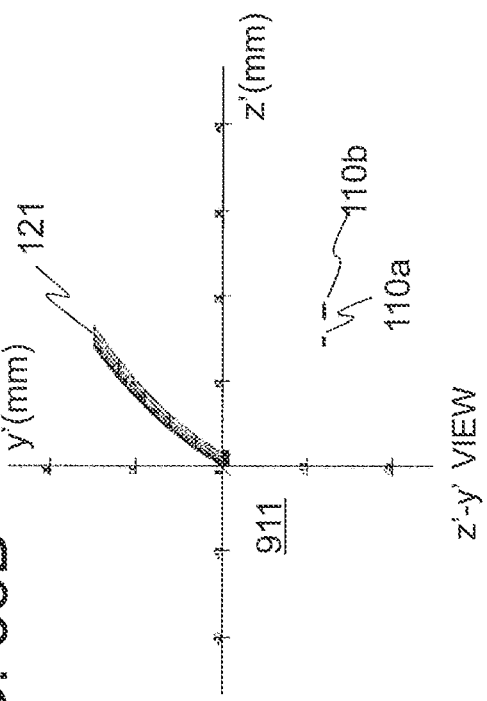
FIGS. 38A to 38D are explanatory views each showing a positional relationship between an effective region on a reflection surface of a reflector and a light source according to a second modified example.
Figure 38D:
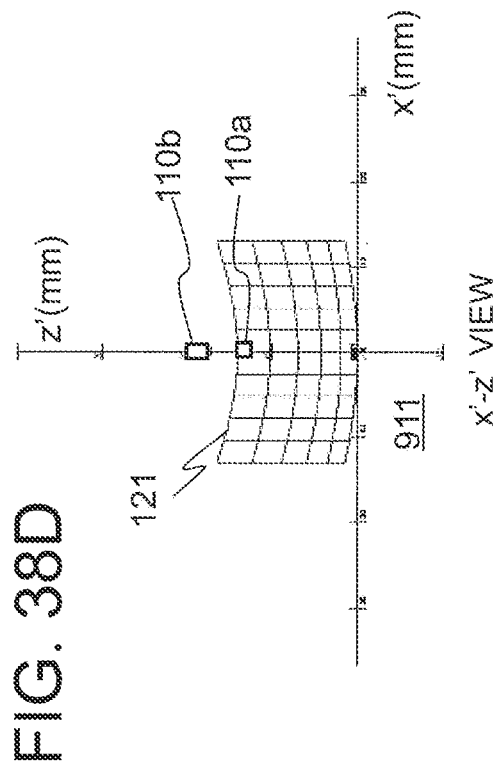
Figure 38A:
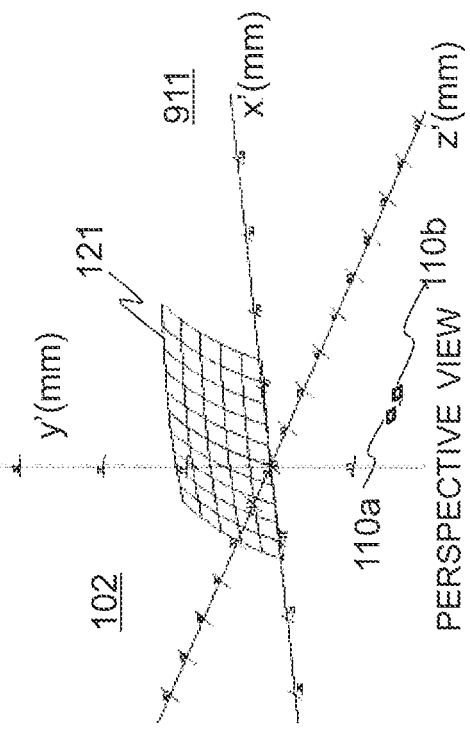
Figure 38C:
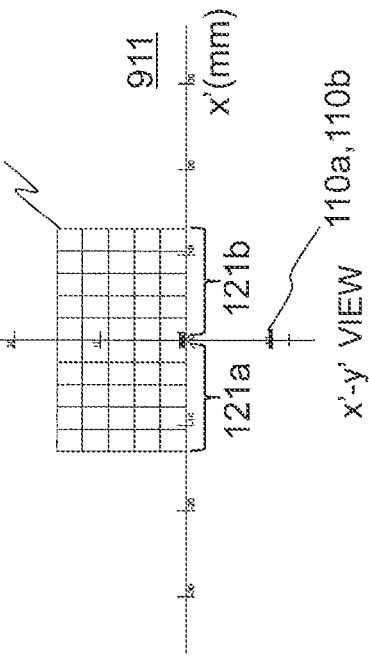

FIGS. 38A to 38D are views each showing the positional relationship between the effective region of the reflection surface 121 of the reflector 120, and the light sources 110. FIG. 38A is a perspective view. FIG. 38B is a z'-y' plan view. FIG. 38C is an x'-y' plan view. FIG. 38D is an x'-z' plan view.

In this case, the same coordinate system 911 as that of the first embodiment is employed. The light emitting region of the first light source 110*a* has the same shape as that of the light source 110 employed in the above-described embodiment. In other words, the LED (nichia NCSA170C) having the light emitting region of 1.15 mm in the x'-axis direction and 1.15 mm in the z'-axis direction is employed. It is disposed so that the center coordinates of the light emitting region is set to (0, −12, 13.5), and the center axis direction of the directional angle coincides with the y'-axis direction.

The LED (nichia NC2W170C) having the light emitting region of 1.15 mm in the x'-axis direction, and 2.3 mm in the z'-axis direction is employed as the second light source 110*b*. It is disposed so that the center coordinates of the light emitting region is set to (0, −12, 18.3), and the center axis direction of the directional angle coincides with the y'-axis direction.

An exemplary case will be explained with respect to shapes of the reflector 120 forming two arrowheads as the irradiation image 400 on the pattern display region 401 of the irradiated surface 301.

The pattern display region 401 defined by the light from the first light source 110*a* ranges from 1500 mm to 2300 mm in the z' axis direction, and ranges from −500 mm to 500 mm in the x'-axis direction. The pattern display region defined by the light from the second light source 110*b* ranges from 1000 mm to 1350 mm in the z'-axis direction, and ranges from −500 mm to 500 mm in the x'-axis direction.

The basic structure of the reflection surface 121 of the reflector 120 is the same as that of the first embodiment. In other words, as FIG. 38C shows, the reflection surface 121 includes the first region 121*a* and the second region 121*b* obtained by dividing the reflection surface 121 by the plane parallel to the z'-y' plane while passing through the origin of the coordinate system. The first region 121*a* and the second region 121*b* have free-form surface shapes which are different from each other.

The first region 121*a* reflects the light to form a first irradiation image as the partial irradiation image on the region ranging from −500 to 0 mm at the x'-coordinates, in the pattern display region 401. The second region 121*b* reflects the light to form a second irradiation image as the partial irradiation image on the region ranging from 0 mm to 500 mm at the x'-coordinates, in the pattern display region 401.

Point sequence data of the effective regions of the first region 121*a* and the second region 121*b* each having the free-form surface shape are shown in a table 581 of FIG. 39, and a table 582 of FIG. 40, respectively. The point sequence data represent a direction cosine (l', m', n') of each position (x', y', z') of the coordinate system 911.

Figure 41:
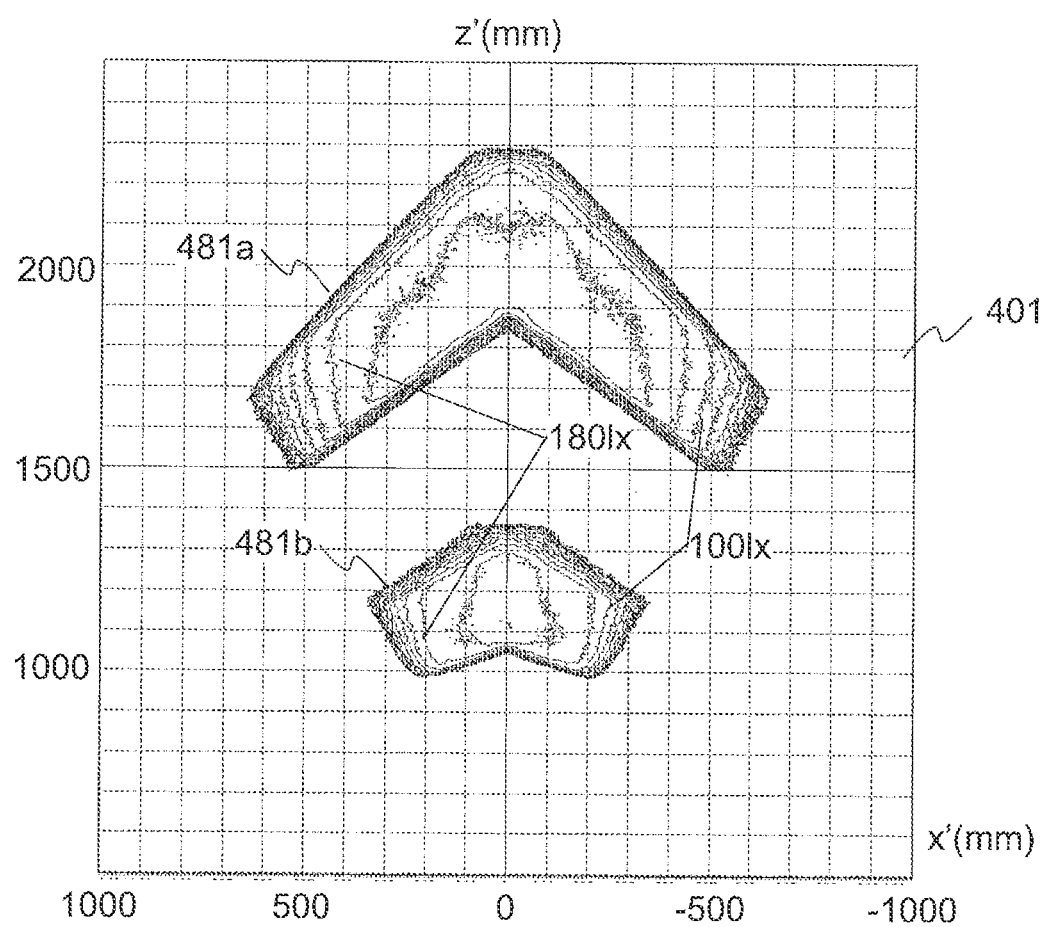
FIG. 41 is a view showing a result of simulating an irradiation image formed on the reflection surface of the reflector according to the second modified example.

FIG. 41 shows a result of ray tracing simulation of the illuminance distribution on the irradiated surface 301 derived from the above-specified optical device 102. In the above-described simulation, the luminous flux of the LED used for the first light source 110*a* is set to 230 lm, and the luminous flux of the LED used for the second light source 110*b* is set to 90 lm.

In the drawing, an illuminance distribution (condensing mark) 481*a* is obtained by the light from the first light source 110*a*, and an illuminance distribution (condensing mark) 481*b* is obtained by the light from the second light source 110*b*.

As the drawing shows, the use of the two light sources 110 allows two arrowhead patterns to be displayed on the pattern display region 401 of the irradiated surface 301.

In the case that light rays from multiple light sources 110 are condensed by the single optical element to form multiple irradiation images on the irradiated surface 301 at different positions, it is preferable to make each illuminance of the respectively formed irradiation images similar to each other.

As the light sources 110 are different in the light emitting region, the distance from the reflector 120, and the size of the irradiation image to be irradiated, each illuminance value corresponding to the respective light sources 110 may differ significantly even if each luminous flux of the light emitted from the respective light sources 110 is the same. In consideration of the above-described finding, the luminous flux of the light emitted from the respective light sources 110 are preliminarily set to different values so that each illuminance of the irradiation images corresponding to the respective light sources 110 is made substantially the same.

Each value of the luminous flux of the light sources 110 is set so that each illuminance of the irradiation images to be irradiated is made substantially the same based on the preliminary research on the relationship between the luminous flux of the respective light sources 110, and the illuminance values of the corresponding irradiation images.

In the example as shown in FIG. 41, the luminous flux of the LED used for the first light source 110*a* is set to 230 lm, and the luminous flux of the LED used for the second light source 110*b* is set to 90 lm so as to make the respective illuminance values of the condensing marks 481*a* and 481*b* substantially the same.

The luminous flux of the respective light sources 110 may be adjusted by controlling the current value, for example, or executing PWM control, under which the light source 110 is blinked in at a cycle invisible to human eyes and the lighting time ratio in one cycle (duty ratio) is changed.

In the case of controlling the current value, the relationship between the current value and the illuminance for each of the irradiation images is preliminarily stored in the ROM 613. The illuminance determination unit 621 determines the current value for acquiring the target illuminance value that has been determined based on the information of the road surface analyzer 602. Then the lighting signal including the current value information is output to the direction determination unit 622.

In the case of controlling the duty ratio, the relationship between the duty ratio and the illuminance for each of the irradiation images is preliminarily stored in the ROM 613. The illuminance determination unit 621 determines the duty ratio for acquiring the target illuminance value that has been determined based on the information of the road surface analyzer 602. Then the lighting signal including the duty ratio information is output to the direction determination unit 622.

In the modified example, the shape of the reflector 120 may be changed to form the arrow pattern. The lens 170 may be used instead of the reflector 120.

The present invention may be variously modified without being limited to the above-described embodiments and the modified examples. The present invention includes various modifications so long as they do not deviate from the scope of the present invention. The above-described embodiments and modified examples have been described for clear understanding of the present invention. The present invention does not necessarily include all the structures constituting those embodiments and/or the modified examples.

What is claimed is:

1. An optical device for displaying a condensing mark, comprising:
    a light source;
    an optical element for condensing a light emitted from the light source into a shape of the condensing mark on an irradiated surface,
        wherein a deflection surface of the optical element is divided into a plurality of regions, the deflection surface being a surface for condensing the light, and
        each of the divided regions on the deflection surface has a free-form surface shape, the free-form surface shape condensing the lights emitted through the each of the divided regions form partial irradiation images on the irradiated surface, the partial irradiation images becoming the condensing mark when combined, the condensing mark having a shape of any one of an arrowhead shape, an arrow shape and a X-shape; and
    a second light source, the second light source being different from the light source and emitting a second light, and
        wherein the free-form surface shape of each of the divided regions on the deflection surface has a shape, the shape condensing the second lights emitted through the each of the divided regions form second partial irradiation images on the irradiated surface, the second partial irradiation images becoming a second condensing mark formed on the irradiated surface at a position where distance from the optical device is different from the condensing mark when combined, the second condensing mark having a shape any one of arrowhead shape, arrow shape and X-shape.

2. The optical device according to claim 1,
wherein the optical element is a reflector for reflecting the light emitted from the light source, and
the deflection surface is a reflection surface of the reflector.

3. The optical device according to claim 1,
wherein the optical element is a lens, the lens receiving incidence of the light emitted from the light source, and emitting the light from an emission surface, and
the deflection surface is at least one of the emission surface and an incident surface of the lens.

4. A direction display device installed in a vehicle, comprising:
    the optical device according to claim 1; and
    a lamp controller for controlling lighting or blinking of the optical device,
    wherein the irradiated surface is a road surface around the vehicle,
    the lamp controller acquires a detection signal from a state detection device, the state detection device being mounted on the vehicle for detecting a behavior of the vehicle and peripheral environmental information of the vehicle, and
    the lamp controller lights or blinks the optical device based on the detection signal.

5. The direction display device according to claim 4,
wherein the irradiated surface is a road surface located at least at one of a front side, a lateral side, and a rear side of the vehicle.

6. The direction display device according to claim 4,
wherein the lamp controller acquires an operation signal indicating a right turn or a left turn from a direction indicator installed in the vehicle, and lights or blinks the optical device based on the operation signal.

7. The direction display device according to claim 4,
wherein the lamp controller acquires a traveling speed of the vehicle from a vehicle speed sensor installed in the vehicle, and lights or blinks the optical device when the traveling speed is lower than a predetermined value.

8. The direction display device according to claim 4,
wherein the lamp controller acquires a reflectance of a road surface around the vehicle from a road surface analyzer installed in the vehicle, and makes an illuminance by the optical device to a predetermined value or smaller when the reflectance is equal to or larger than a predetermined value.

9. The direction display device according to claim 4,
wherein the lamp controller acquires a current position of the vehicle from a navigation device installed in the vehicle, and lights the optical device when the current position of the vehicle is in a blind spot for a driver of the other vehicle irrespective of the detection signal.

10. The direction display device according to claim 4,
wherein a plurality of travelling directions exist for displaying the condensing marks,
the direction display device comprises a plurality of the optical devices provided corresponding to each of the travelling directions for displaying the condensing marks, and
the lamp controller lights or blinks the optical device corresponding to the travelling direction in accordance with the detection signal.

11. The direction display device according to claim 10,
wherein each of the optical devices provided corresponding to each of the travelling directions for displaying the condensing marks displays the condensing marks on the display regions of the irradiated surface, each of the display regions being different in distance from the vehicle, and the condensing mark to be displayed on the display region farthest from the vehicle is different in color from the condensing mark to be displayed on the display region closest to the vehicle.

12. The direction display device according to claim 4, wherein the optical device comprises:
- a forward optical device for displaying the condensing mark indicating a forward direction;
- a right turn optical device for displaying the condensing mark indicating a direction of right; and
- a left turn optical device for displaying the condensing mark indicating a direction of left, and the lamp controller lights or blinks one of the forward optical device, the right turn optical device, and the left turn optical device in accordance with the detection signal.

13. The direction display device according to claim 12, wherein each of the forward optical device, the right turn optical device, and the left turn optical device displays a plurality of differently colored condensing marks on different display regions of the irradiated surface.

14. The direction display device according to claim 12, wherein each of the forward optical device, the right turn optical device, and the left turn optical device displays the condensing marks on a plurality of display regions of the irradiated surface, each of the display regions being different in distance from the vehicle, and the condensing mark displayed on the farthest display region from the vehicle is different in color from the condensing mark displayed on the closest display region to the vehicle.

15. The optical device according to claim 1, wherein the free-form surface shape is a non-uniform rational B-spline (NURBS) curved surface.

* * * * *